US006944944B1

(12) United States Patent
Craythorn et al.

(10) Patent No.: US 6,944,944 B1
(45) Date of Patent: Sep. 20, 2005

(54) FASTENING MACHINES

(75) Inventors: Rupert Andrew Craythorn, Springwood (AU); Ralph Fuhrmeister, Runcorn (AU); Shane Peter Matthews, Sunnybank (AU); Wojciech Gostylla, Camira (AU); Stuart Edmund Blacket, Closeburn (AU); Nicholas Richard Clew, Farmington Hills, MI (US); Michael Butler, Chester (GB)

(73) Assignee: Henrob Limited (GB)

( * ) Notice: Subject to any disclaimer, the term of this patent is extended or adjusted under 35 U.S.C. 154(b) by 0 days.

(21) Appl. No.: 09/762,200

(22) PCT Filed: Aug. 3, 1999

(86) PCT No.: PCT/GB99/02545

§ 371 (c)(1),
(2), (4) Date: Jul. 20, 2001

(87) PCT Pub. No.: WO00/07751

PCT Pub. Date: Feb. 17, 2000

(30) Foreign Application Priority Data

Aug. 3, 1998 (GB) ............................................. 9816796

(51) Int. Cl.[7] ................................................ B23P 19/00

(52) U.S. Cl. ...................... 29/798; 29/243.53; 29/34 B; 29/525.06; 414/332; 414/404

(58) Field of Search .......................... 29/798, 771, 809, 29/243.53, 524.1, 525, 787, 525.06; 414/332, 404, 414

(56) References Cited

U.S. PATENT DOCUMENTS 2,493,868 A 1/1950 Griffin
3,029,918 A * 4/1962 Stover ......................... 193/46
3,789,490 A * 2/1974 Kohart ........................ 219/98
4,044,462 A 8/1977 Anselmo
4,404,742 A * 9/1983 Fuhrmeister ................. 29/798
4,615,475 A 10/1986 Fuhrmeister
4,765,057 A * 8/1988 Muller ........................ 29/716
5,201,892 A 4/1993 Salter
5,351,392 A * 10/1994 Wing et al. ................... 29/818
5,472,087 A 12/1995 Rink et al.
5,752,305 A 5/1998 Cotterill et al.
5,815,914 A * 10/1998 Kamps et al. ................ 29/798

FOREIGN PATENT DOCUMENTS

DE 29719744 2/1998
GB 2300183 10/1996
JP 56077042 6/1981
WO WO 9528242 10/1995

* cited by examiner

*Primary Examiner*—David P. Bryant
*Assistant Examiner*—Stephen Kenny
(74) *Attorney, Agent, or Firm*—DLA Piper Rudnick Gray Cary US LLP

(57) ABSTRACT

Fastener delivery apparatus for automatically selecting and delivering fasteners such as rivets to a setting tool. The fasteners are pre-loaded in a package and dispense via at least one fastener delivery tube that interconnects the setting tool to a fastener feeder device. The fastener feeder device releases selected fasteners from the package into the delivery tube. The fasteners are transportable individually or in groups in the tube from the feeder device to the tool. A transfer station attached to the tool or the delivery tube transfers a fastener from the delivery apparatus into the tool, the transfer station being moveable between a first position in which an exit of the transfer station is adjacent to the tool so that a delivered fastener may be inserted by the transfer station into the tool and a second position in which it is clear of the tool so as to permit the tool or a portion thereof to move towards a workpiece to insert a loaded fastener. The delivery tube has wear resistant elements. The apparatus allows smooth, rapid and reliable delivery of fasteners of various sizes and types to the nose of a setting tool in any particular order and provides all the fastener types for any particular work cycle.

48 Claims, 57 Drawing Sheets

651
652
653
655
656
657
658
660
661
664
666
667

FASTENING MACHINES

The present invention relates to fastening machines and in particular to improved aspects of fastener delivery to and around a fastening machine including a method for the controlled and efficient flow of fasteners from their point of manufacture to their insertion in a workpiece.

The term "fastener" is used herein to include rivets, screws, slugs and other types of fastening devices.

Conventionally rivets are presented to a fastening machine in loose form (e.g. they are delivered to the site in a bag which is severed and unloaded into a hopper of the machine) or mounted in a carrier tape. In the former design the rivets are extracted singly from the hopper and delivered to a rivet setting tool via a pressurised delivery tube in which the rivet is propelled by, for example, pressurised air. At the end of the delivery tube the rivet is typically transferred to an alignment or retaining device for holding the rivet in alignment with a rivet delivery passage of the setting tool. When the rivet is in this position a punch descends along the rivet delivery passage and drives the rivet into the workpiece so that it is deformed by an upsetting die disposed below the workpiece. In designs which use carrier tape the fasteners are advanced with the tape so that they are brought sequentially into alignment with the punch and die assembly by a feeder before the punch is actuated to drive the fastener out of the tape and into the workpiece as before.

In certain applications where limited space is available the use of a conventional carrier tape and feeder design is precluded by their size.

Modern riveting machines are generally CNC controlled and incorporate robot technology. The machines are operated under the control of a computer program that provides instructions relating to the rivet position and type for each joint to be effected in a particular workpiece. The type of rivet to be used is selected according to many factors including the size of the parts to be connected. The fastener delivery system must thus be able to cope with the supply of rivets of different sizes and types in any particular sequence without increase to the riveting cycle time.

A present requirement in the industry is to meet the demands of large scale continuous production in which setting tools are supplied in a continuous uninterrupted manner both during operation of the setting tool and during robot dwell times when the setting tools are not in operation. In such fastening machines rivets are preferably transferred in bulk from a store or goods inward station to the setting tool on a production line in a "Just-in-Time" manner by automatic means such as, for example, auto-guided vehicles, robots or conveyors.

A problem with presenting loose rivets or other fasteners to conventional fastening machines is that the supply hopper or other storage device is topped up from time to time with fasteners that can be from different production batches, making it impossible to trace with any accuracy the passage of individual rivets or batch of rivets from the source of manufacture through to insertion in the workpiece. The mixing of batches compromises strict quality control measures demanded by modern industry, especially in the event of having to recall a riveted product. Operator error or non-compliance with procedures (e.g. adding rivets from an unidentifiable source to a feeder containing identifiable rivets) can exacerbate this difficulty.

A disadvantage of existing rivet delivery tubes is the tendency for them to wear during use because the plastics material from which they are generally constructed is selected as a compromise between flexibility, visual transparency (so that blockage or jams can be detected by visual inspection) and a low coefficient of friction. This is particularly so if rivets are fed sideways (i.e. at right angles to the longitudinal axis of the rivet) which is necessary if tumbling of the rivet within the tube is to be avoided. Fasteners having different aspect ratios (fastener length to head diameter) are fed in different orientations. For example, fasteners with a low aspect ratio are susceptible to tumbling in the delivery tube, which must therefore be of T-shape, or rectangular cross-section and fasteners with a high aspect ratio are transported axially in tubes of circular cross-section. Wear can manifest itself in the form of internal corrugations that can severely limit the propulsion velocity. In addition, the accumulation of dust and general detritus can cause blockages thereby interrupting the fastening process particularly as it is generally difficult to gain access to the interior of the tube. Such delivery tubes are generally connected to robotic devices and can be twisted or otherwise contorted during robot manipulation, particularly when routed around a bend having a small radius. In such cases the inner profile of the tube can be distorted to an extent that rivets become trapped in a constriction in the tube.

Another problem with sideways delivery of rivets is that they need to be rotated through 90° before they can be inserted into the delivery passage of the nose when the delivery tube approaches the nose from a vertical direction that is parallel to the setting tool axis. This can be done by incorporating bends into the delivery tube or feeder tube of a transfer station however this occupies considerable space since the bend must be gradual enough so to prevent jamming of the rivet and to maintain sufficient rivet momentum. Generally the transfer station has a plunger that directs a rivet emerging from the delivery tube into the nose of the setting tool. The delivery tube must therefore enter the transfer station ahead of the plunger in which case the tube must bend around the plunger, or the plunger must be constructed so as to reciprocate out of the path of the tube when a rivet arrives.

In certain fastening applications several rivet sizes are required for a workpiece or section of a workpiece if, for example, it comprises overlapping sheets or there is a requirement to attach a bracket to another component, in which case the sandwich thickness of the workpiece varies from two sheets to three sheets or more. When self-piercing riveting technology is employed, one of the factors determining the strength of a riveted joint is the length of the rivet in relationship to the sandwich thickness of the material to be fastened. The mechanical properties of joints riveted with the same size of rivet will vary depending on the sandwich thickness and the material being fastened. In a continuous production environment, conventional self-piercing riveting tools are dedicated to a single rivet size and the problem of riveting combinations of different thicknesses of material is addressed by using several dedicated tools each applying a different rivet size. Obviously this requires careful planning as increased combinations of different joint thicknesses and strengths require additional rivet sizes and therefore increased numbers of tools.

Finally, it is a continual requirement to improve the efficiency and reliability of the transfer of individual rivets from the delivery tube to the rivet delivery passage in the setting tool.

In many known setting tools rivets are transported directly into the nose via a permanently connected delivery tube. This arrangement has several disadvantages. In particular, the connection of the tube to the nose restricts access, is bulky and means that the tube must move up and down with the stroke of the nose during insertion of a rivet into a workpiece. Moreover, the rivet delivery can be a problem in that there is no provision for dealing with a plurality of rivets that may have been accidentally fed into the nose and effective delivery relies purely on the momentum of the rivet as it travels down the delivery tube. It will be understood that the rivet momentum is variable with the air pressure supply (that propels the rivets along the tube), rivet mass and restrictions in the passage of the delivery tube (caused by kinks, bends, dirt and wear etc). In addition, the arrangement cannot prevent debris being carried into the nose along the delivery tube.

In applications where there is restricted access to a workpiece long slender noses are used and the rivet entry passage has to be positioned high up the nose so that long strokes of the punch within the nose are required. This increases the cycle time and adds significantly to the overall length of the setting tool.

Finally, there is generally a slow cycle time associated with such transfer arrangements. Rivets are fed separately to the nose and the cycle time is thus dependent on the length of the delivery tube.

In an alternative known configuration a transfer station is disposed between the nose and the delivery tube. Rivets stop at the transfer station and are transferred by a pusher into the nose. Whilst this arrangement reduces the cycle time in that rivets can be collected at the transfer station, the other disadvantages referred to above are not solved.

U.S. Pat. No. 5,465,868 describes an automatic system for pre-selecting and feeding pre-oriented rivets to a riveting machine. A buffer magazine comprising a bundle of tubes is situated at a location intermediate a rivet setter head and a feed station. Each tube contains a plurality of rivets The buffer magazine is supplied with pre-oriented rivets of different sizes and types and is connected to the rivet setter head by a plurality of delivery tubes that are fed by a selecting device mounted on a frame below the magazine. The selecting device operates under the control of a computer program to select the appropriate rivet from the magazine and release it into the appropriate delivery tube for supply to the rivet setter head. The feed station ensures that the buffer magazine is automatically filled to a level above a minimum.

It is an object of the present invention to obviate or mitigate the aforesaid disadvantages.

According to a first aspect of the present invention there is provided fastener delivery apparatus for a fastener setting tool comprising a package pre-loaded with fasteners, at least one fastener delivery tube for interconnecting the setting tool to a fastener feeder device that releases selected fasteners from the package into the delivery tube, the fasteners being transportable individually or in groups in the tube from the feeder device to the tool, a transfer station attached to the tool or the delivery tube for transferring a fastener from the delivery tube into the tool, wherein the transfer station is moveable between a first position in which an exit of the transfer station is adjacent to the tool so that a delivered fastener may be inserted by the transfer station into the tool and a second position in which it is clear of the tool so as to permit the tool or a portion thereof to move towards a workpiece to insert a loaded fastener.

Preferably there is provided an intermediate buffer for fasteners at or proximate to the transfer station tool so that multiple fasteners may be held at the station. This enables supply of rivets to the nose to be continued if the delivery tube is disconnected.

According to a second aspect of the present invention there is provided a fastener feeder assembly for fastener delivery apparatus, the assembly comprising a hopper having at least one aperture into which a sealed container of fasteners is releasably secured, a gate which is moveable relative to the hopper between positions which open and close the aperture and a reservoir into which released fasteners are dispensed, wherein the container has a frangible seal that is broken when the feeder assembly is satisfied that the contents are correct so as to release the fasteners, the gate moving to the open position to pass the fasteners to the reservoir.

According to a third aspect of the present invention there is provided a fastener feeder assembly for fastener delivery apparatus comprising a support on which are mounted a plurality of containers each containing fasteners in vertical array, and a release mechanism that is moveable relative to an underside of the support, the release mechanism comprising a carriage captively fitted to the support and a chamber for receiving at least one fastener from a container, an actuator for directing the fastener out of the carriage into a delivery tube and release means for releasing a fastener from the container, characterised in that the release mechanism further comprises a guide element that engages a complementary guide element on the support so that its movement under the support is along a predetermined path.

According to a fourth aspect of the present invention there is provided a fastener delivery tube for interconnecting a setting tool to a source of fasteners, the tube having an internal passage through which fasteners may pass and at least one wear resistant strip that projects into the passage to contact the fastener.

According to a fifth aspect of the present invention there is provided a fastener delivery tube for interconnecting a setting tool to a source of fasteners, the tube comprising an internal passage through which fasteners may pass, a first portion of T-shaped cross-section, a second portion of circular cross-section and an intermediate interface tube with an internal configuration that rotates the fastener so that it can move between the first and second portions.

Specific embodiments of the present invention will now be described, by way of example only, with reference to the accompanying drawings in which.

Figures 11, 12:
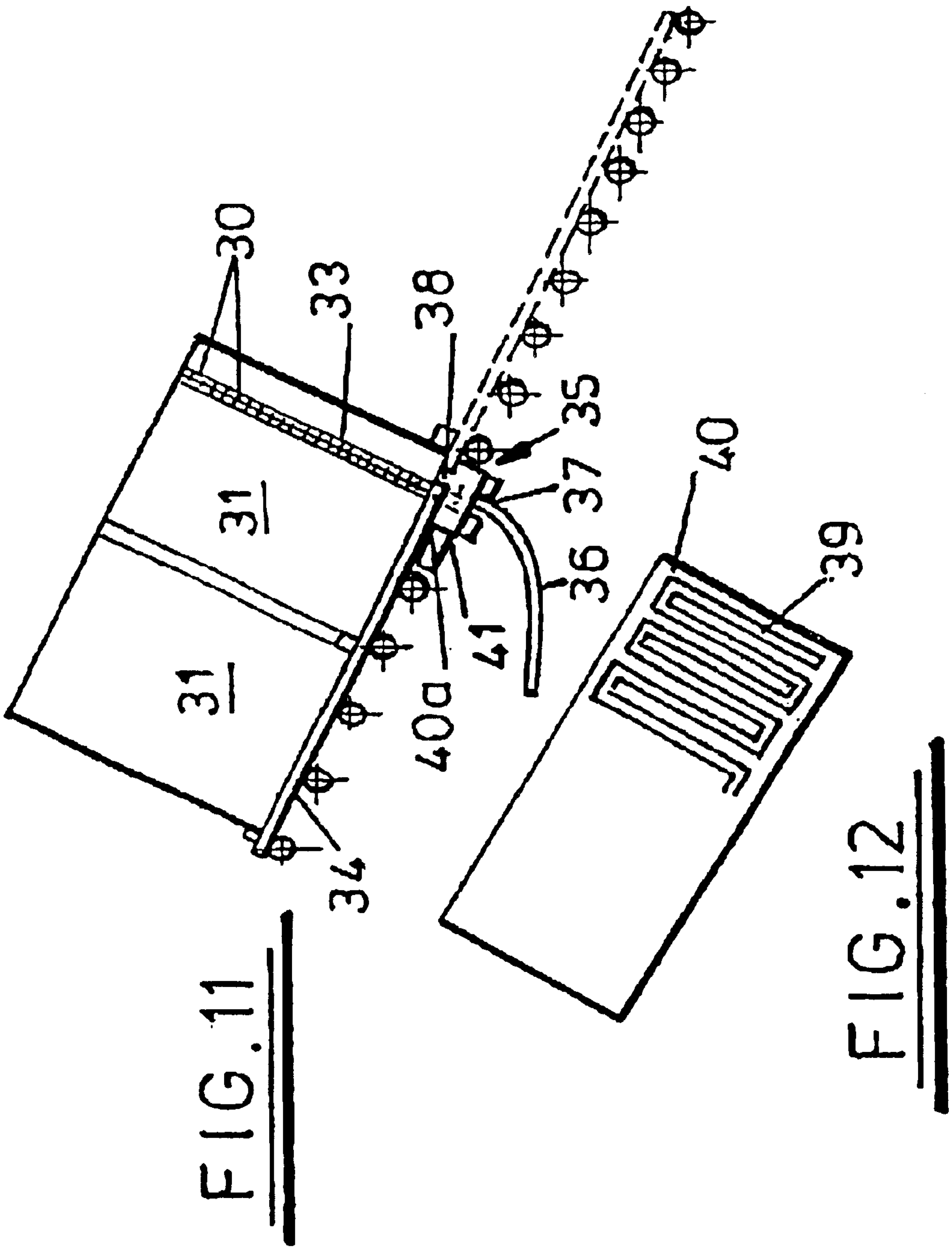
FIG. 11 is a schematic side view representation showing unloading of rivets from a package on the pallet of FIG. 9.
FIG. 12 is a diagrammatic representation of the path followed by a release mechanism relative to a package.
Figure 13:
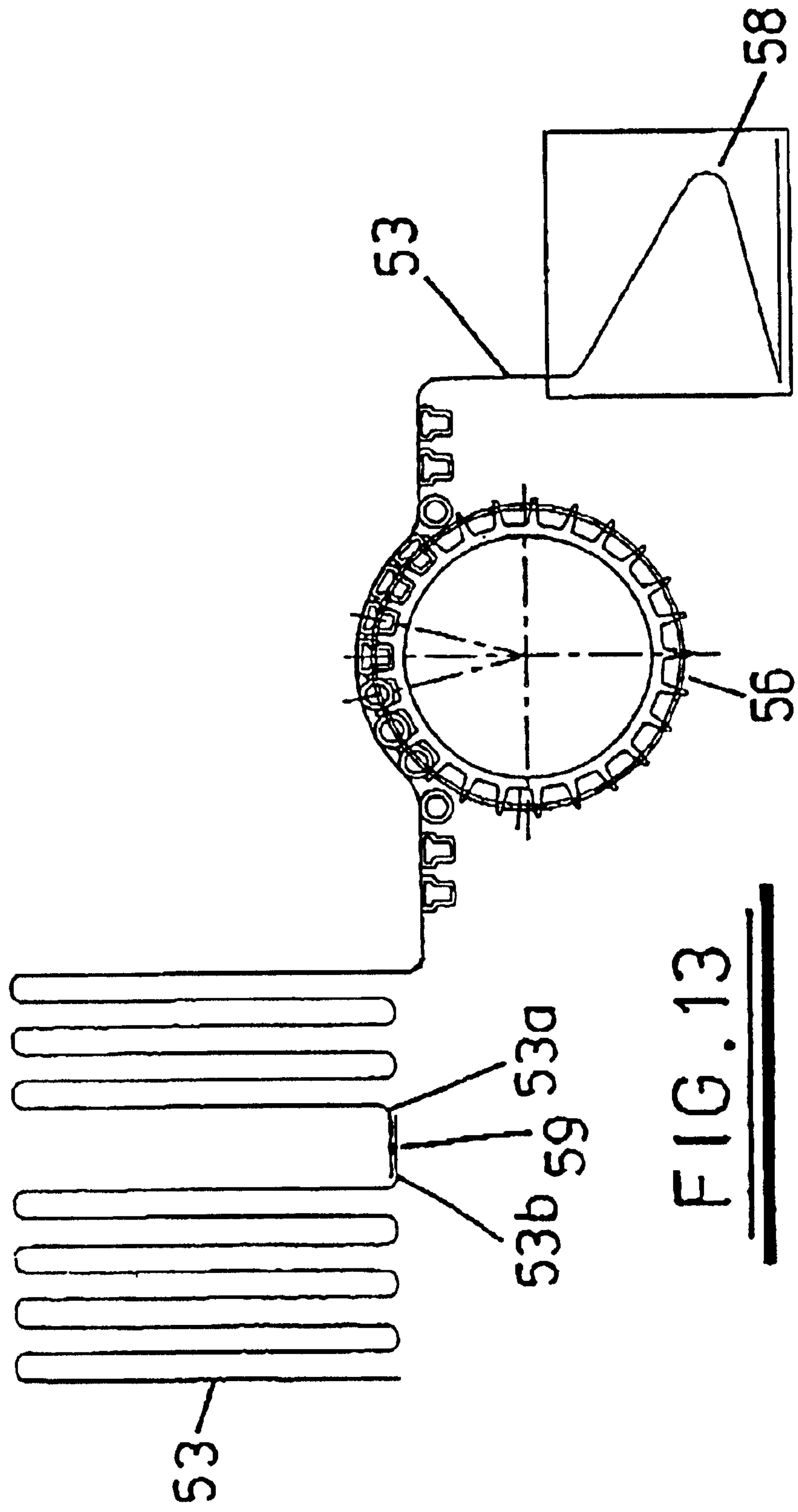
FIG. 13 is a side view of a second alternative embodiment of a rivet package shown with a feed mechanism.
Figure 14:
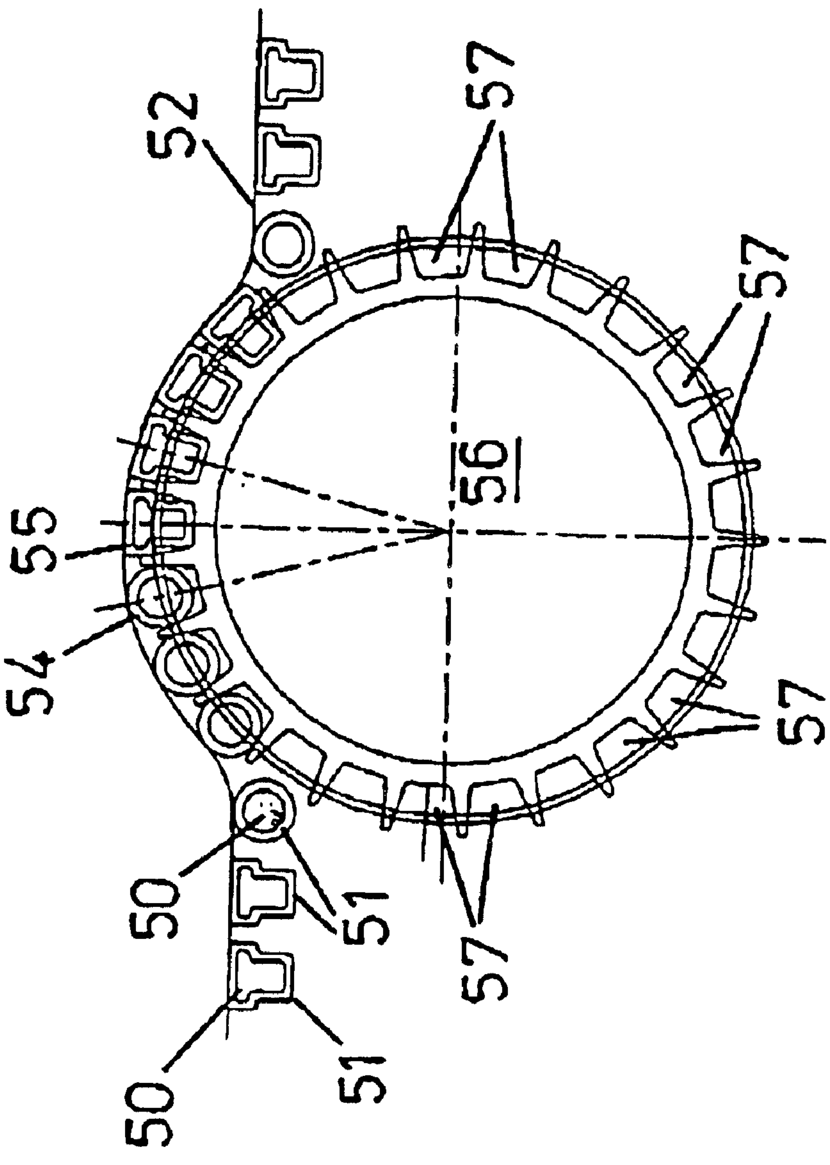
FIG. 14 is an enlarged view of a rotary sprocket of the embodiment of FIG. 13.
Figure 15A:
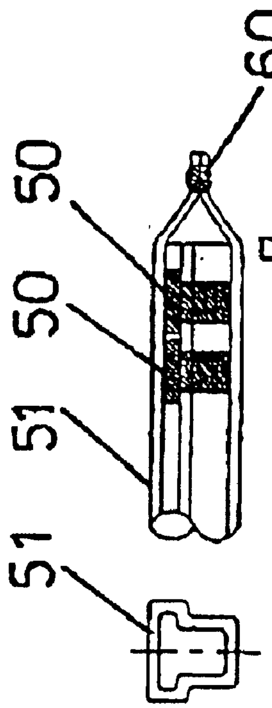
Figure 15B:
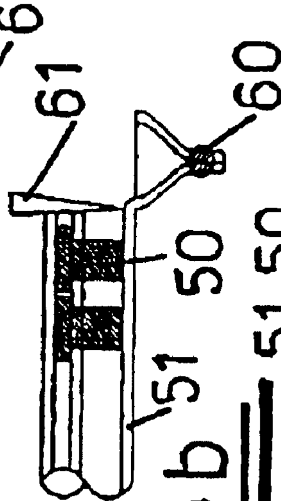
Figure 16A:
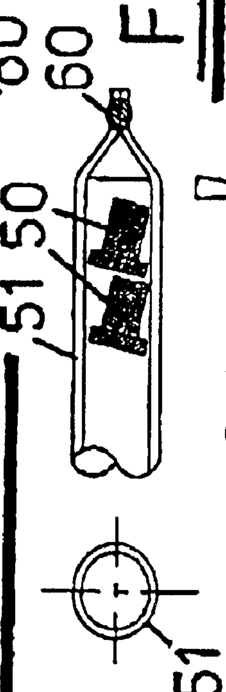
Figure 16B:
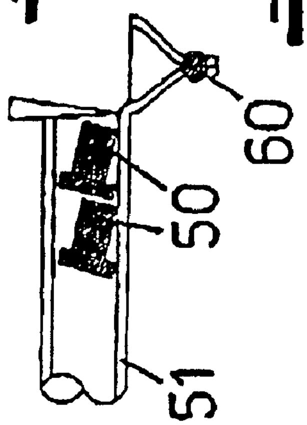
Figure 17:
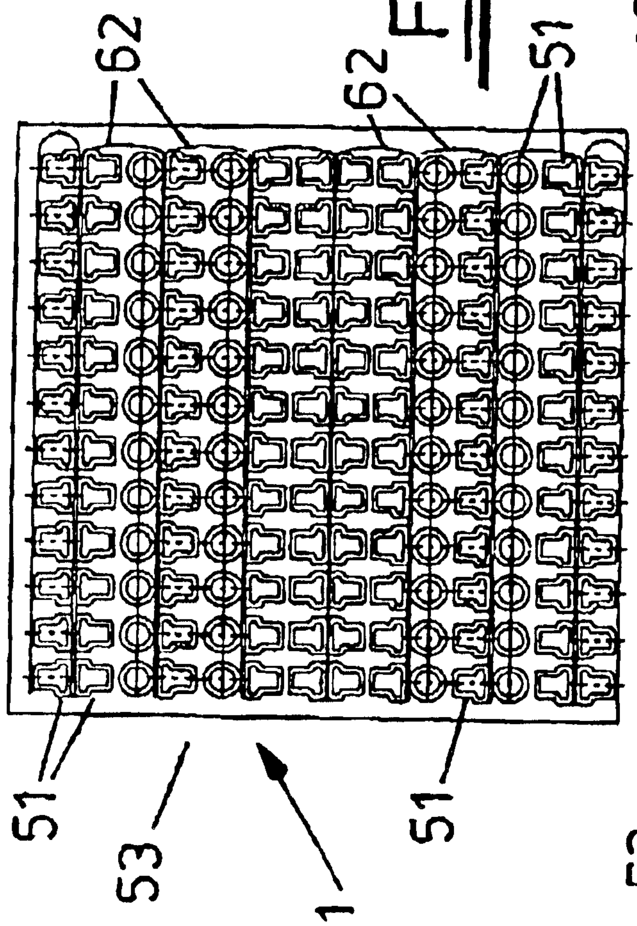
Figure 18:
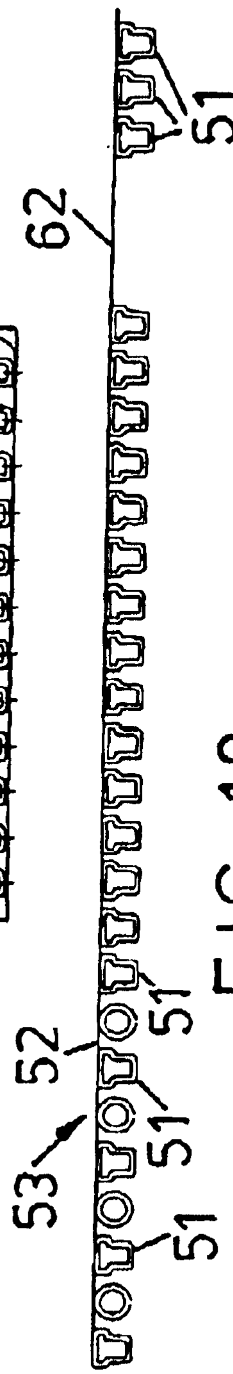
Figure 19:
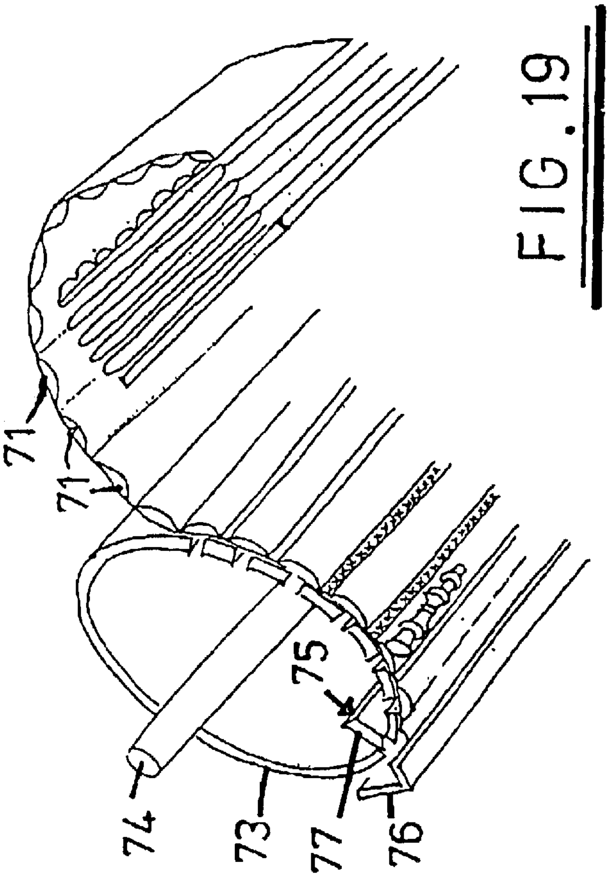
Figure 20:
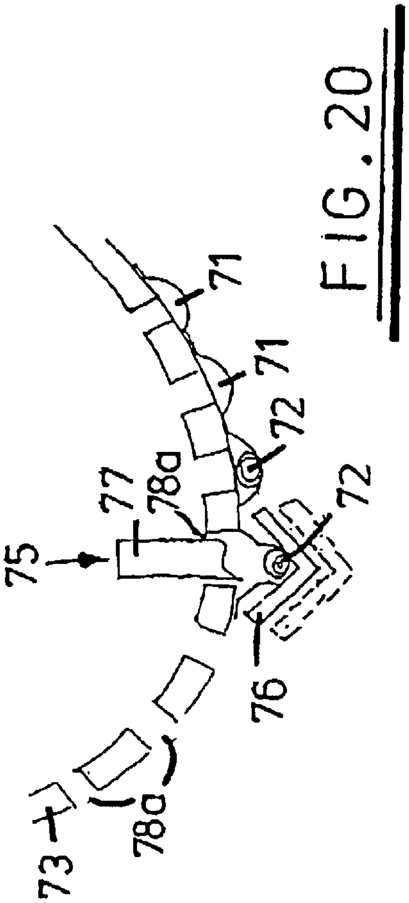
Figures 21A, 21B, 21C, 21D, 21E, 21F:
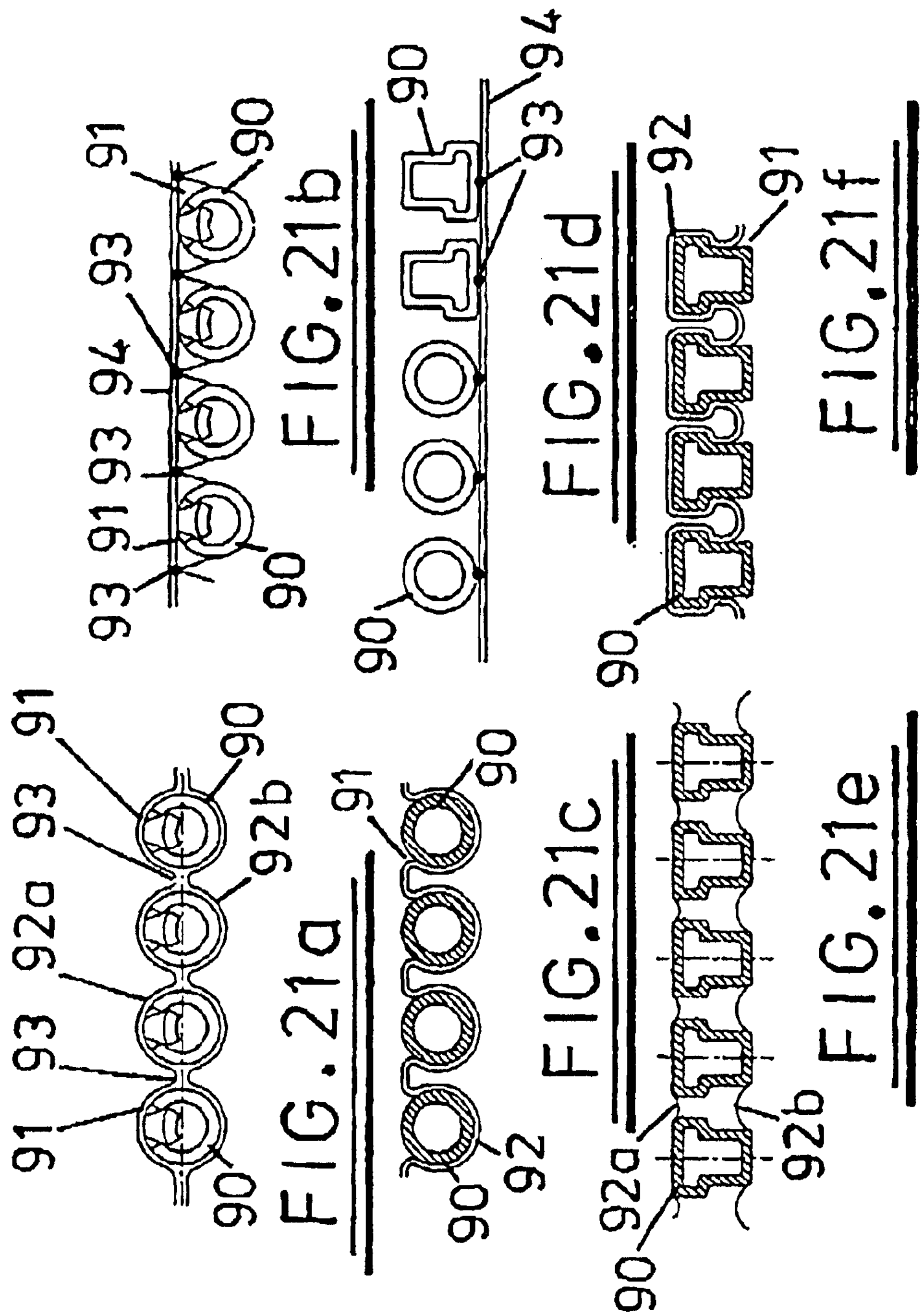
Figures 21G, 21H, 21I:
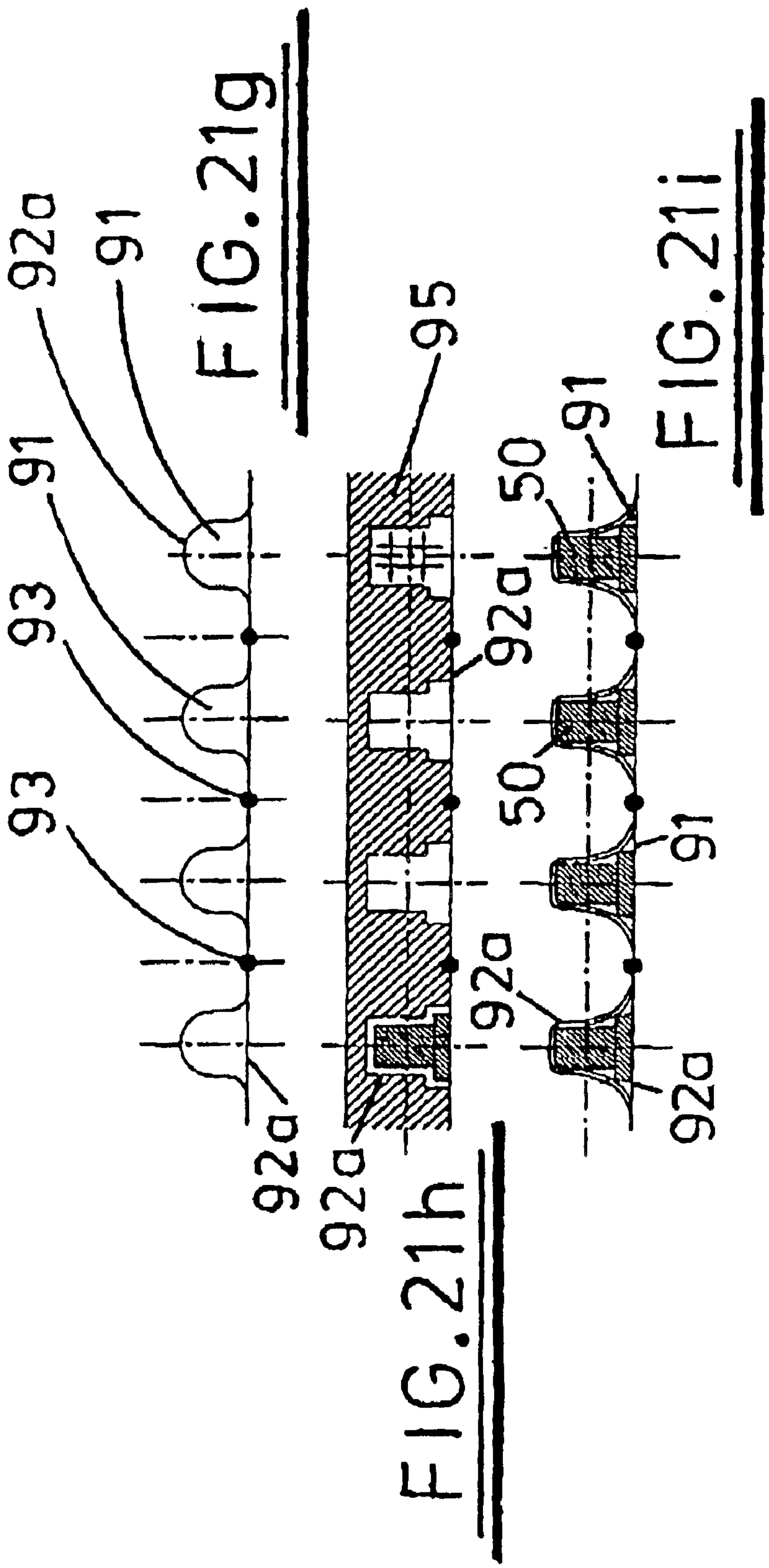
Figures 21J, 21K, 21L, 21M:
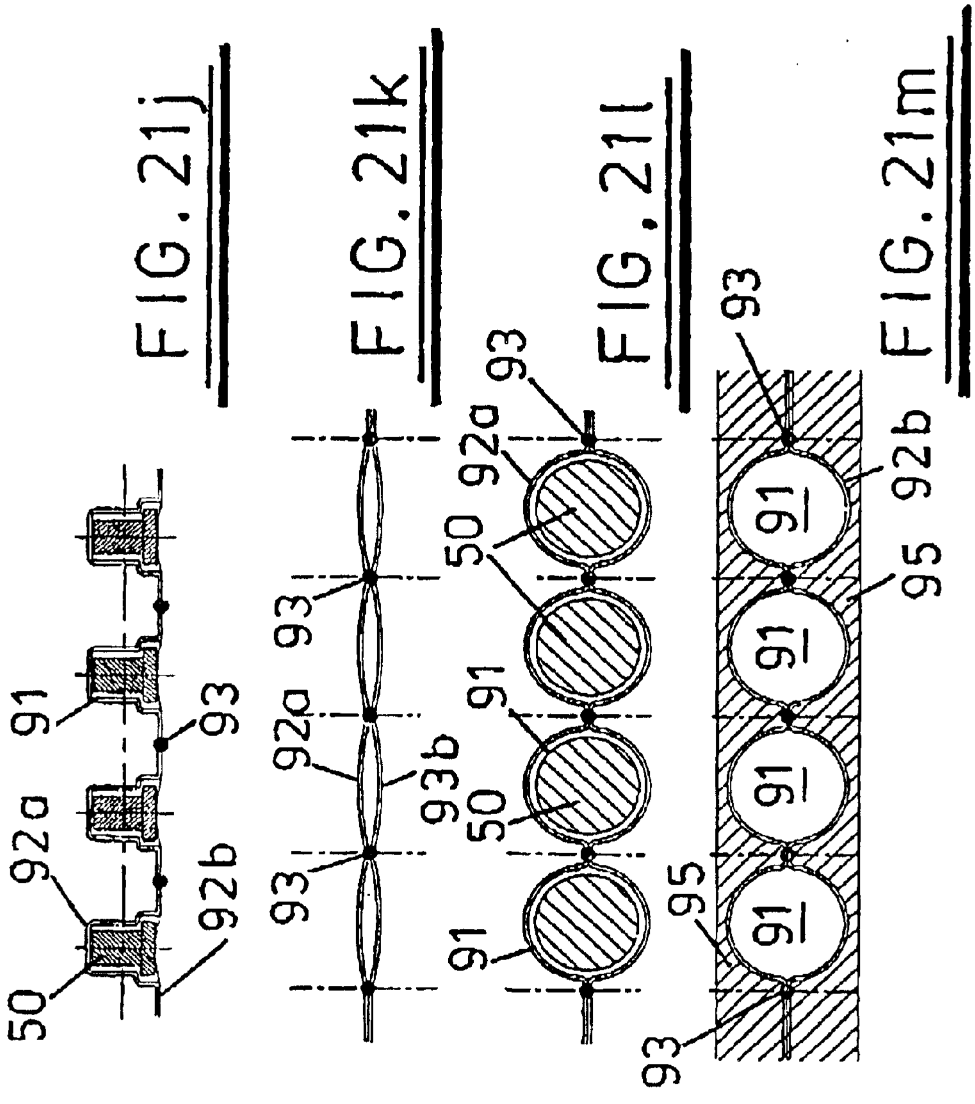
Figures 21N, 21O:
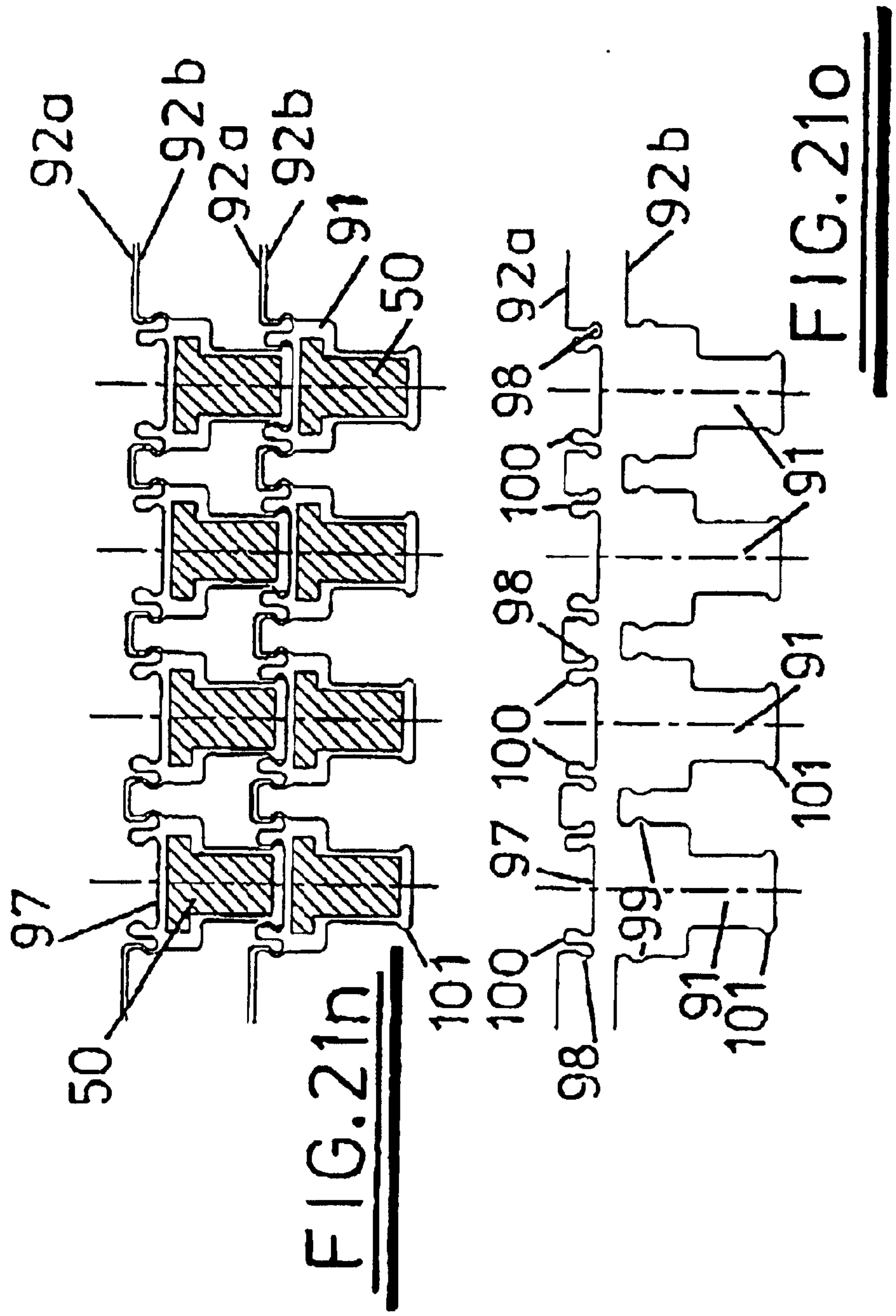
Figures 21P, 21Q, 21R:
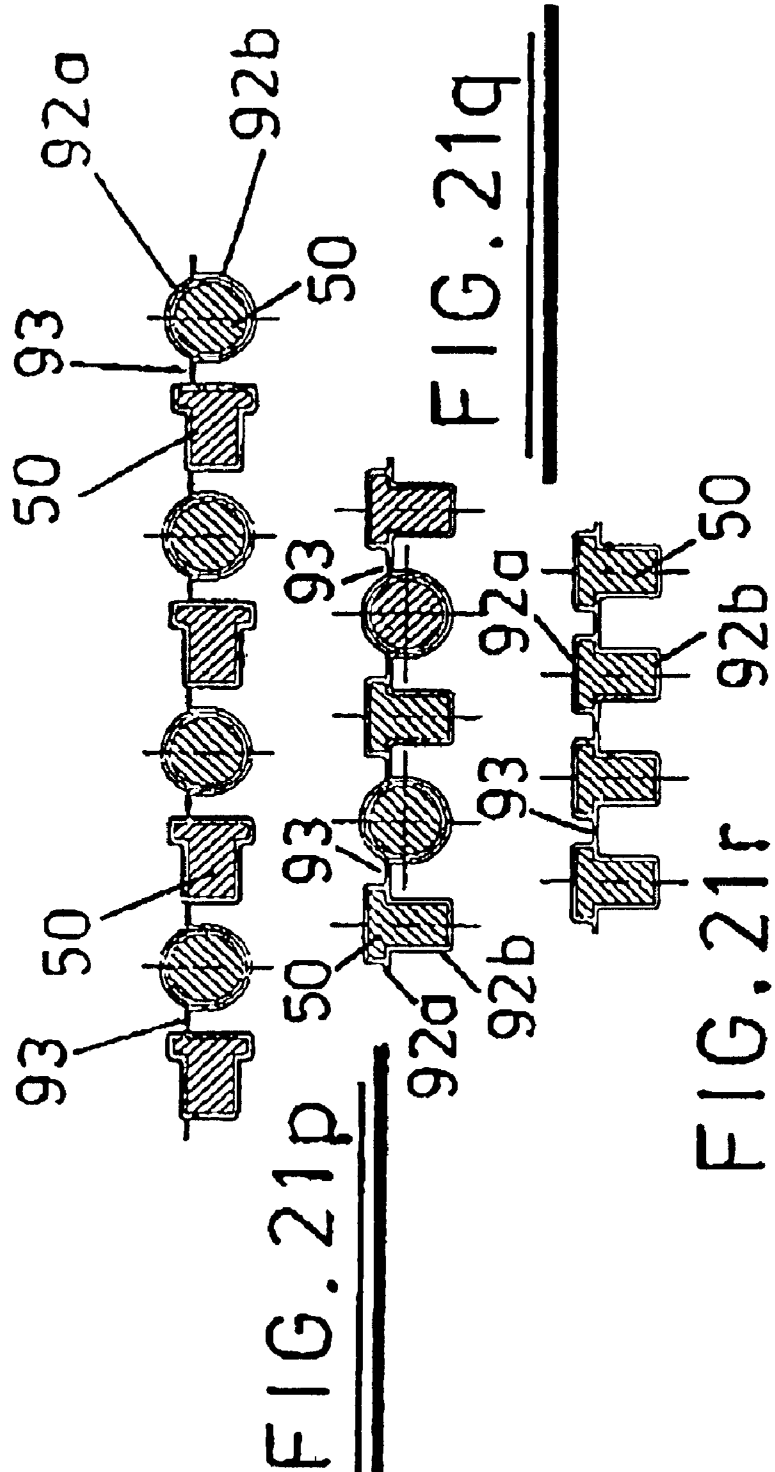
Figures 21S, 21T, 21U, 21V:
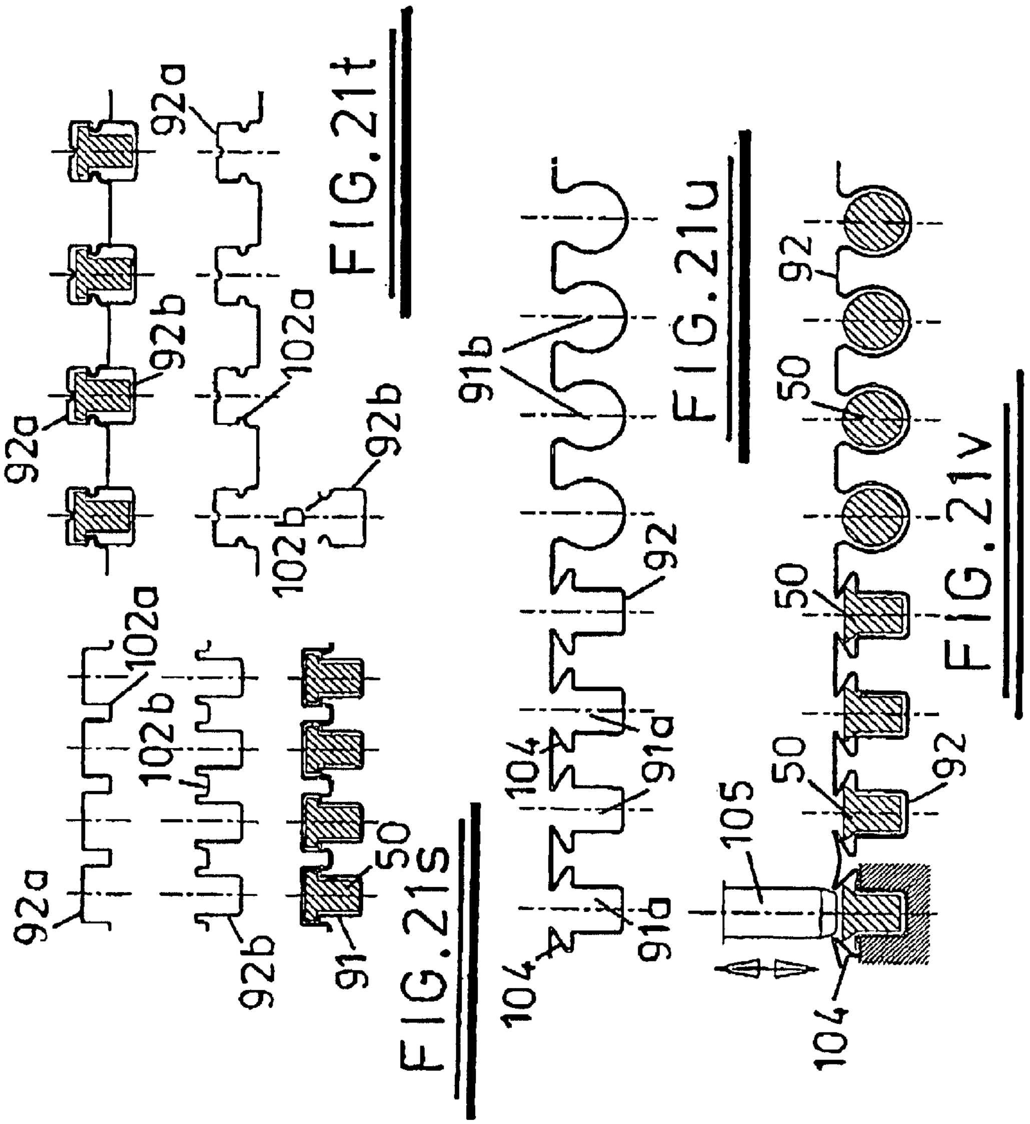
Figure 21X:
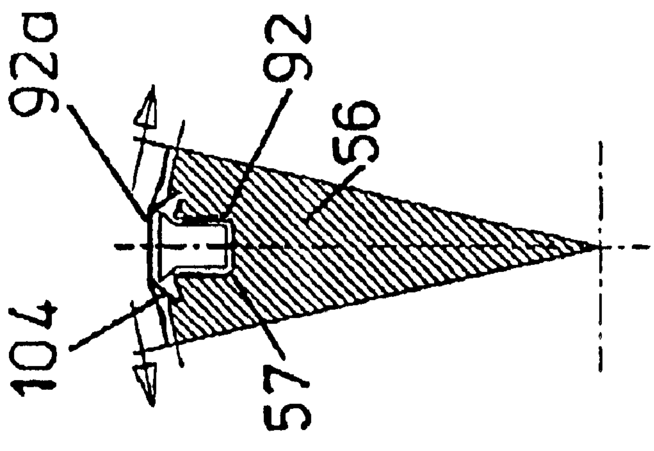
Figure 21W:
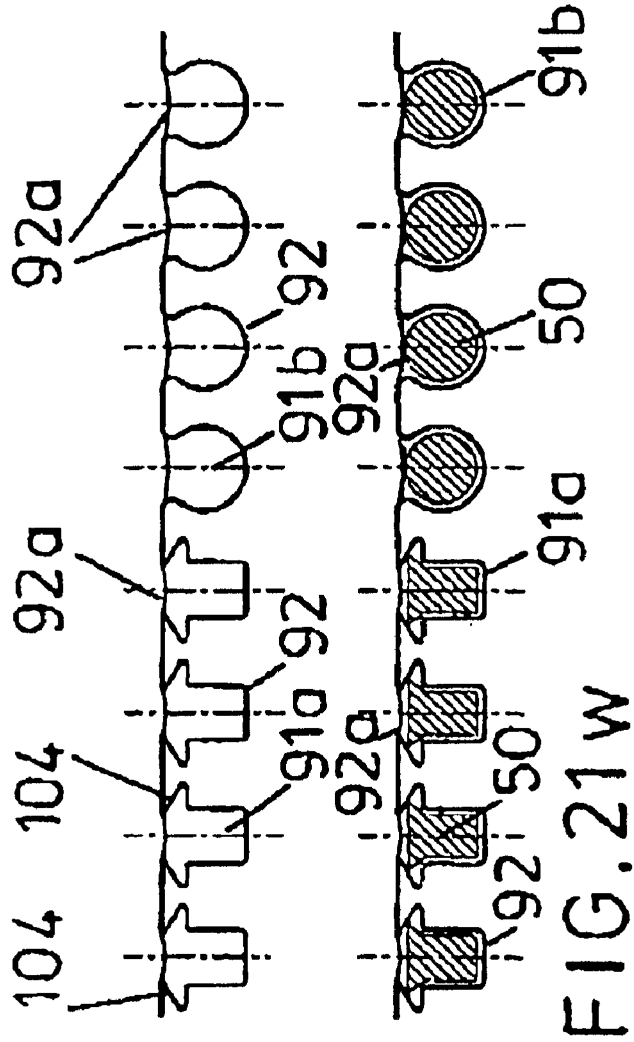
Figure 21Y:
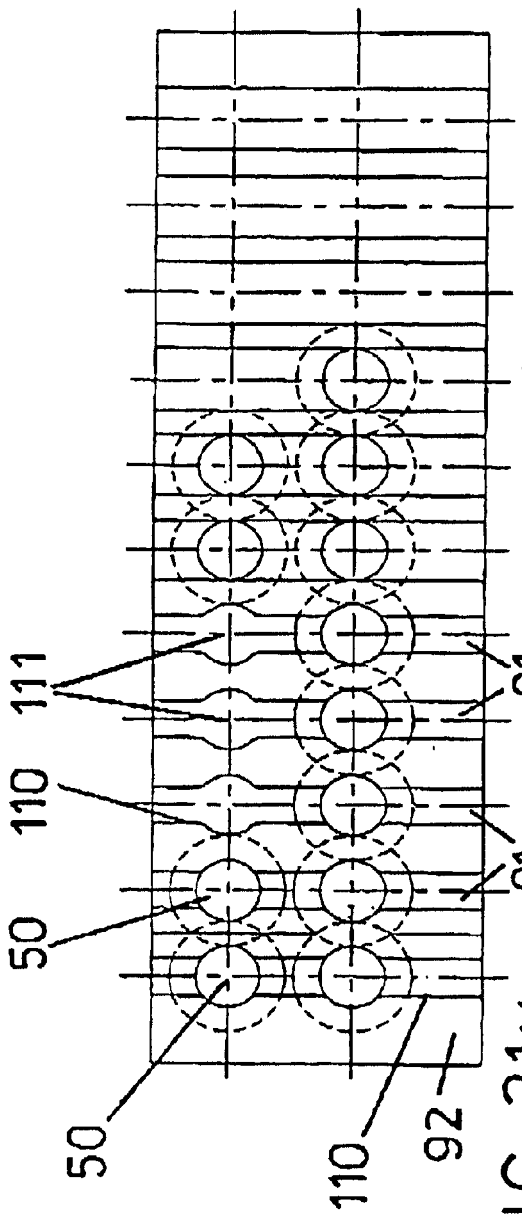
Figure 21Z:
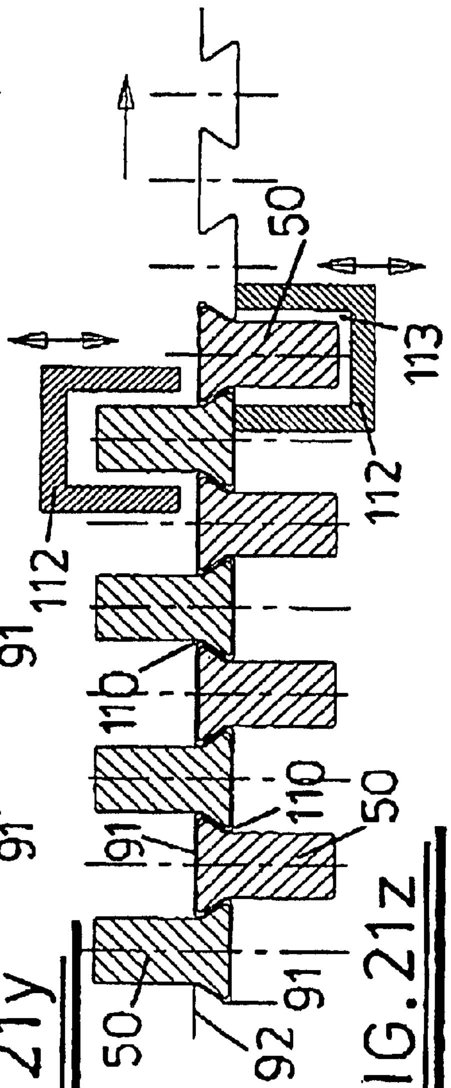
Figure 22A:
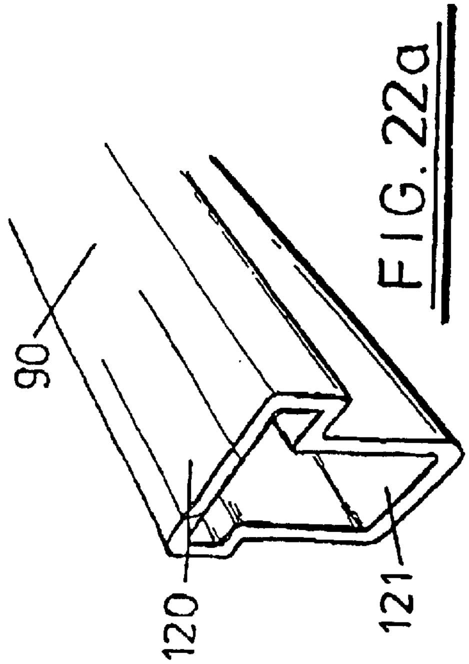
Figure 22B:
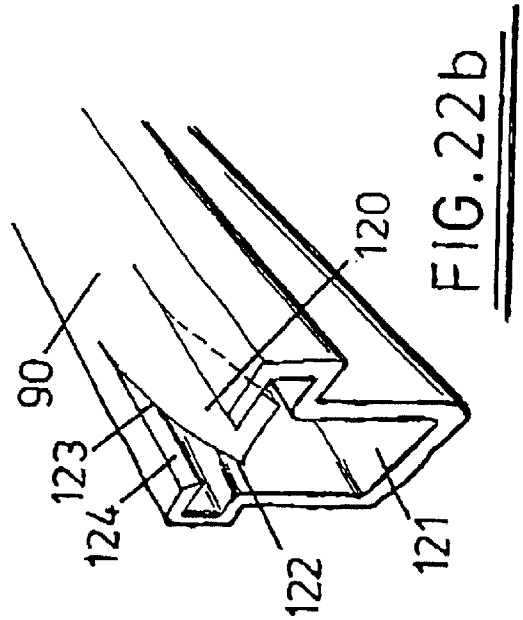
Figure 23A:
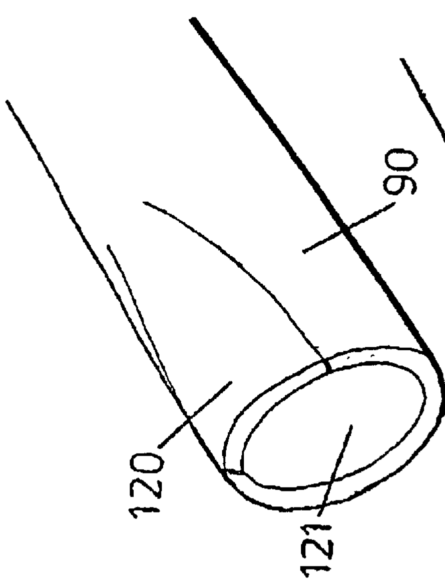
Figure 23B:
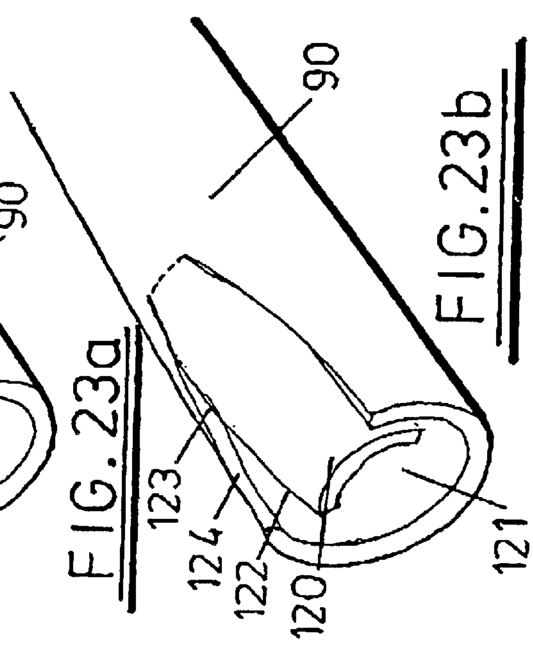
Figures 22C, 22D, 23C, 23D, 24:
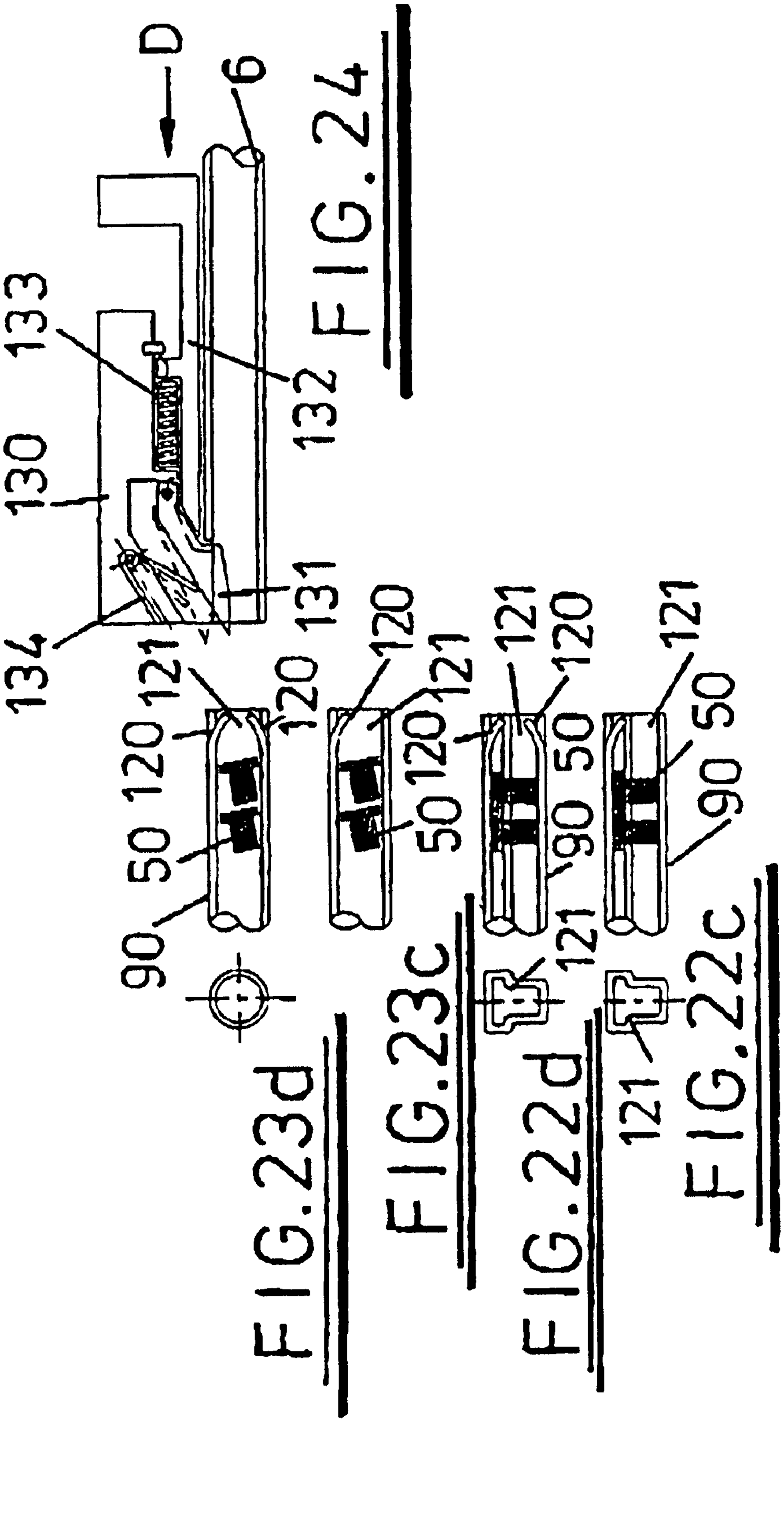
Figures 24A, 24B:
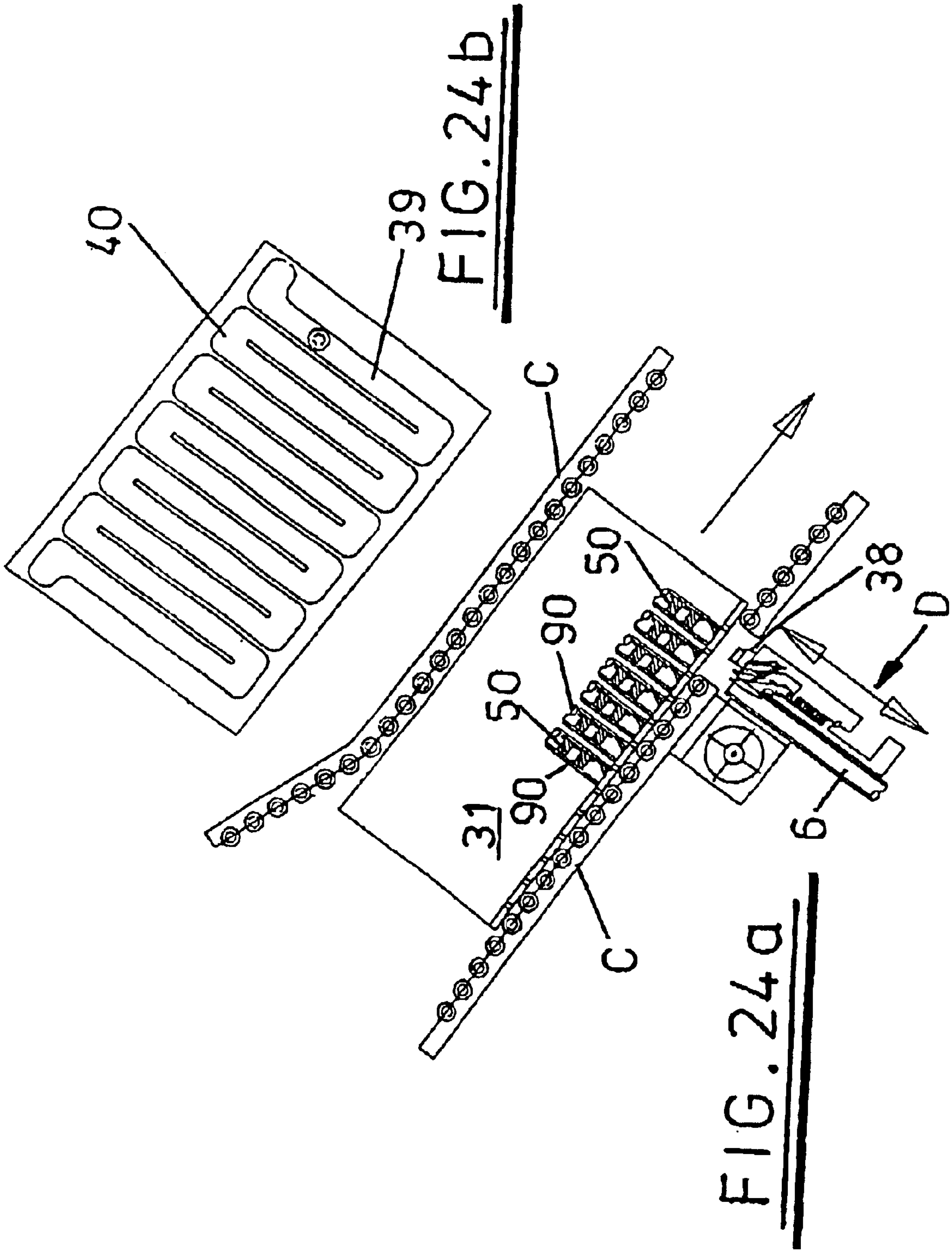

FIG. 15*a* is a fragmentary end view of a T-cross-section tube of the package of FIGS. 13 and 14 shown unopened;

FIG. 15*b* corresponds to FIG. 15*a* but with the tube shown opened;

FIGS. 16*a* and 16*b* correspond to FIGS. 15*a* and 15*b* but show a round cross-section tube;

FIG. 17 is a side view of a modified package shown in a folded configuration;

FIG. 18 is a side view of part of the package of FIG. 17, shown unfolded;

FIG. 19 is a perspective view of an alternative package embodiment that is being fed to a rotary release device;

FIG. 20 is a schematic representation of a release mechanism of the device of FIG. 19;

FIGS. 21*a* to 21*z* show sectioned side view of alternative embodiments of a rivet package;

FIGS. 22*a* to 22*d* show perspective and side sectioned views of a further embodiment of a rivet package being one aspect of the present invention;

FIG. 23*a* to 23*d* show perspective and side sectioned view of a yet further embodiment of a rivet package being one aspect of the present invention;

FIG. 24 shows in side section a docking interface to be used with the packages shown in FIGS. 22 and 23;

FIG. 24*a* is equivalent to that of FIG. 11, shown with a modified package;

FIG. 24*b* is a diagrammatic representation of the path followed by the release mechanism of FIG. 24*a;*

Figure 25B:
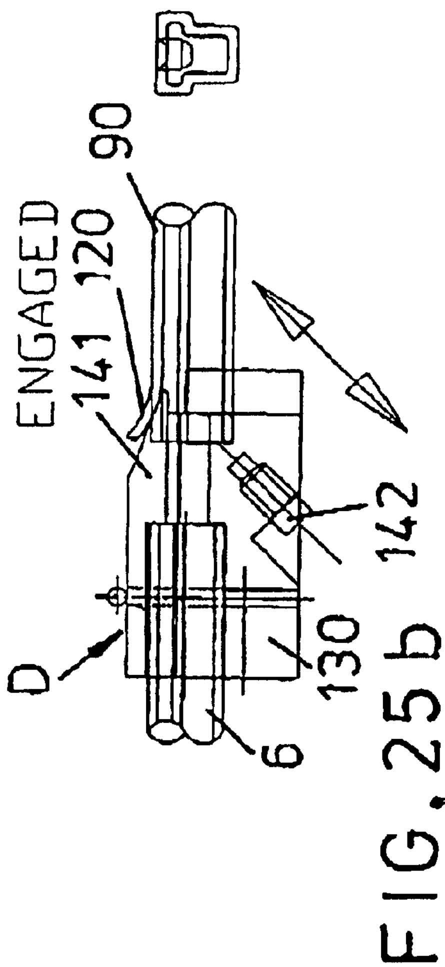
Figure 25A:
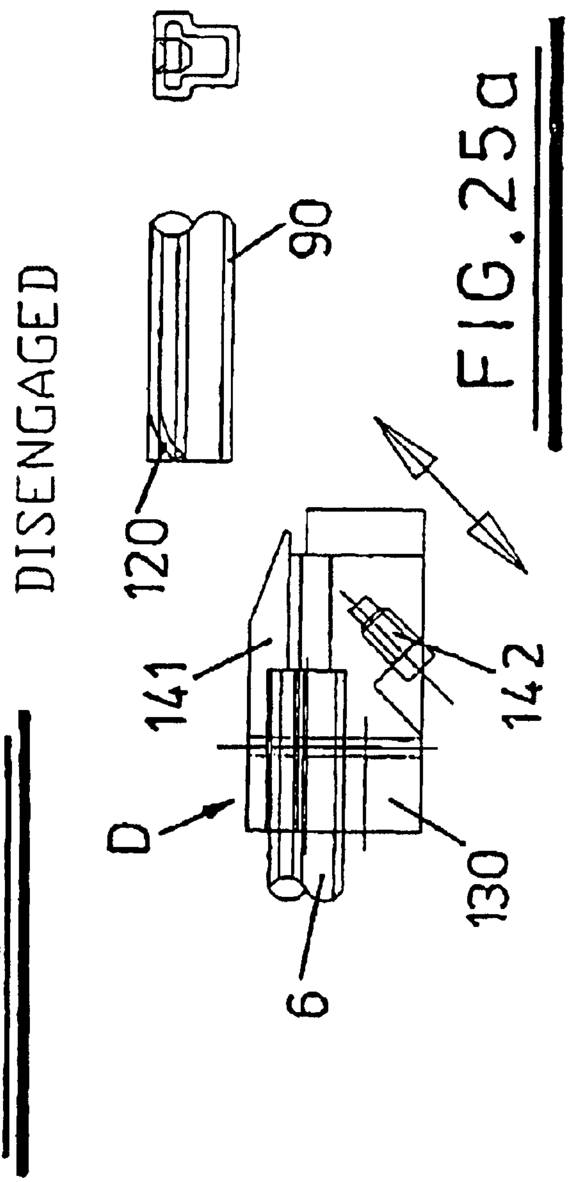
Figure 26A:
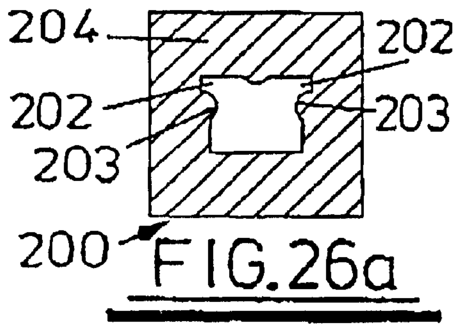
Figure 26B:
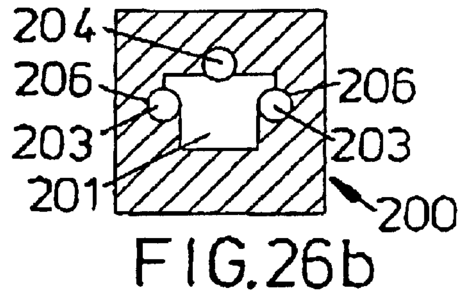
Figure 26C:
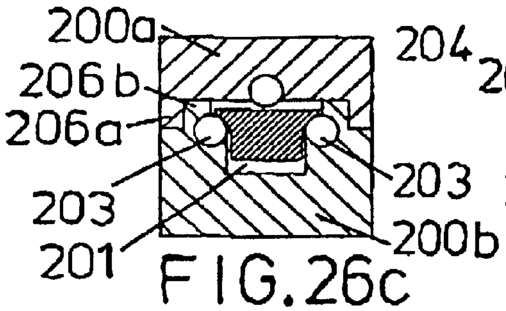
Figure 26D:
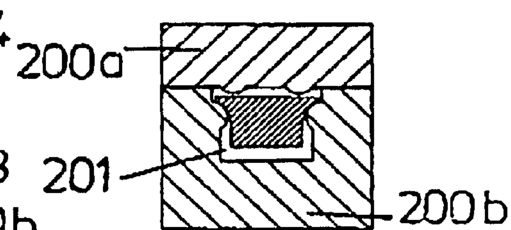
Figure 26E:
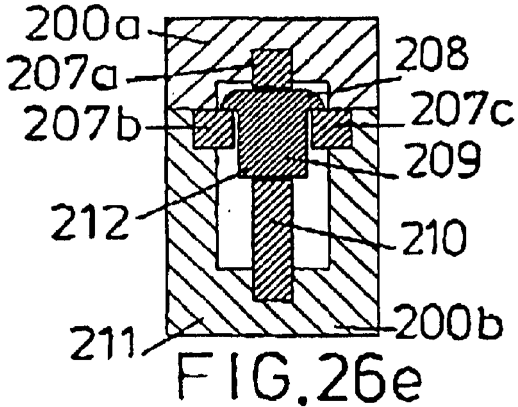
Figure 26F:
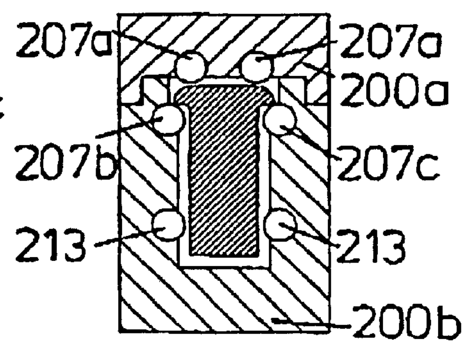
Figure 26G:
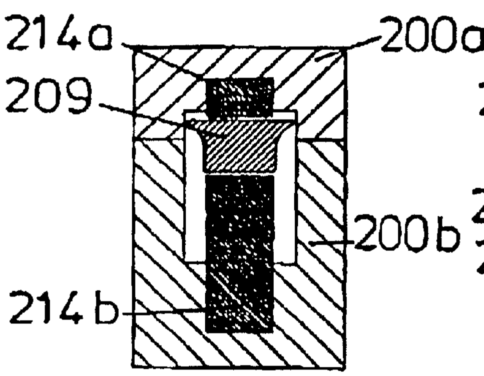
Figure 26H:
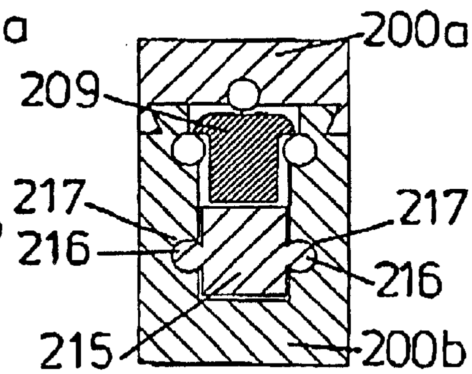
Figure 26I:
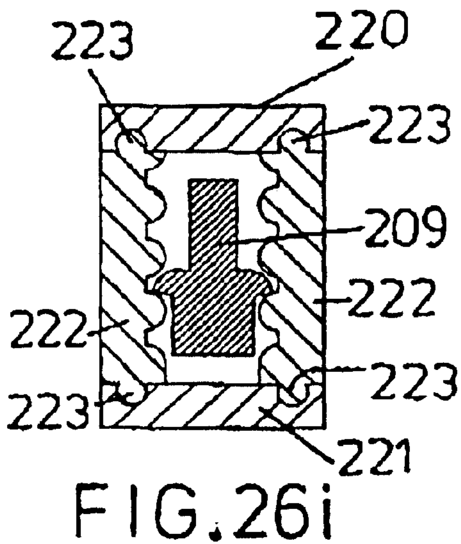
Figure 26J:
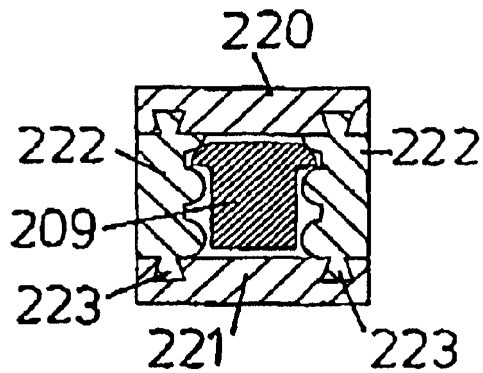
Figure 26K:
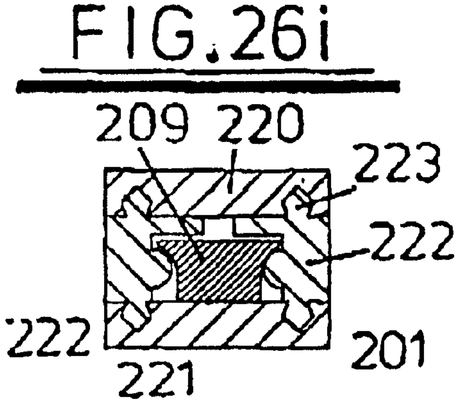
Figure 26L:
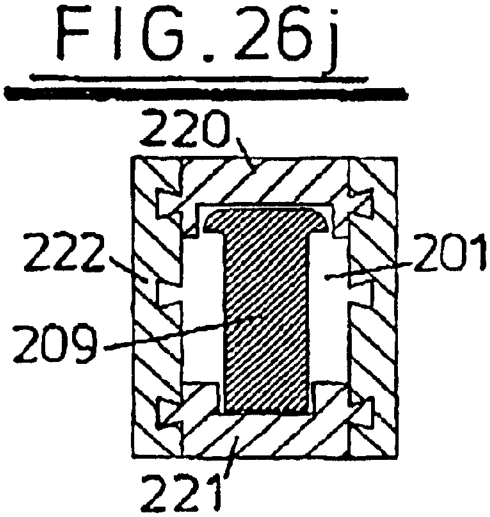
Figure 26M:
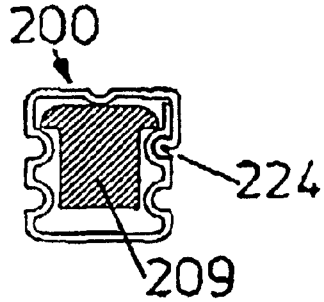
Figure 26N:
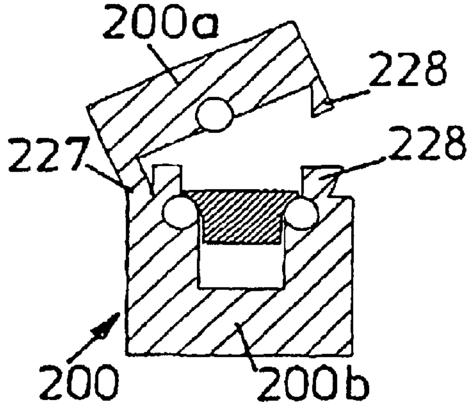
Figure 26O:
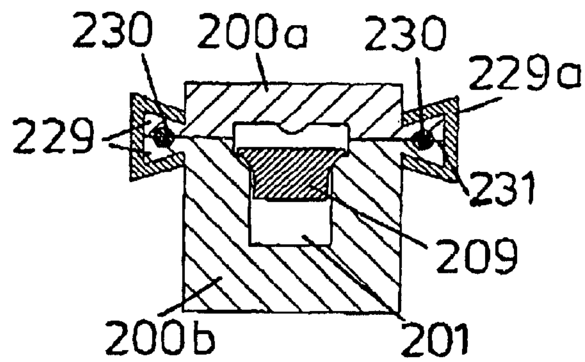
Figure 26P:
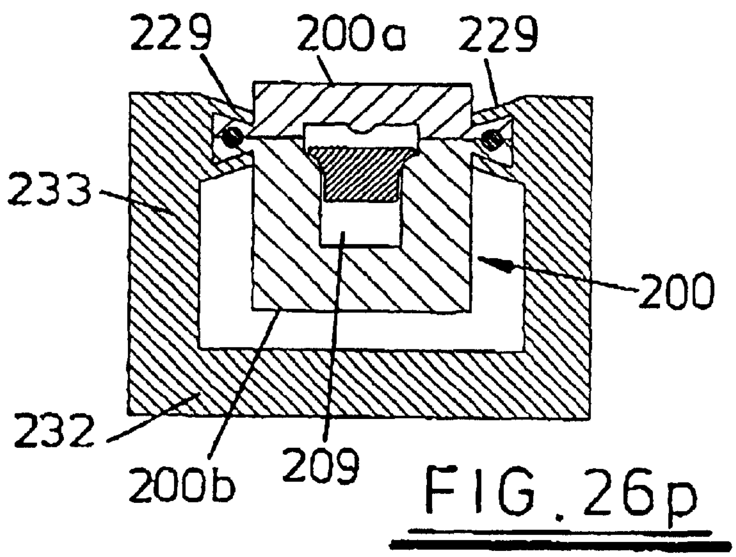
Figure 26Q:
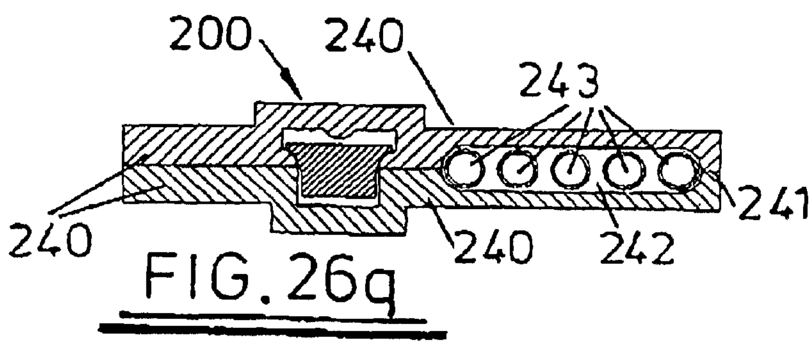
Figure 27A:
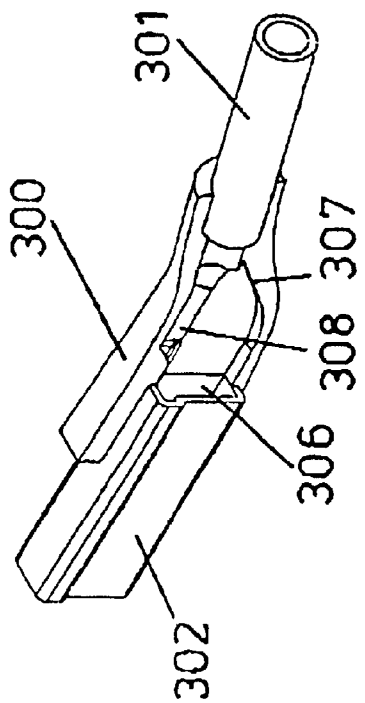
Figure 27B:
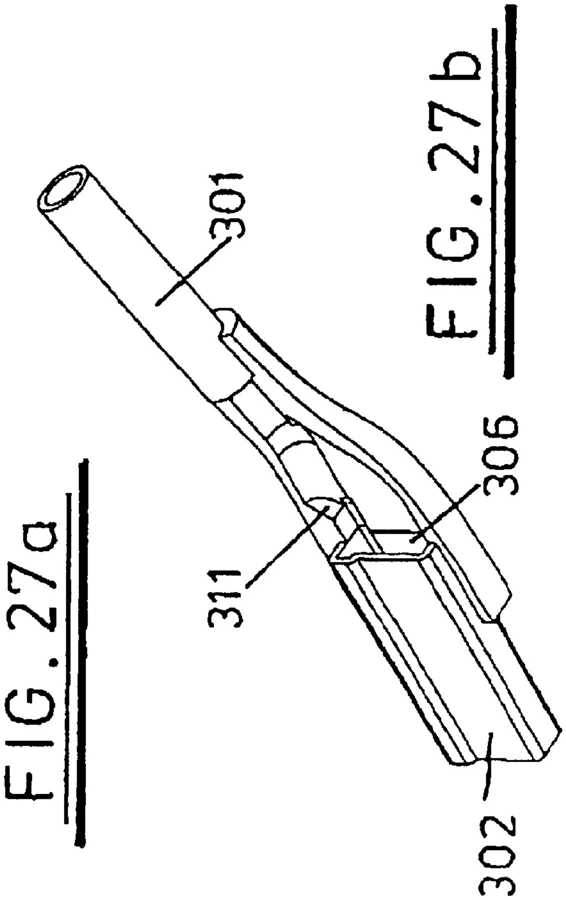
Figure 27C:
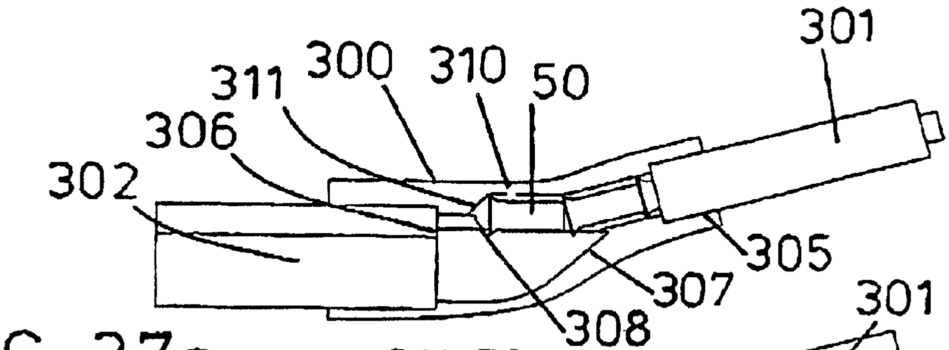
Figure 27D:
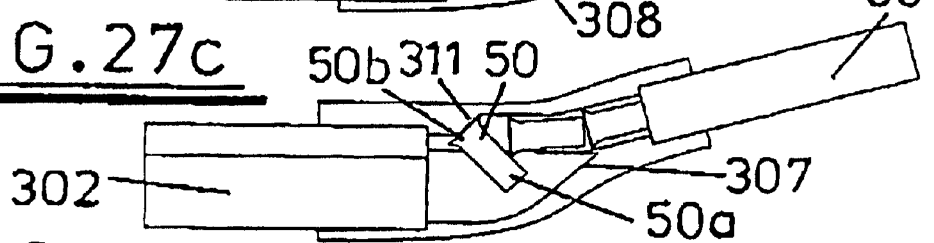
Figure 27E:
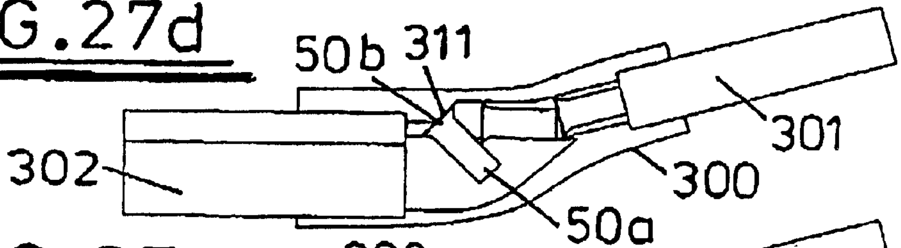
Figure 27F:
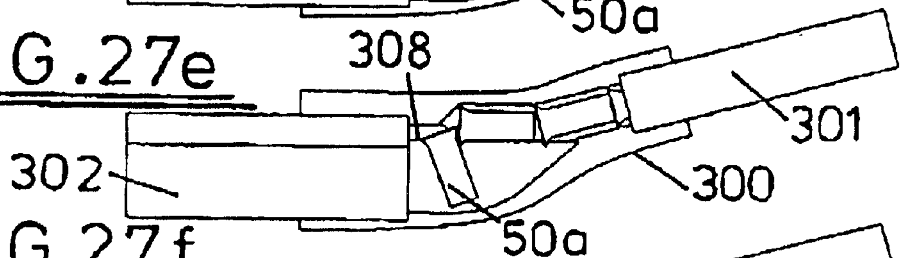
Figure 27G:
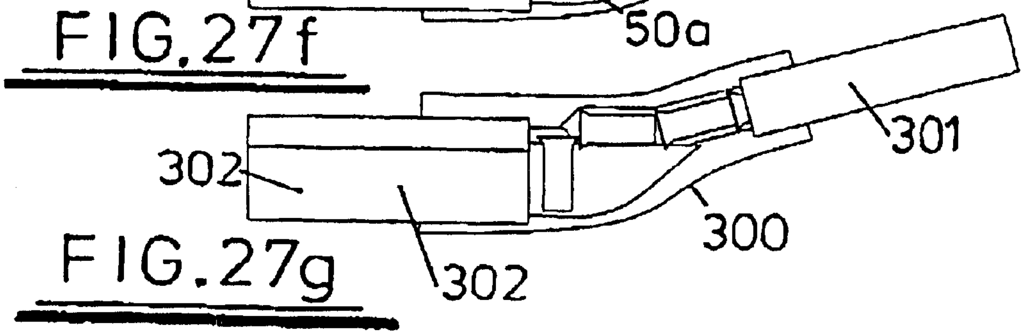
Figure 28B:
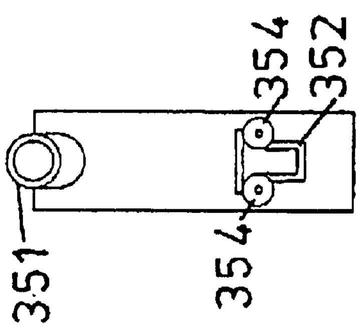
Figure 27I:
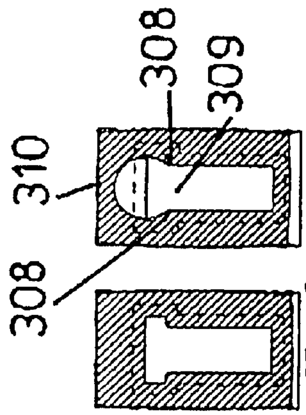
Figure 28A:
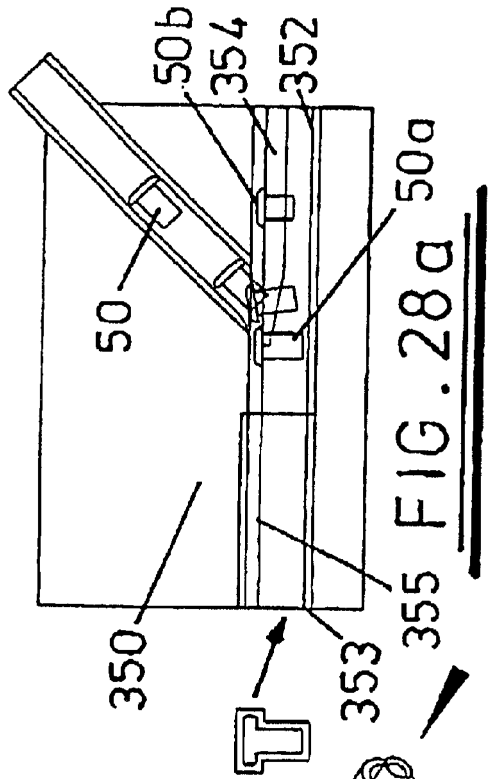
Figure 27H:
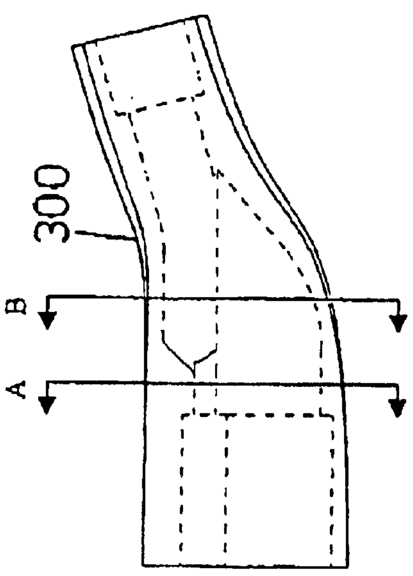
Figure 27J:
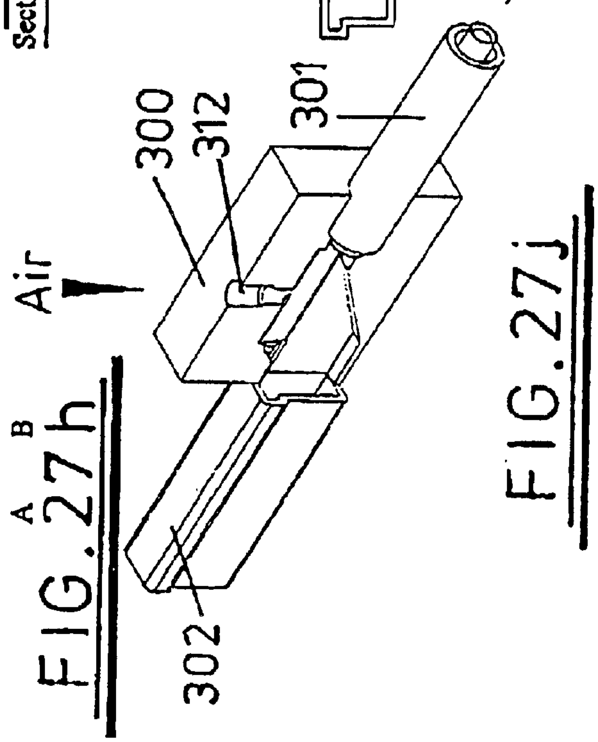

FIGS. 25*a* and 25*b* show an alternative embodiment of the docking interface of FIG. 24 in disengaged and engaged configurations respectively;

FIGS. 26*a* to 26*q* are cross-sectional views through various alternative embodiments of a rivet delivery tube in accordance with an aspect of the present invention;

FIGS. 27*a* to 27*b* are perspective views of an adapter delivery tube part cut away, the adapter being one aspect of the present invention;

FIGS. 27*c* to 27*g* are side sectioned views of the adapter;

FIGS. 27*h* to 27*j* are side/and sectioned views of the adapter delivery tube;

FIG. 28*a* is a sectioned side view of an alternative adapter delivery tube embodiment;

FIG. 28*b* is an end view of the tube of FIG. 28*a;*

Figure 29:
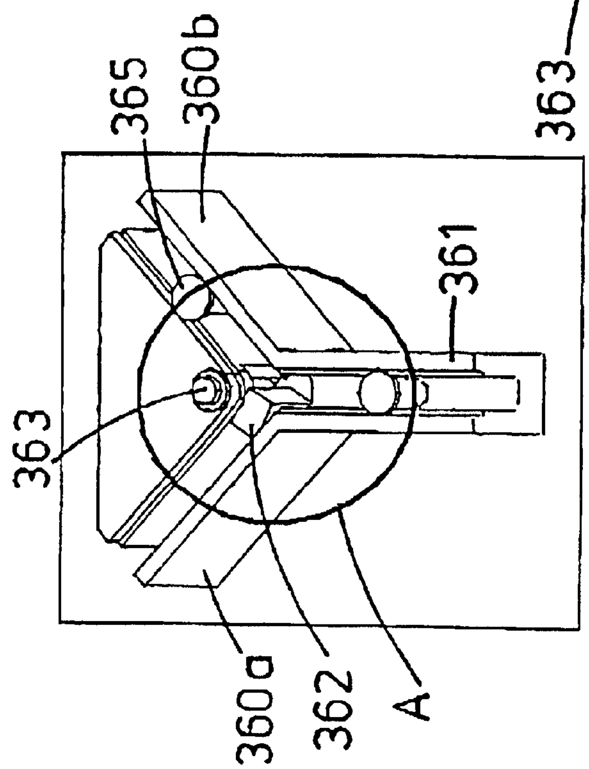
Figure 30:
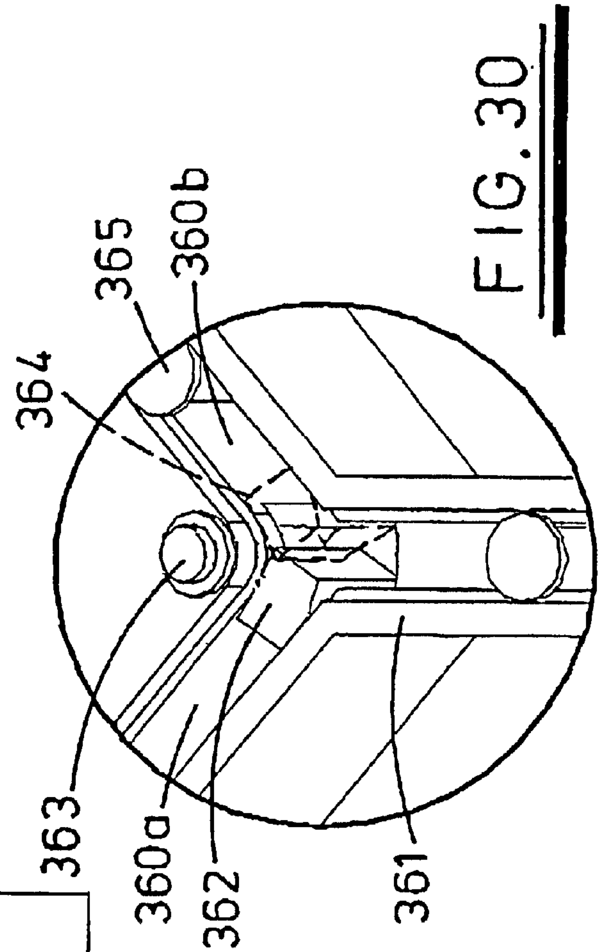
Figure 31:
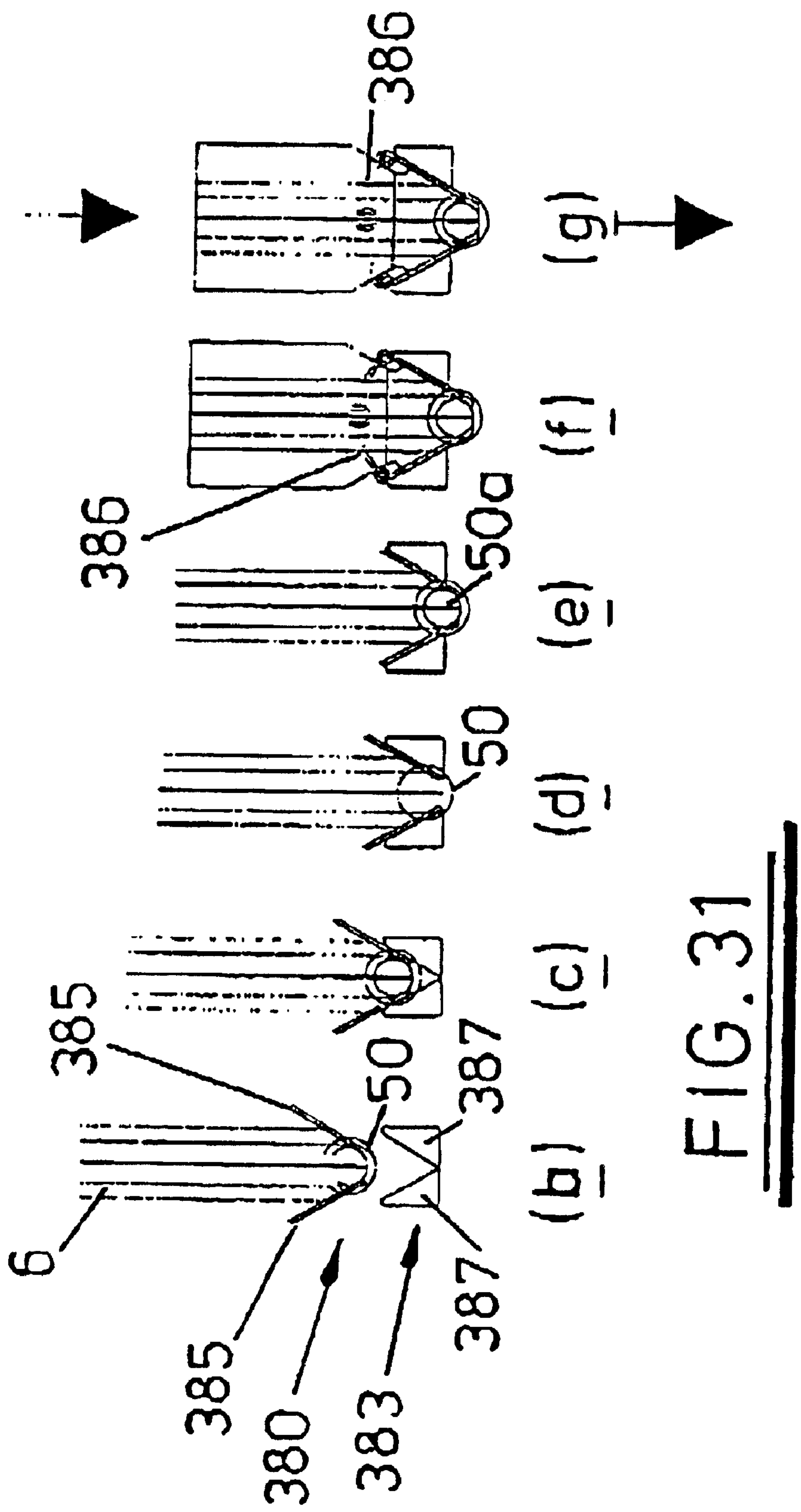
Figure 31B:
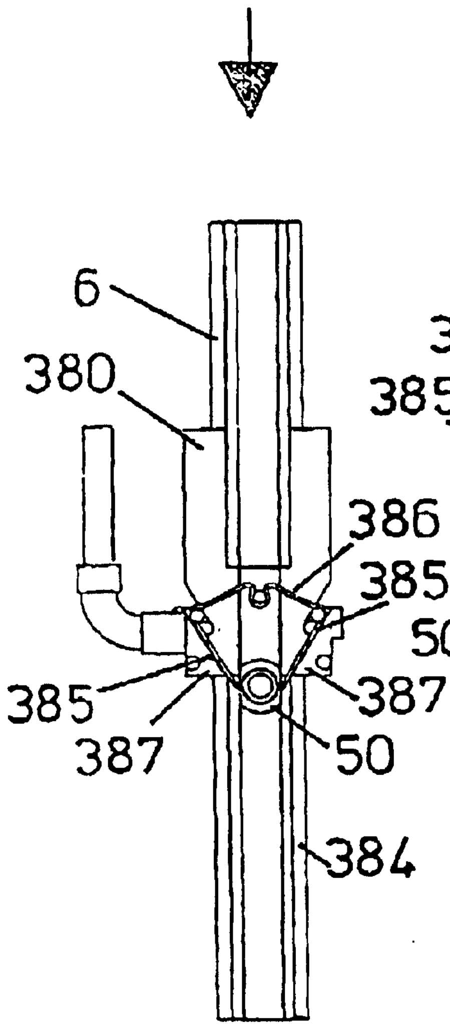
Figure 31A:
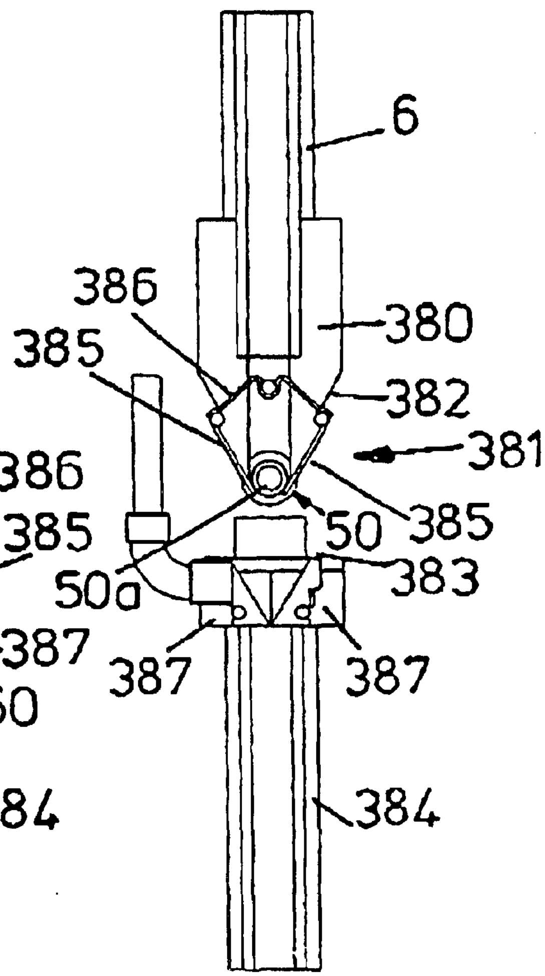
Figure 32:
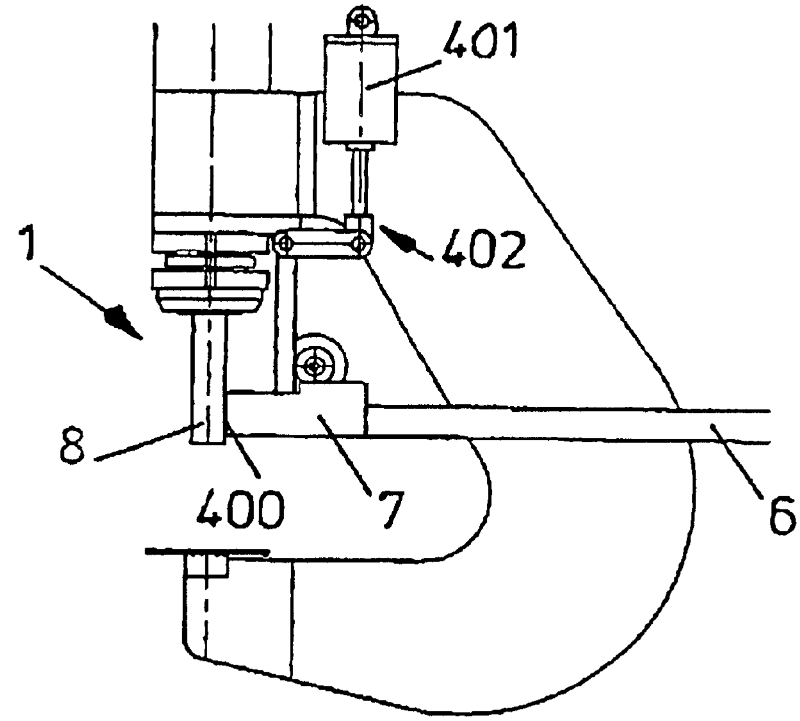
Figure 33:
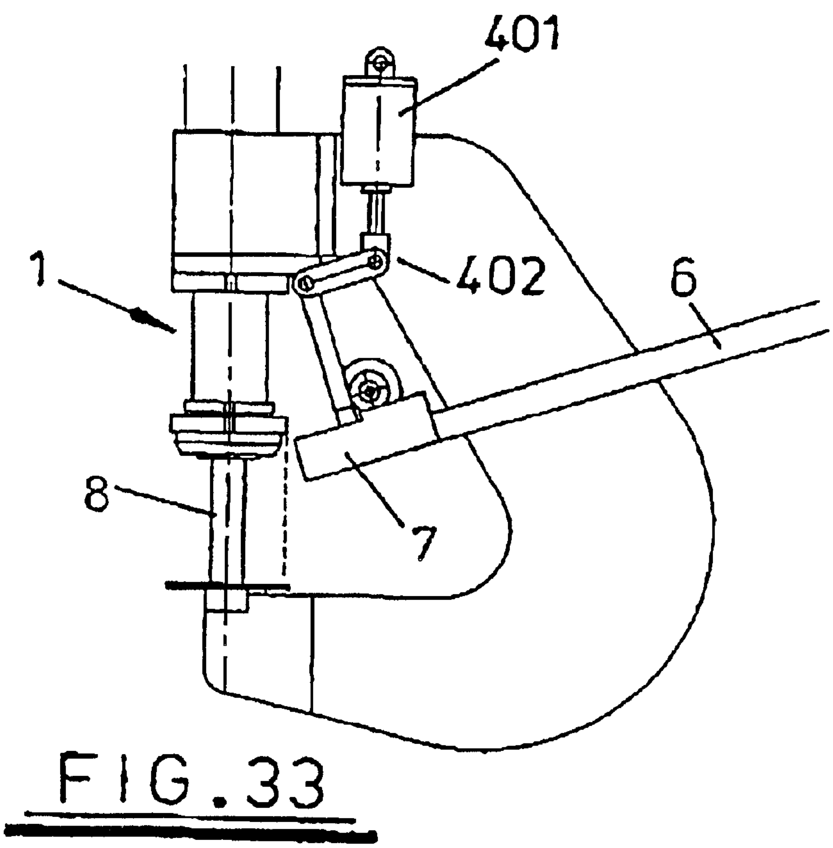
Figure 34:
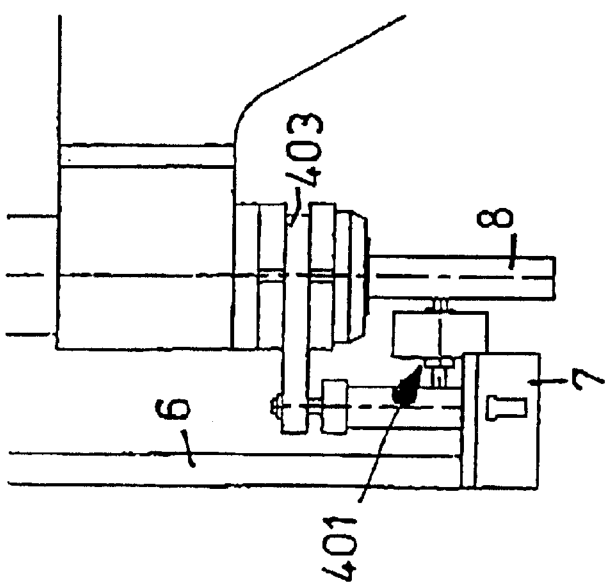
Figure 35:
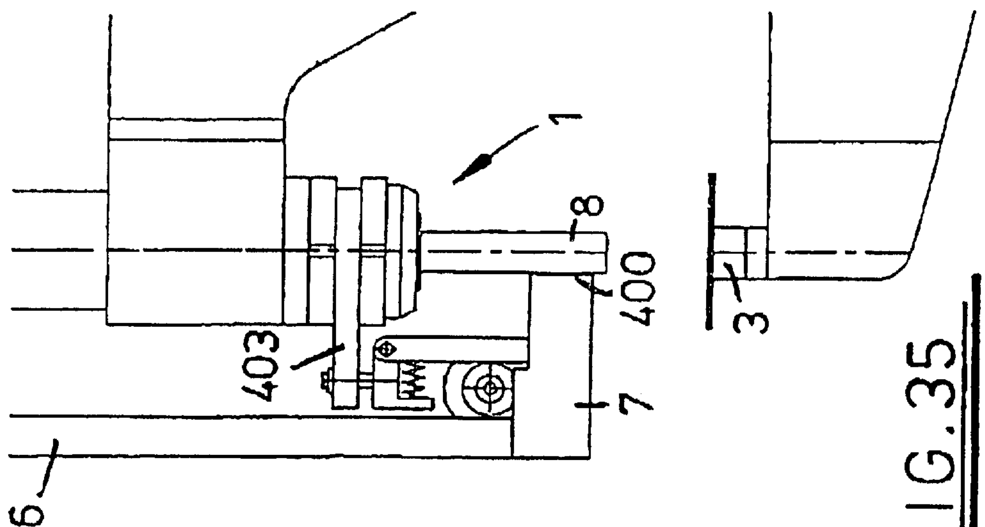
Figure 36A:
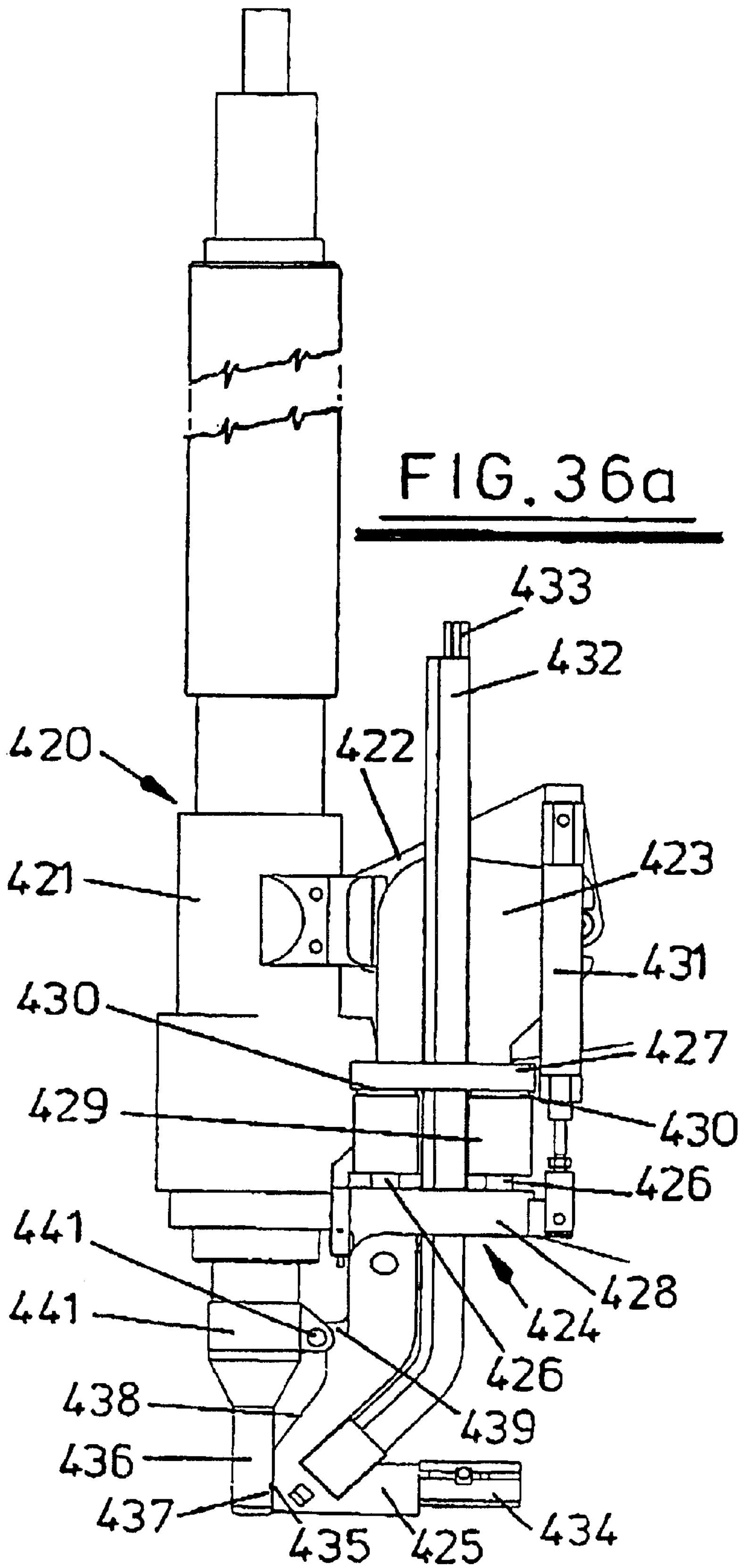
Figure 36B:
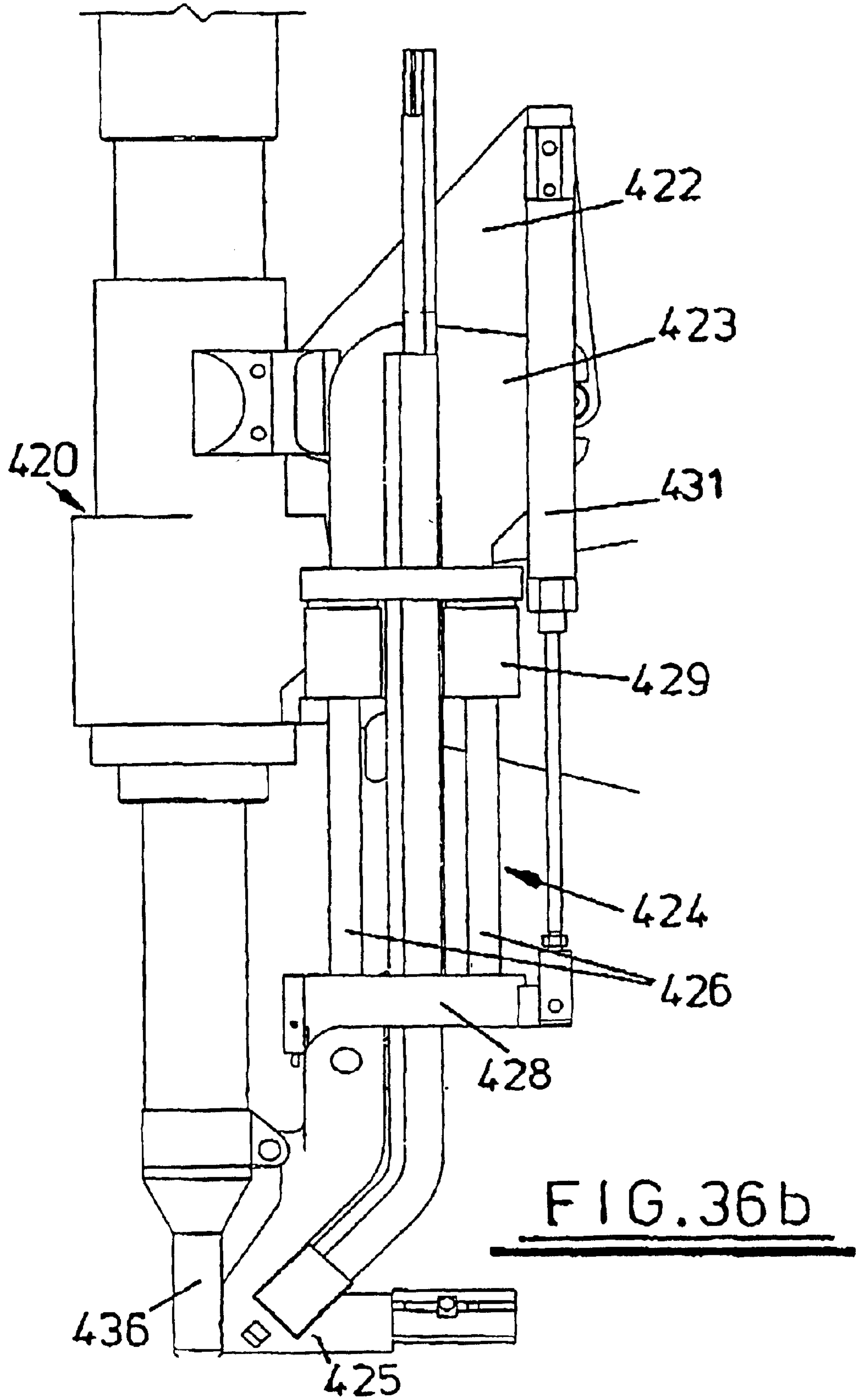
Figure 36C:
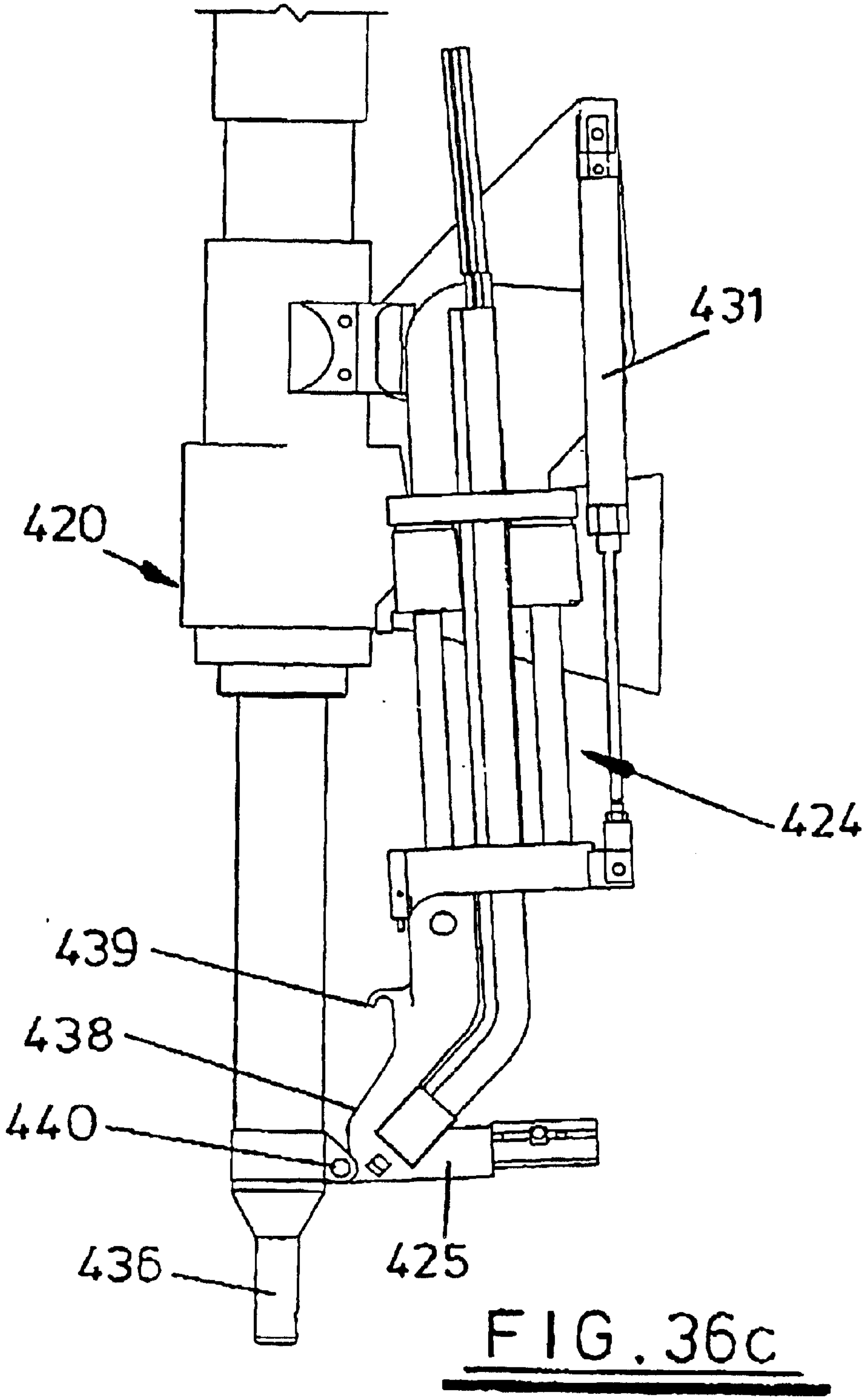
Figure 36D:
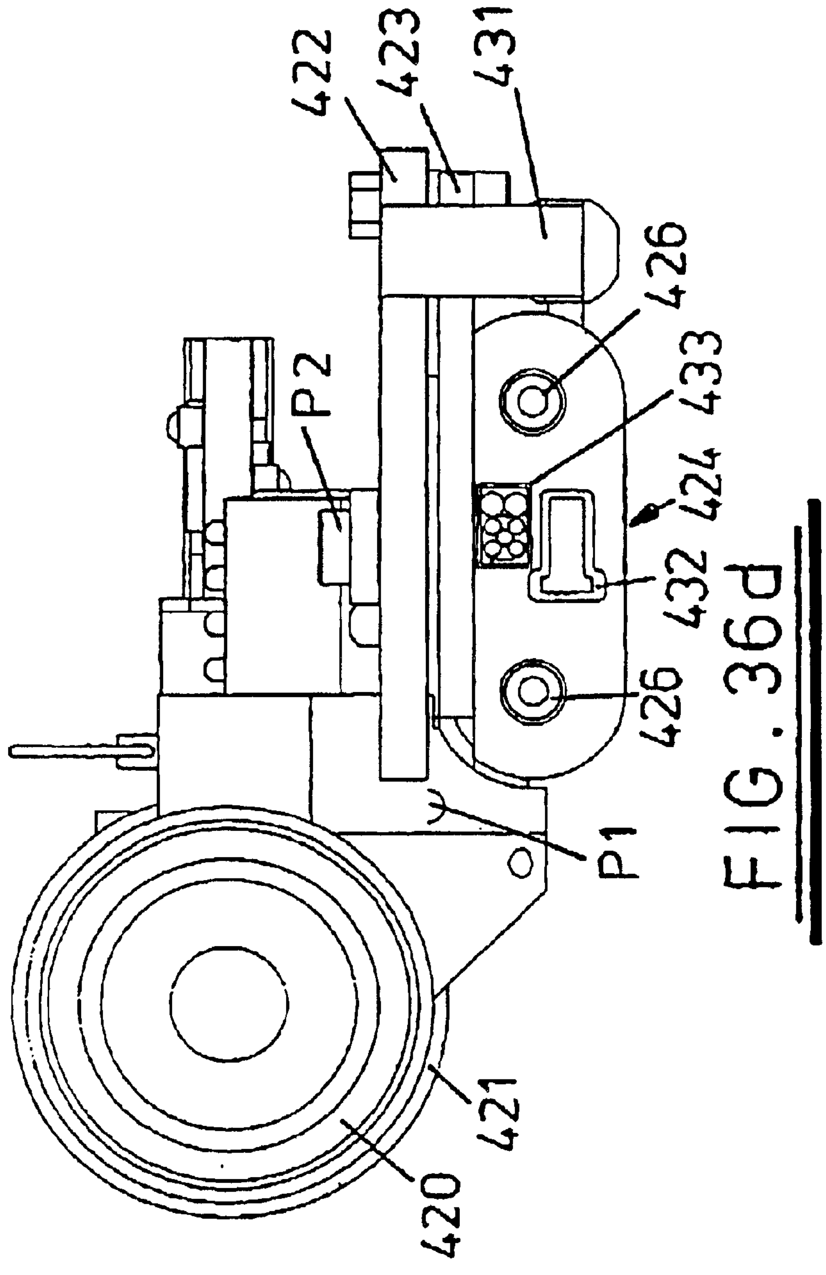

FIG. 29 is a plan view of a dual entry delivery tube according to one aspect of the present invention;

FIG. 30 is a close up view of part of the delivery tube of FIG. 29;

FIGS. 31, and 31*a* to 31*b* show, in schematic plan view, a docking station for connecting a delivery tube to a buffer magazine in accordance with an aspect of the present invention, and the sequence of steps for transferring a rivet across the station;

FIGS. 32 and 33 are schematic side views of an embodiment of a setting tool with detachable transfer station in accordance with an aspect of the present invention;

FIGS. 34 and 35 are schematic side views of an alternative embodiment of a setting tool with detachable transfer station in accordance with an aspect of the present invention;

FIGS. 36*a* to 36*c* are side views of a further alternative embodiment of a setting tool with detachable transfer station in accordance with an aspect of the present invention, shown in three different positions;

FIG. 36*d* is a plan view of the embodiment of FIG. 36*a;*

Figure 37A:
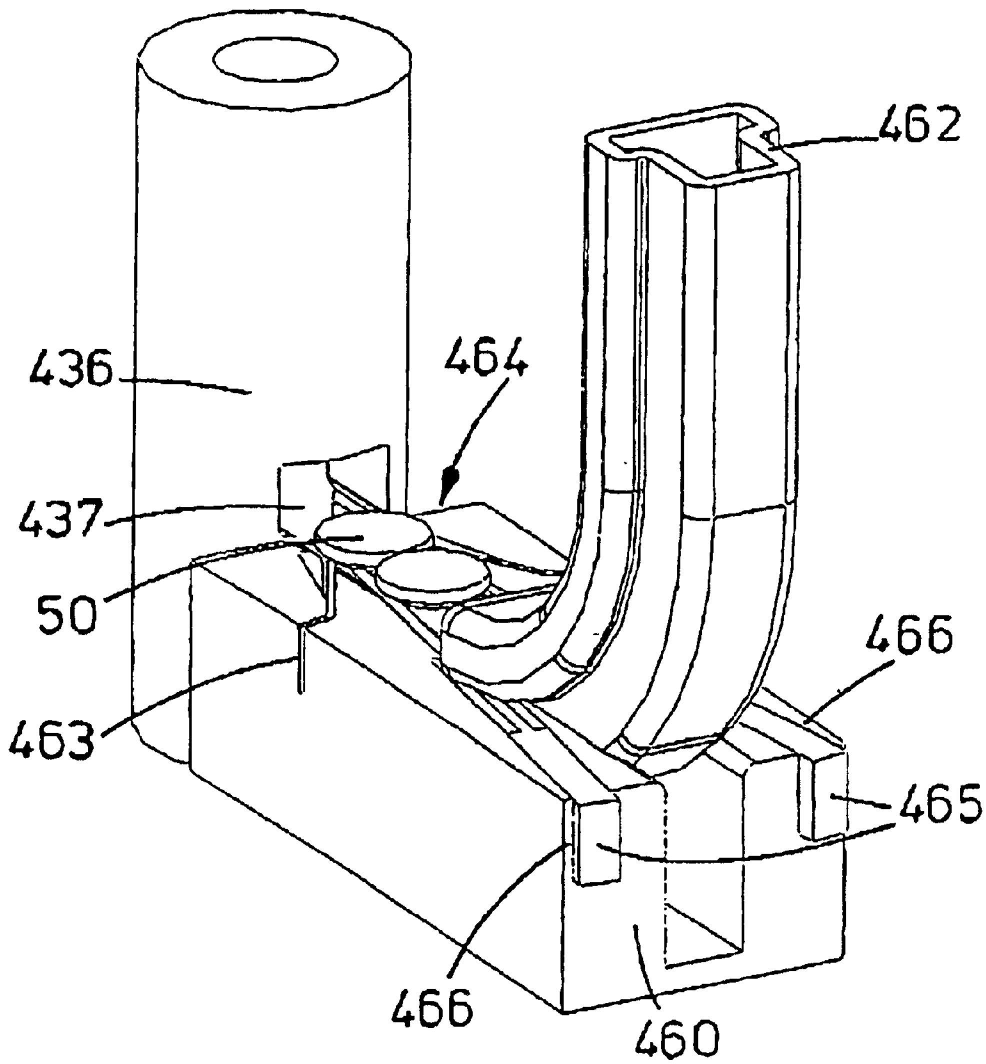
Figure 37B:
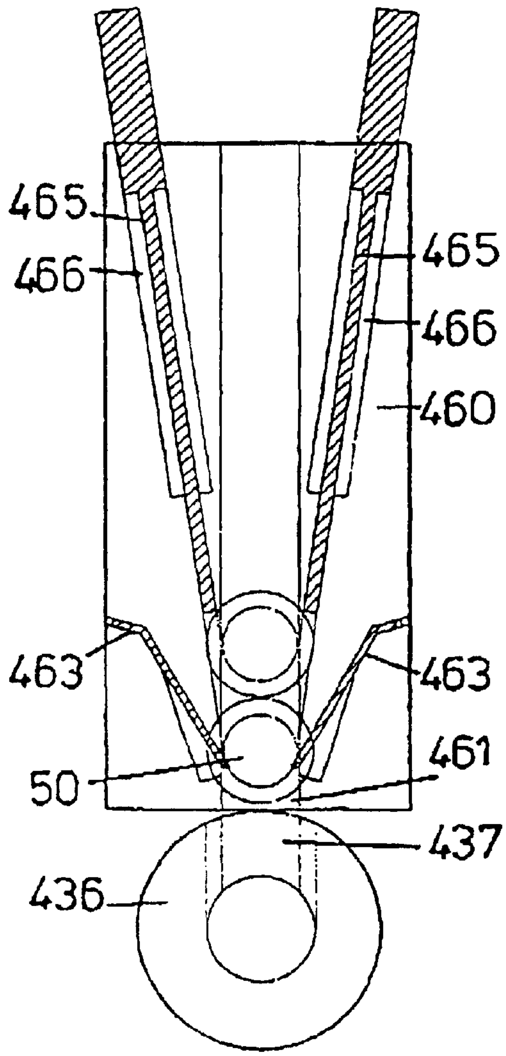
Figure 37C:
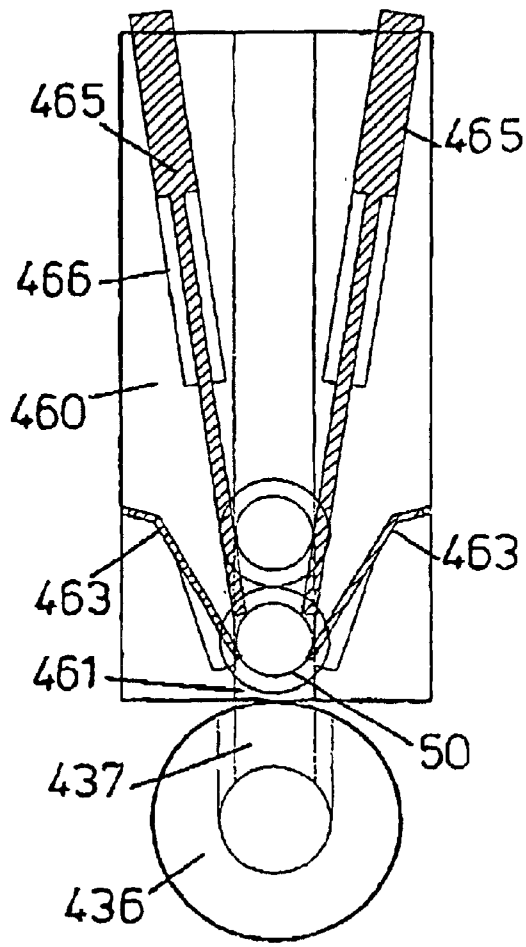
Figure 37D:
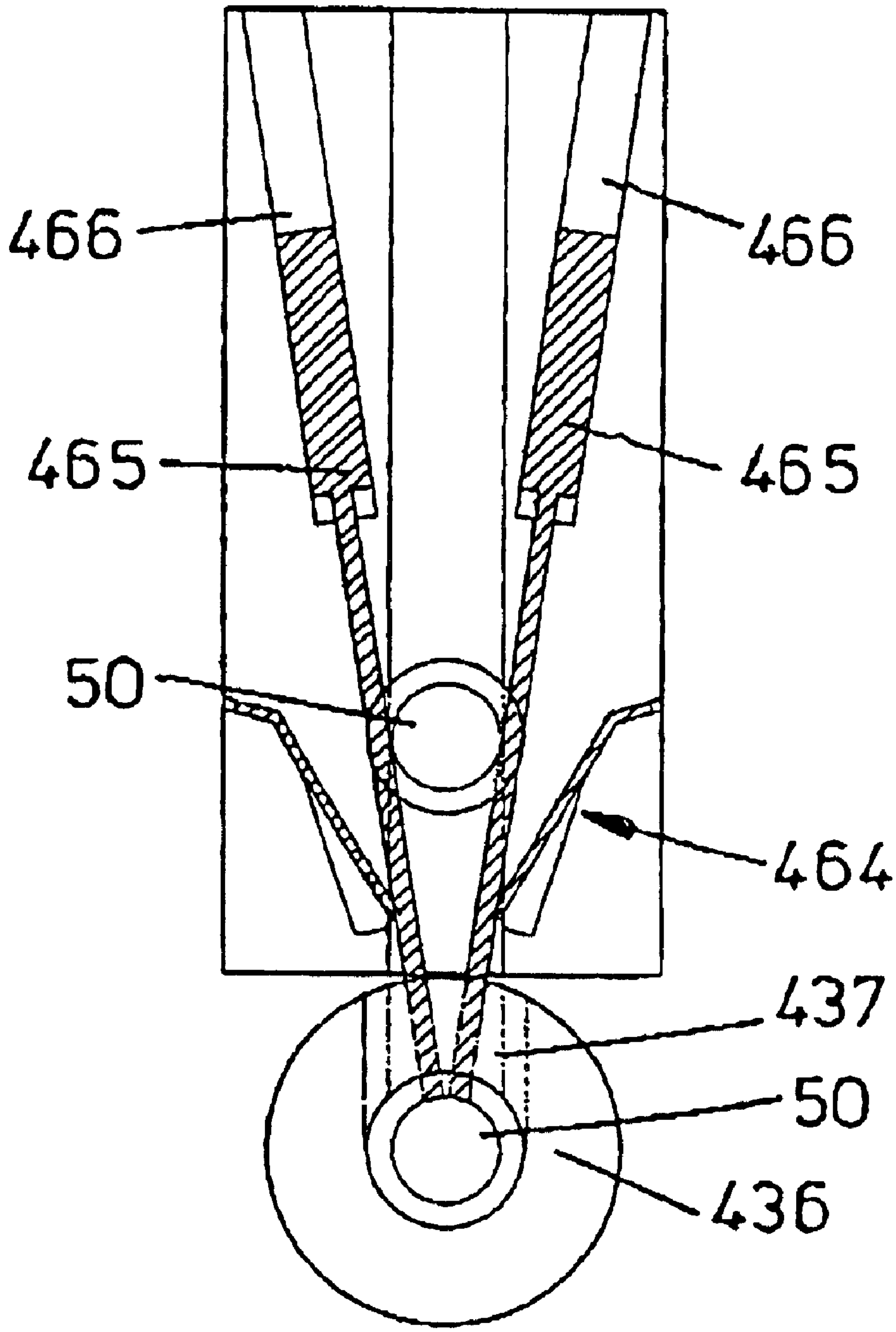
Figures 38A, 38B:
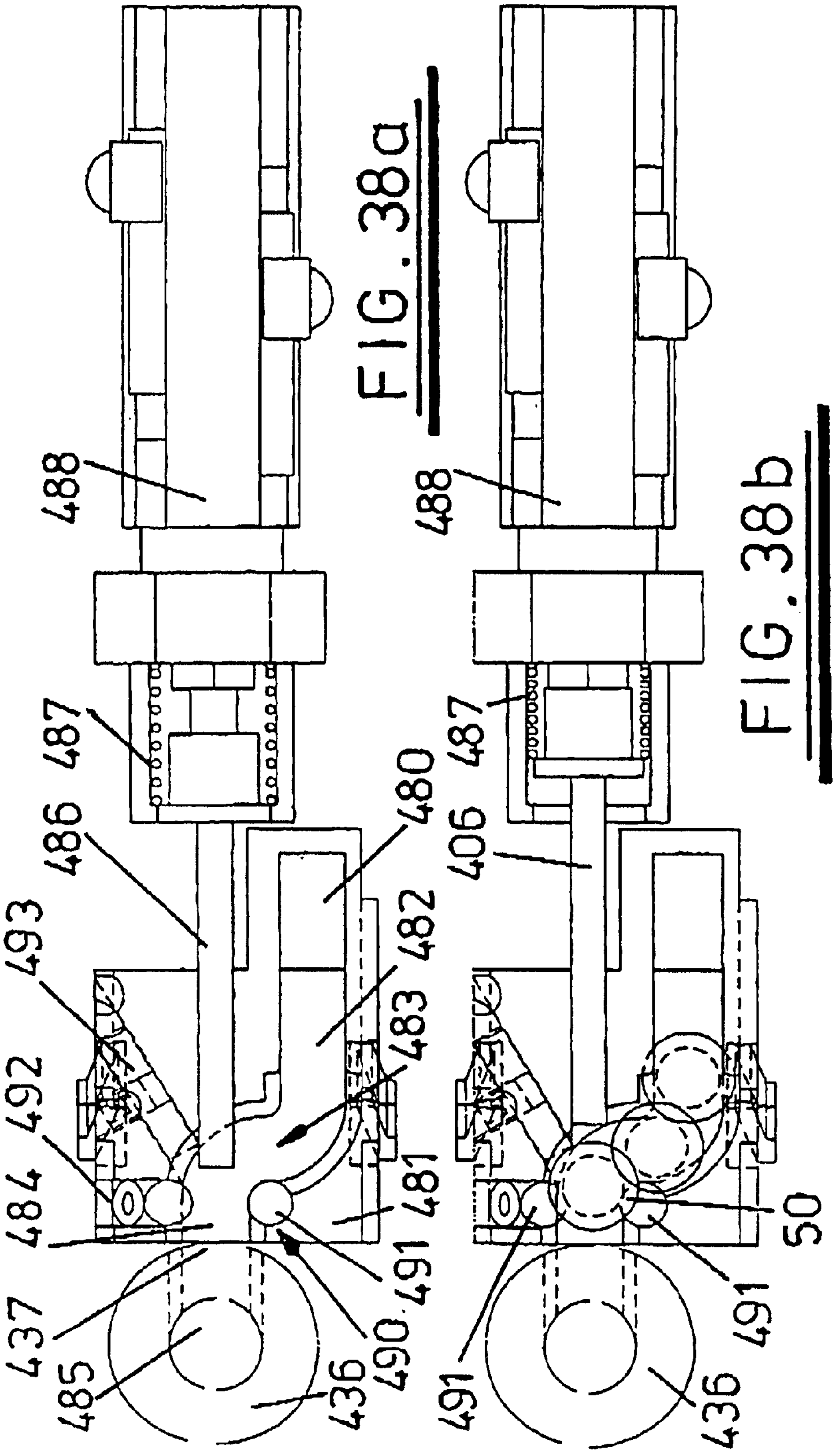
Figure 38C:
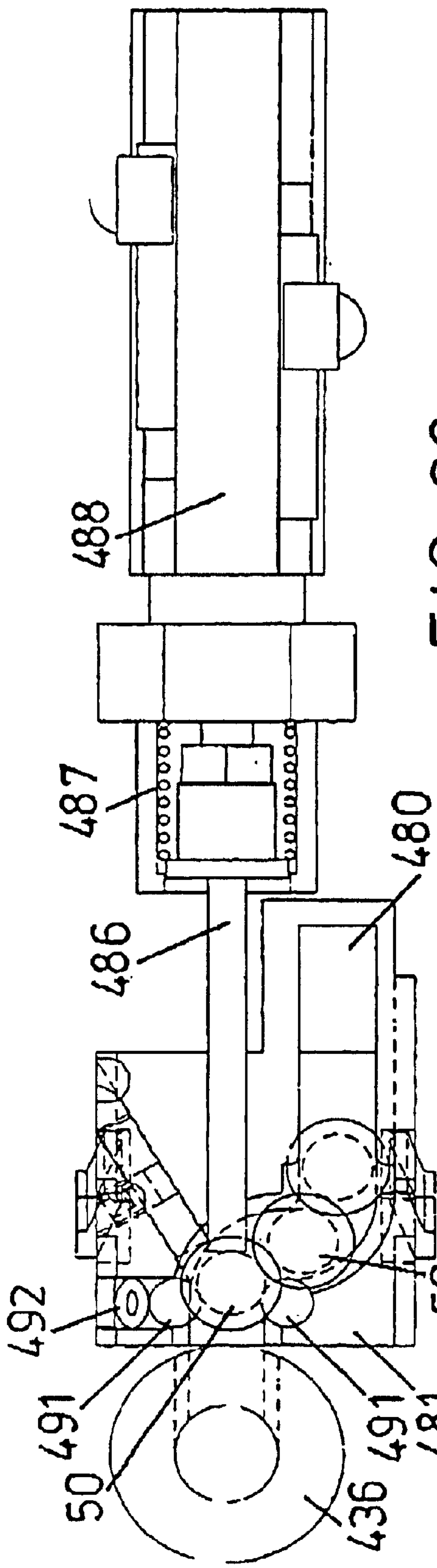
Figure 38D:
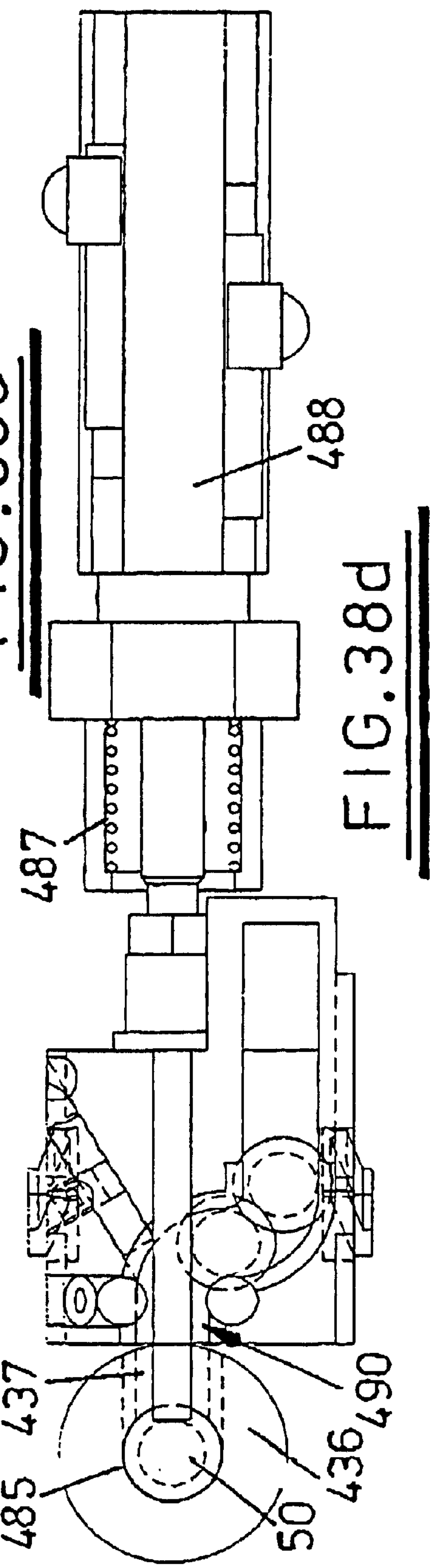
Figure 38E:
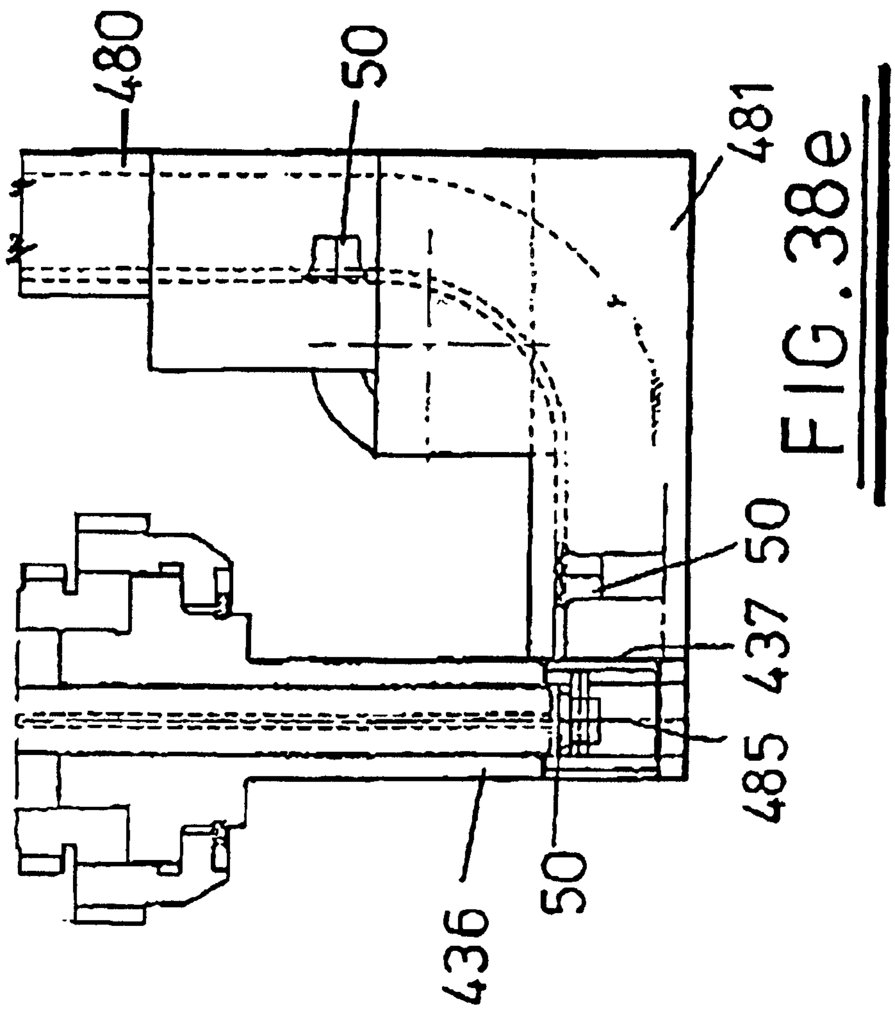

FIG. 37*a* is a perspective view of a pusher assembly of a transfer station shown with a rivet setting tool nose in accordance with an aspect of the present invention;

FIGS. 37*b* to 37*d* are plan views of the assembly of FIG. 37*a* with rivet delivery tube removed for clarity;

FIGS. 38*a* to 38*d* are sectioned plan views through an alternative embodiment of a transfer station in accordance with an aspect of the present invention;

FIG. 38*e* is a side sectioned view of the transfer station of FIGS. 38*a* to 38*d;*

FIG. 39*a* is a side sectioned view of an alternative embodiment of a transfer station in accordance an aspect of the present invention at the beginning of a rivet delivery cycle;

FIG. 39*b* is a part sectioned end view of the station of FIG. 39*a;*

FIG. 39*c* is a plan view of the station of FIG. 39*a;*

Figure 39:
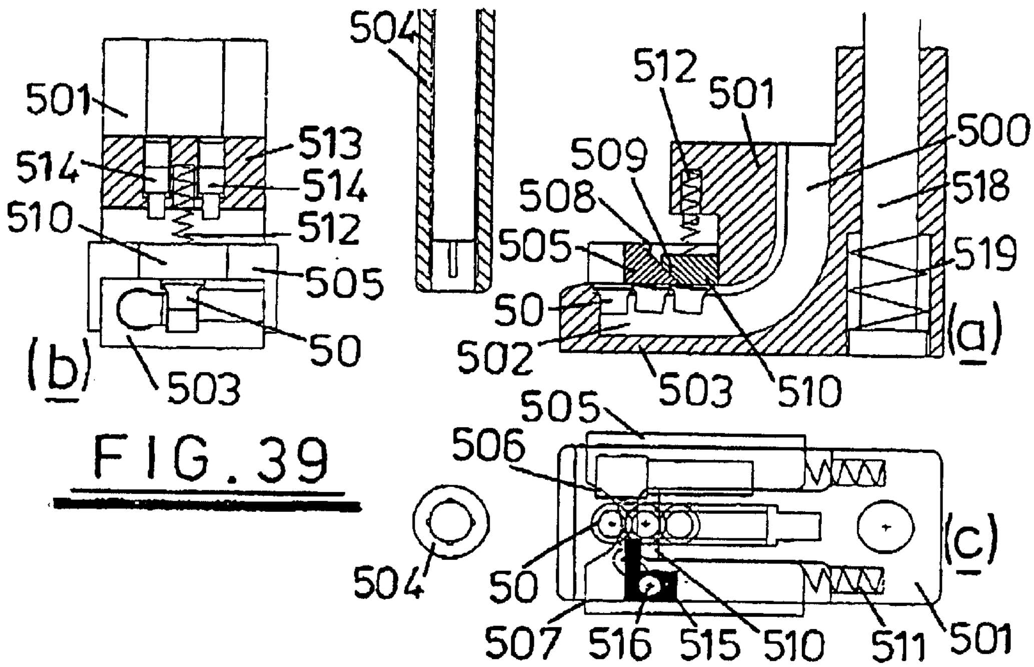
Figure 40:
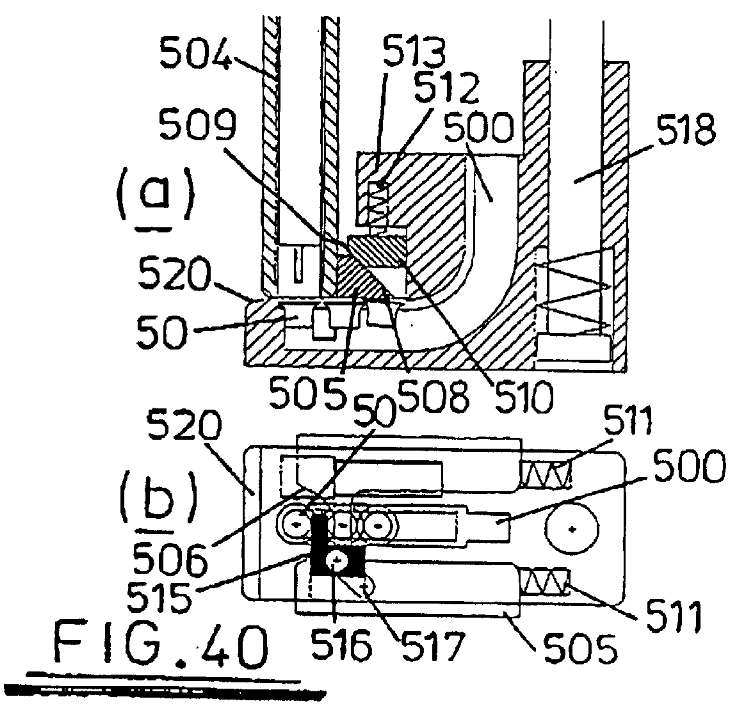
Figure 41:
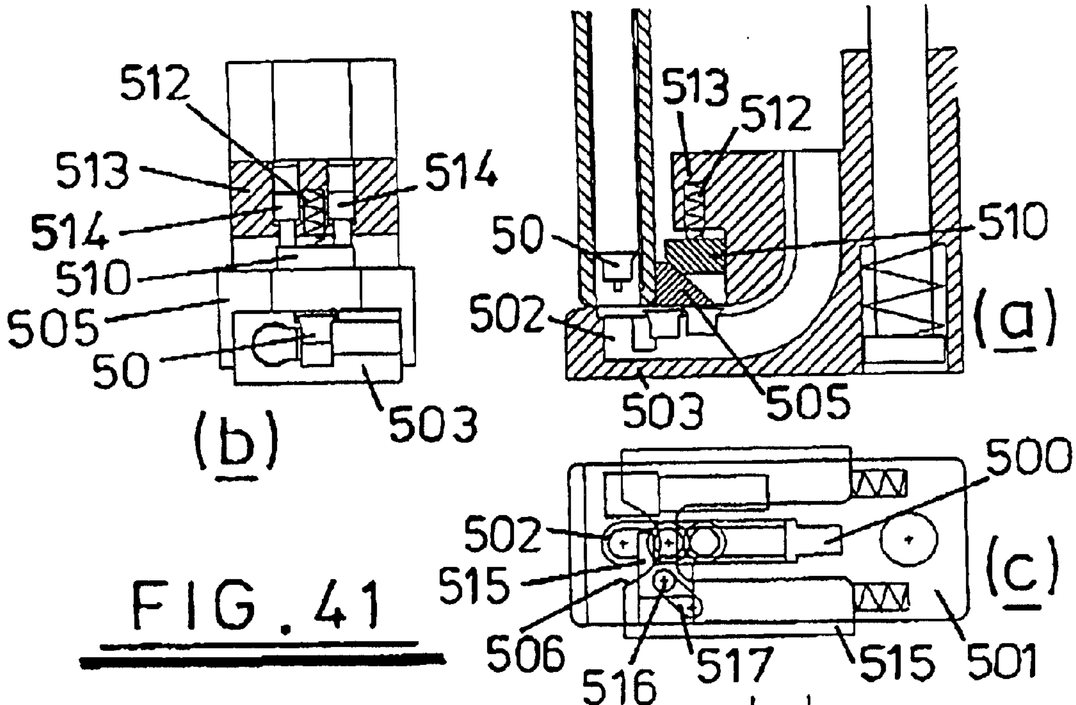
Figure 42:
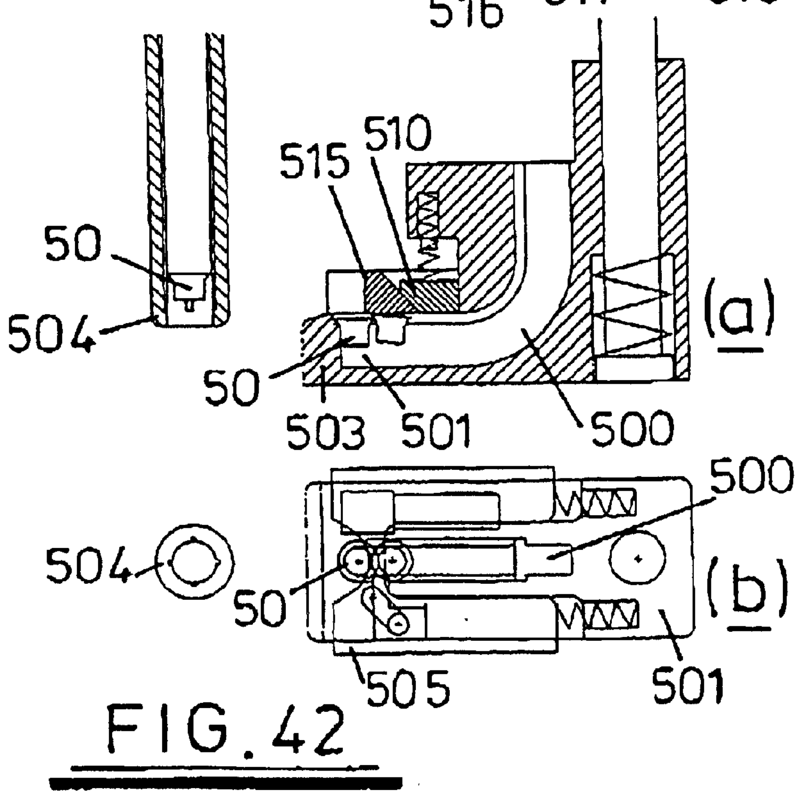
Figure 43:
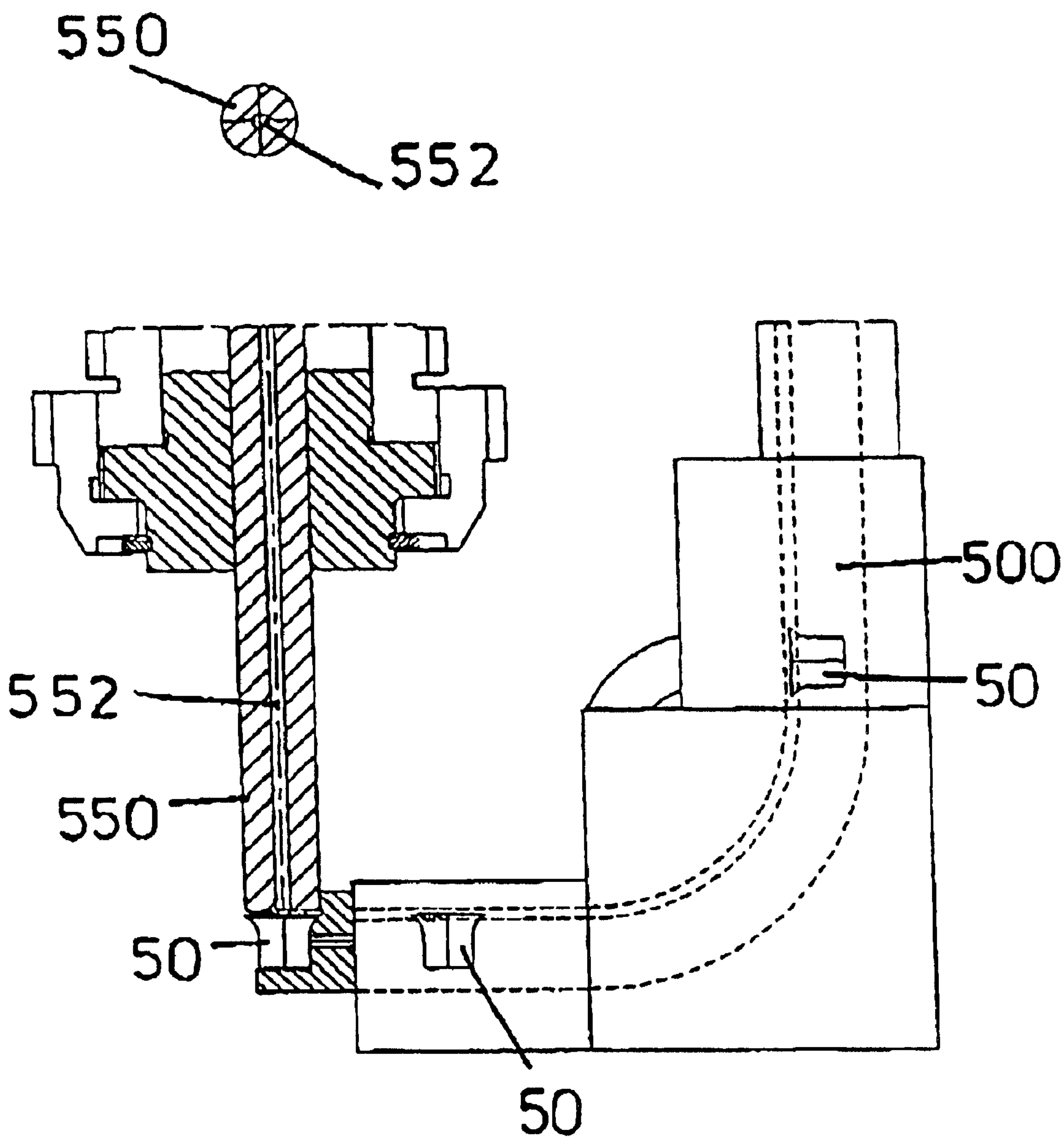
Figure 45A:
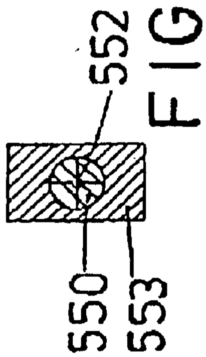
Figure 45:
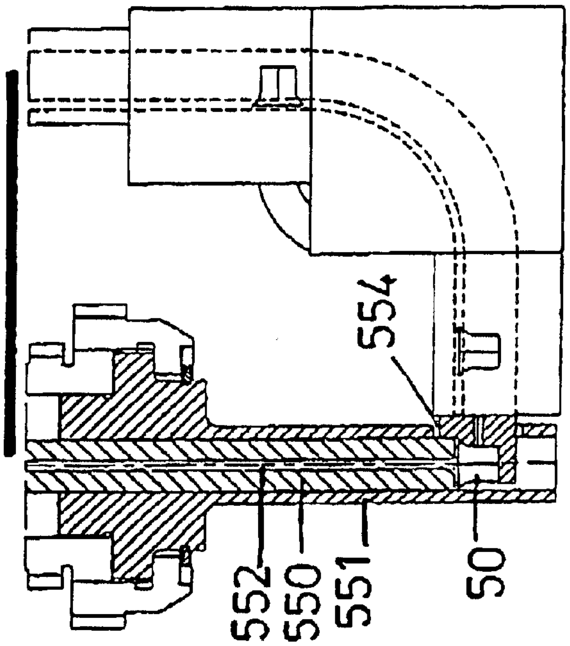
Figure 44A:
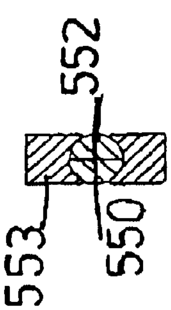
Figure 44:
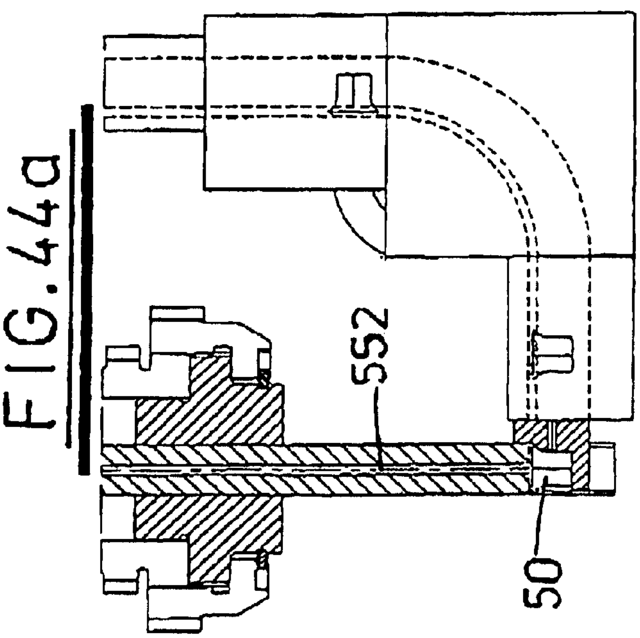
Figure 55:
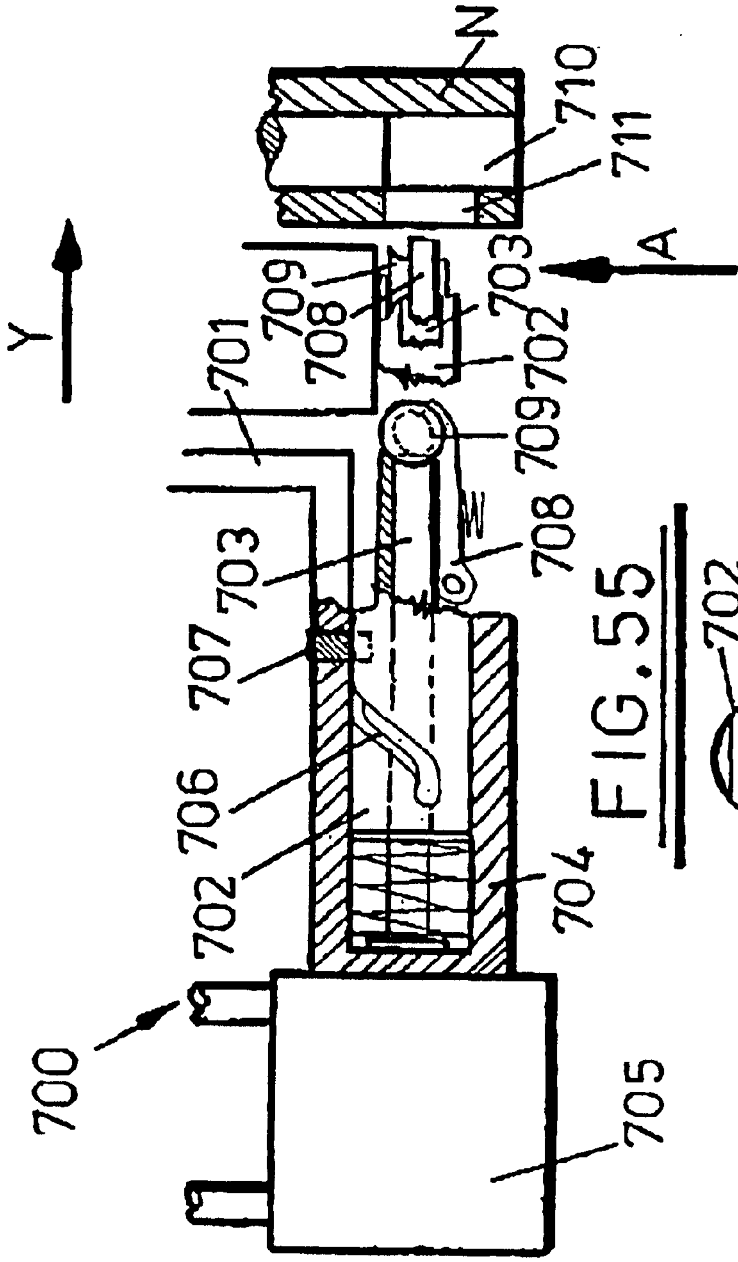
Figure 56:
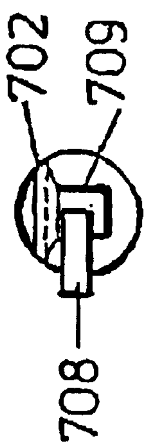
Figure 57:
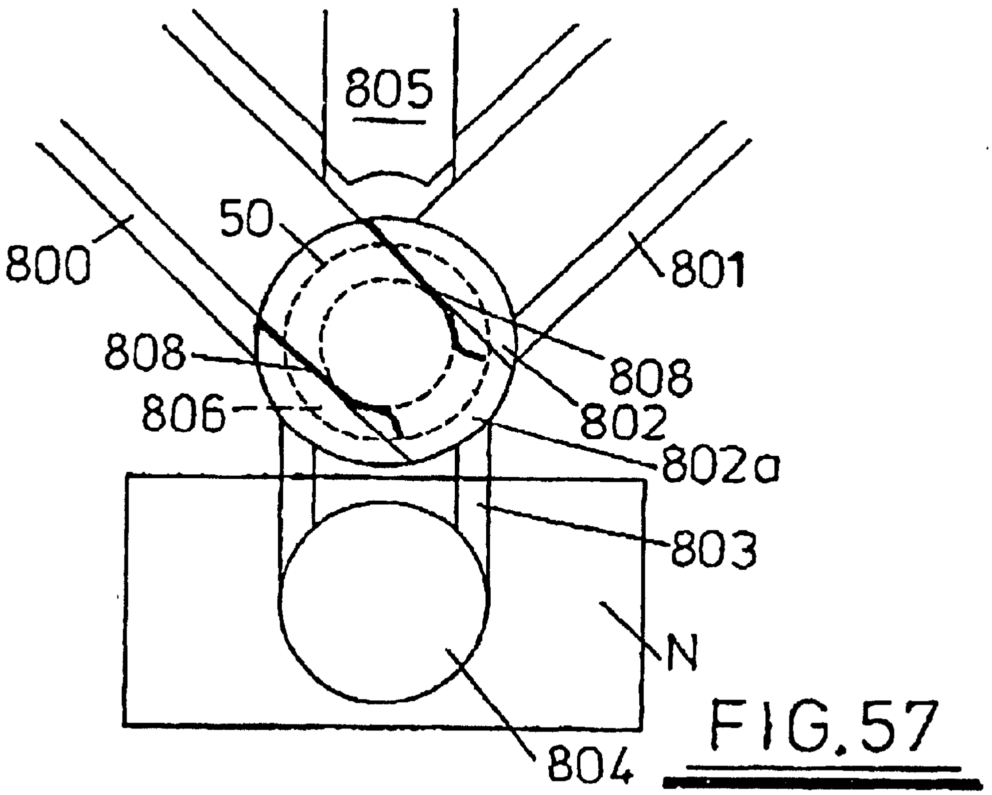
Figure 58:
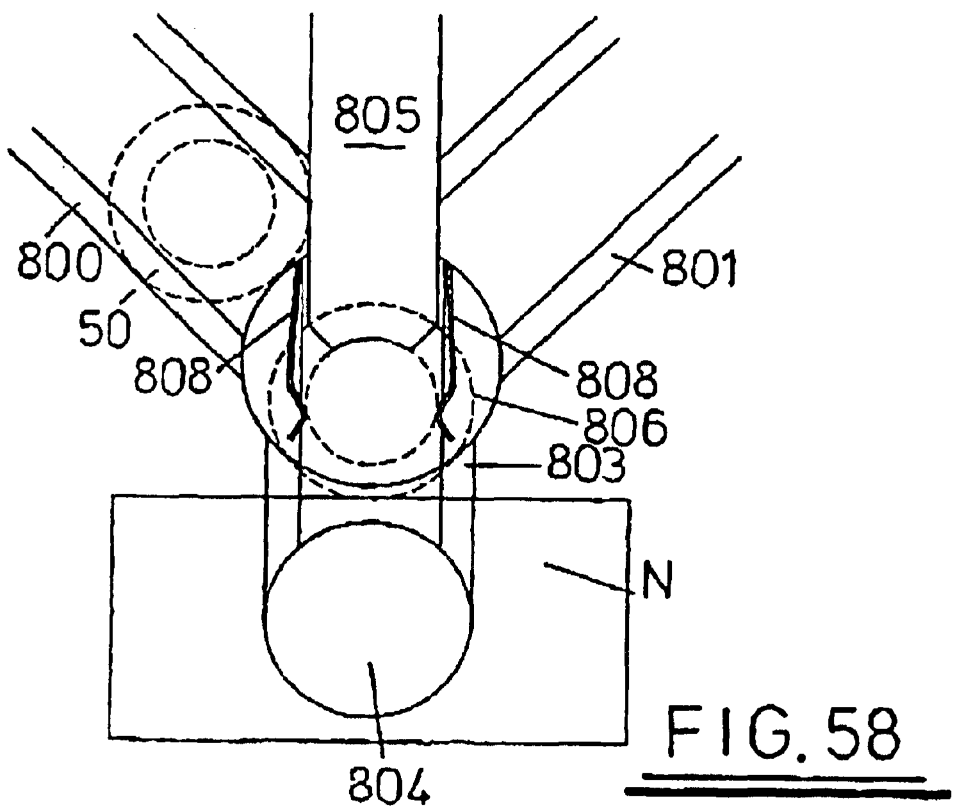
Figure 60A:
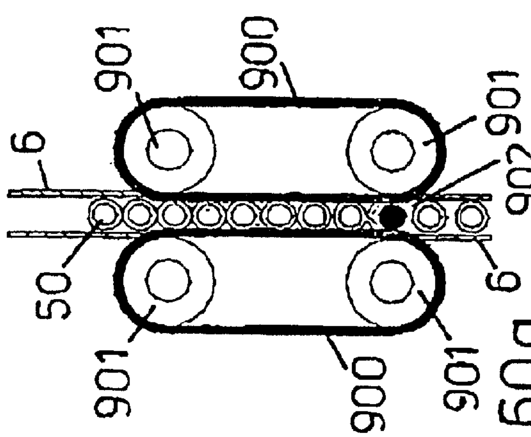
Figure 60B:
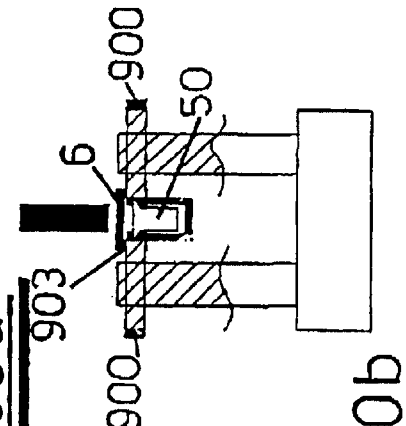
Figure 59A:
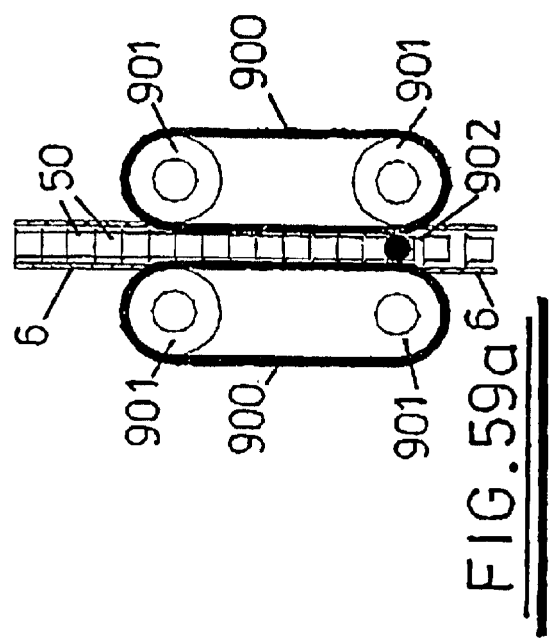
Figure 59B:
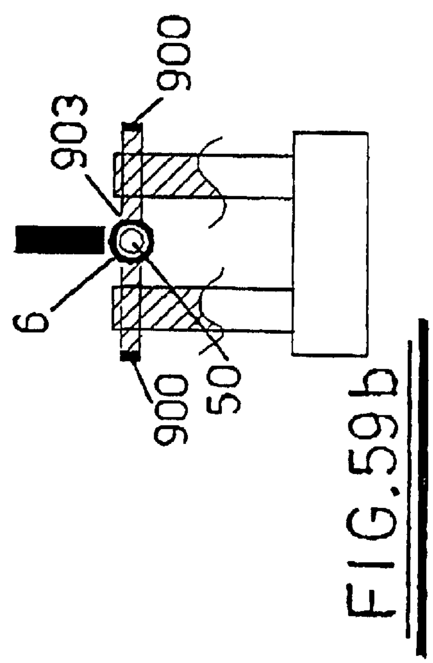

FIGS. 40 to 42 each show views corresponding to those of FIG. 39 and illustrate subsequent steps in the rivet loading cycle;

FIGS. 43 to 45 are part-sectioned side views of alternative embodiments of the transfer station of FIG. 39;

FIGS. 46 to 53 are part sectioned side views of a further alternative embodiment of a transfer station and the nose of a setting tool in accordance with an aspect of the present invention;

FIGS. 54*a* to 54*d* are schematic views of a modified rivet retaining device for use in the transfer station of FIGS. 46 to 53;

FIG. 55 is a part sectioned side view of a further embodiment of a transfer station for transferring a rivet from a delivery tube to a nose of a setting tool;

FIG. 56 is a view in the direction of arrow A of FIG. 59;

FIGS. 57 and 58 are plan views of a multiple entry transfer station with a rotary gate;

FIGS. 59*a* and 59*b* are respectively plan and end views of an escapement device for a round cross-section delivery tube, in accordance with an aspect of the present invention;

FIGS. 60*a* and 60*b* are respectively plan and end views of an escapement device for a T-shaped cross-section delivery tube, in accordance with an aspect of the present invention; and FIGS. 61 to 64 are sectioned plan views of an alternative escapement device in accordance with an aspect of the present invention.

Figure 1:
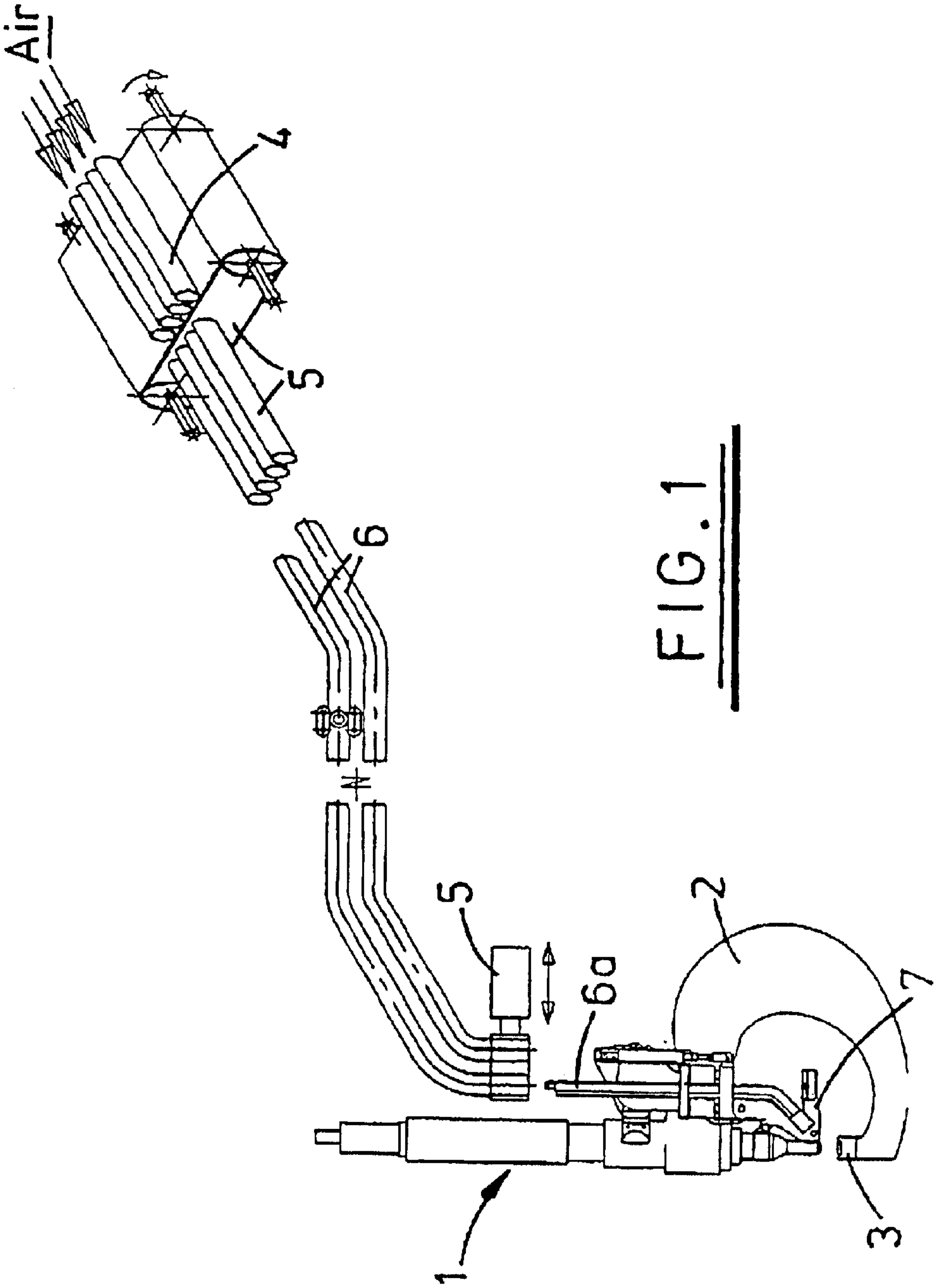
FIG. 1 is a schematic view of a riveting machine including a rivet setter and rivet feed system in accordance with the present invention.

Referring now to the drawings, FIG. 1 shows a fastening machine and fastener delivery apparatus that comprises a rivet setting tool 1 mounted on a conventional C-frame 2 above a rivet upsetting die 3. Rivets are presented to the machine in the form of one or more containers or packages 4 (several shown schematically in FIG. 1 on an endless loop conveyer).

A rivet feed mechanism 5, disposed adjacent the containers 4, serves to permit selected rivets to escape from the containers in sequence into one or more delivery tubes 6 by which they are transported to the setting tool 1. A typical means of transport is by blowing compressed air along the delivery tube to propel the rivet therealong. At the setting tool end of the delivery tube 6 the rivets are captured by a transfer station 7 which serves to transfer the rivets individually to the nose 8 of the setting tool 1 and to ensure that each rivet is in correct alignment with a punch (hidden) prior to insertion of the rivet into a workpiece.

The delivery tube(s) 6 may be permanently attached to the rivet setting tool 1 or alternatively in some instances it is desirable for the delivery tube 6 to be disconnectable from the rivet setting tool 1 during the riveting work cycle. Delivery tubes are delicate and susceptible to kinking and entrapment or entanglement with other fixtures when the tool is manipulated (manually or automatically) in all three axes of movement. The rivet setting tool 1 may thus have one or more buffer magazines 6*a* attached thereto intermediate the, delivery tube 6 and the nose 8 to permit a plurality of fasteners to be held and/or delivered at once. The buffer magazine 6*a* allows the rivet setting tool 1 to perform a cycle of riveting processes without waiting for the connection of the delivery tube 6, delivery of the rivet and disconnection of the tube. Periodically between work cycles the buffer magazine 6*a*can be refilled by docking with the delivery tube 6 and effecting transfer of rivets from the container 4. The buffer magazine 6*a* may be permanently attached to the, setting tool 1 and re-loadable via the delivery tube 6 or, alternatively, when empty, the magazine may be exchanged manually or automatically for a full magazine. The buffer magazine 6*a* may comprise a carousel having a plurality of magazine cartridges to allow one to be loaded "off-line" via a delivery tube 6 while another is "live" (i.e. supplying the nose). Examples are described below.

Whether the delivery tube 6 is permanently attached to the rivet setting tool 1 or releasably connectable to a buffer magazine 6*a* at the tool 1, the transfer station 7 is designed to be uncoupled from the nose 8 so as to permit the nose to descend towards the workpiece and die to perform the riveting operation. An example of this arrangement is described in more detail later.

There may be more than one delivery tube 6 connected between the feed mechanism 5 and the transfer station 7 so as to allow different rivet types to be fed into a plurality of separate rivet setting tools operating in parallel. In such an embodiment a shuttle S selects the appropriate delivery tube 6 for connection to the buffer magazine 6. Alternatively, several delivery tubes 6 may be fed to a single transfer station 7 so as to provide a back-up supply in the event that one of the tubes is out of operation (e.g. it becomes blocked).

The delivery tube 6 may have an in-line escapement mechanism I that allows rivets to be buffered at an intermediate location in the delivery tube 6 after the feed mechanism 5. The escapement mechanism I operates to control the delivery of rivets to the tool 1 by allowing escape of the rivets individually as and when required by the tool. This is particularly significant when the tool demands a sequence of rivets of different types. In such a circumstance the escapement mechanism I ensures (in combination with the shuttle S) that only the appropriate rivet types are released in sequence to the tool 1.

Several different embodiments of rivet packaging 4 and release mechanisms 5 will now be described with reference to FIGS. 2 to 25.

Figure 2:
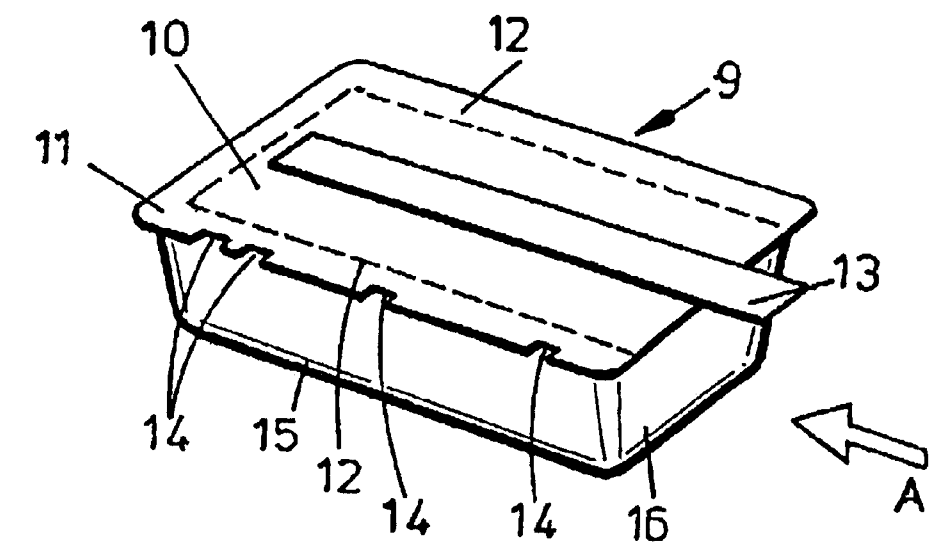
FIG. 2 is a perspective view of a container package of rivets shown without an exterior sleeve.

FIG. 2 shows an example of a rivet container in the form of a transparent plastics, substantially parallelepiped box 9 with a sealed lid 10 on its upper face. The lid 10 of the container has a peripheral lip 11 by which it is located in a loading station (see below) and tear perforations 12 along three sides. The edge of the fourth side has a pull strip 13 so that the lid 10 can be torn away from the rest of the container along the perforations 12. One edge of the lip 11 has a plurality of machine readable notches 14 that represent coded information relating to the contents of the container e.g. rivet type, size etc. A side wall 15 may be embossed with the manufacturer's name and other relevant information and an end face 16 of the container ideally bears a bar code and printed information relating to the rivet part number and the batch number.

Figure 3:
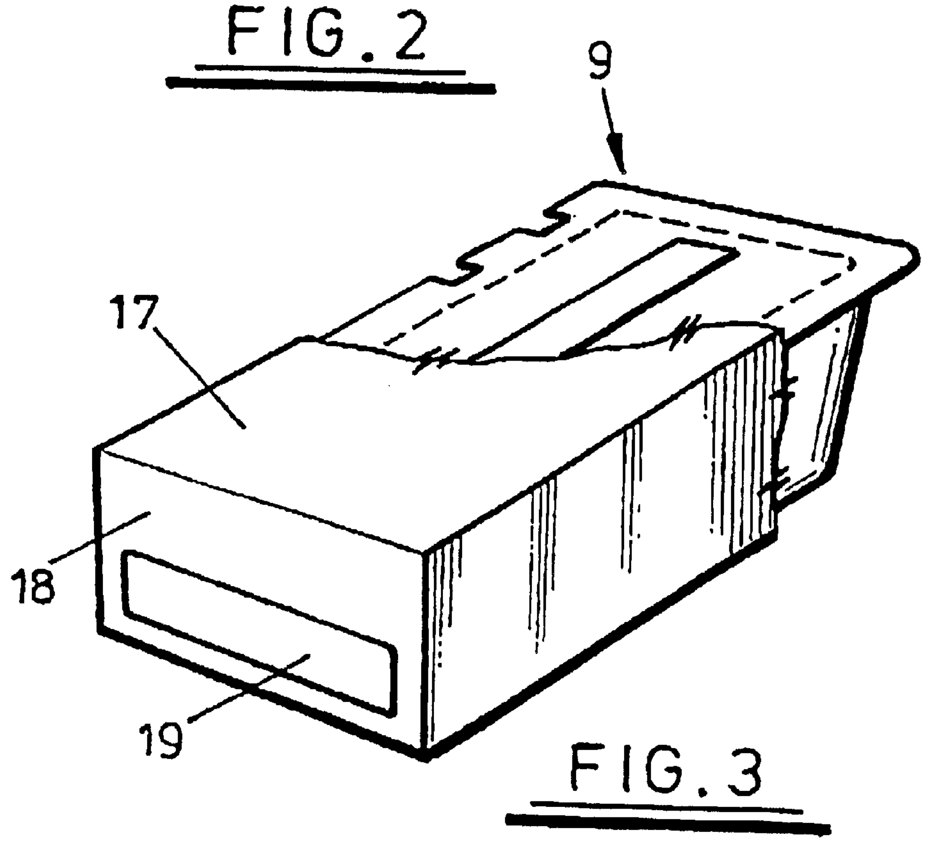
FIG. 3 is a perspective view of the container of FIG. 2 shown with an exterior sleeve that is partially cut away for clarity.

The plastics container 9 is received in a cardboard sleeve or box 17 as shown in FIG. 3 in order to provide strength for storing or transporting in bulk. The box 17 is printed with relevant information relating to the correct use of the rivets. An end wall 18 of the box 17 has a window 19 so that the transparent plastics container 9 and the printed information thereon can be inspected.

Figure 4:
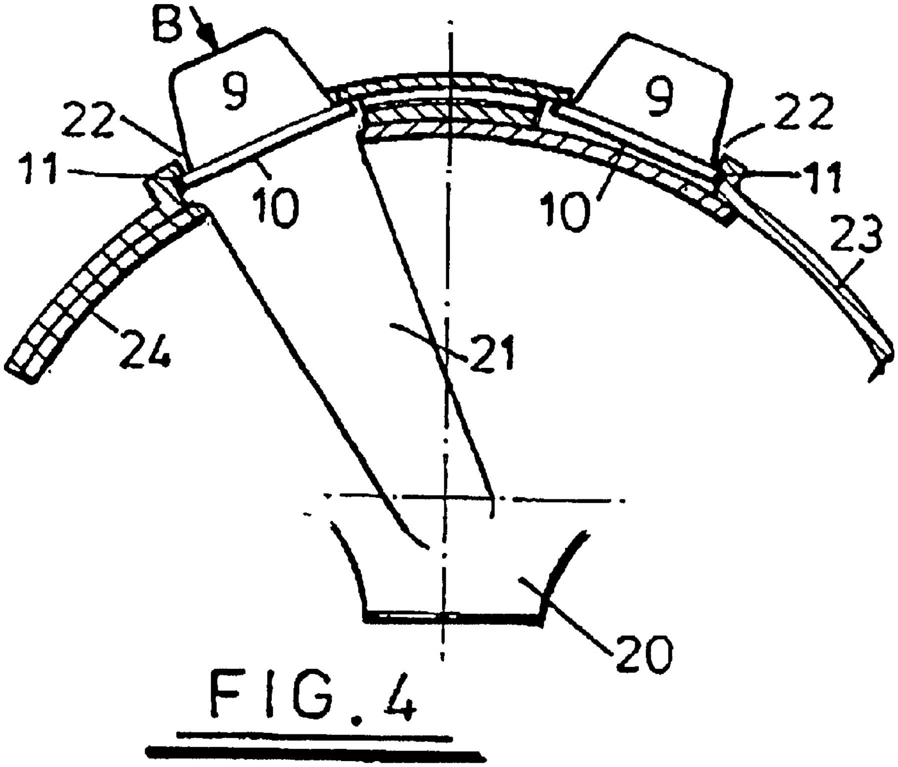
FIG. 4 is a schematic sectioned view of part of a loading station of the riveting machine showing rivets being loaded into a central feeder from a first package.
Figure 5:
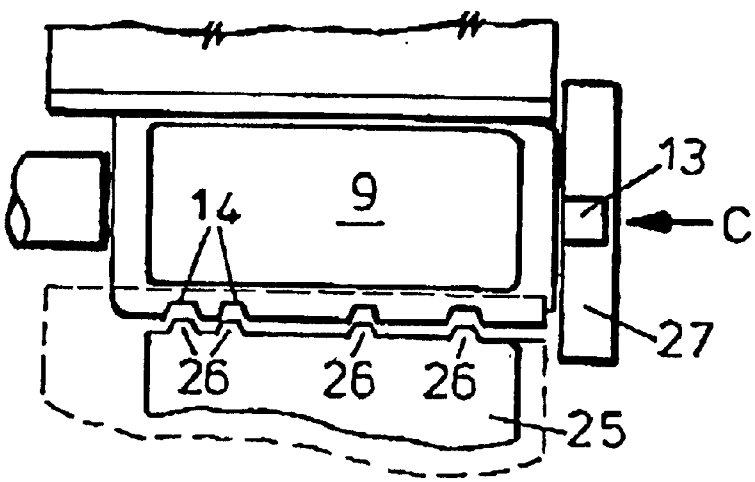
FIG. 5 is a view in the direction of arrow B of FIG. 4.
Figure 6:
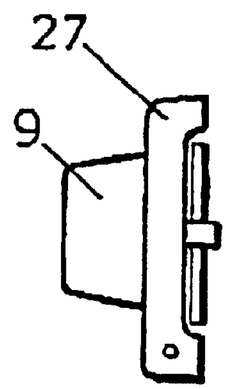
FIG. 6 is a view in the direction of arrow C of FIG. 5.
Figure 7:
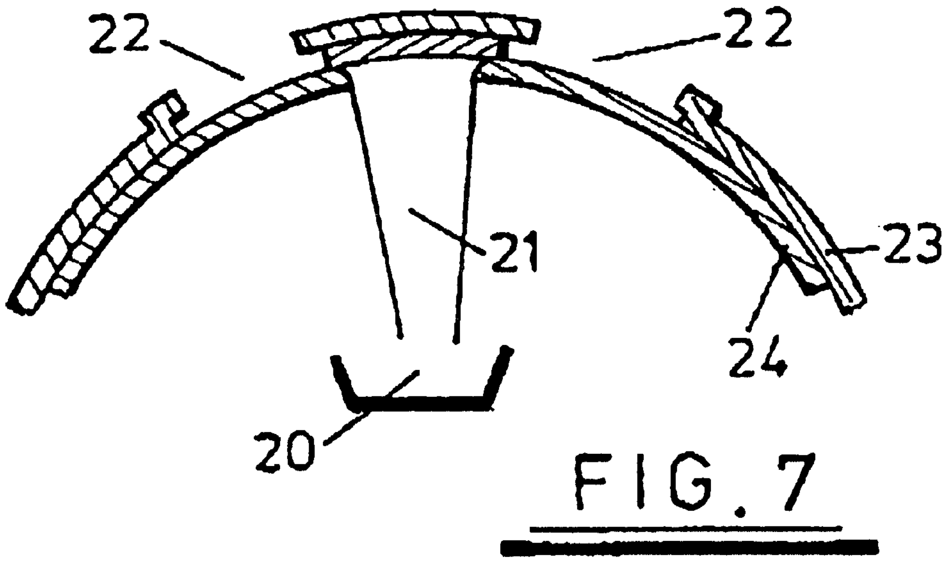
FIG. 7 is a schematic sectioned view of the loading station of FIG. 4 showing it in an intermediate state between unloading of first and second packages (not shown)

Two plastics containers 9 containing rivets are shown in position on a loading station in FIG. 4. The loading station comprises a central feeder 20 from which a chute 21 extends upwardly towards the containers 9 which are received in apertures 22 in an arcuate hopper 23. The chute 21 is connected to a rotary gate 24 that underlies the hopper 23 and which is rotatable relative thereto. A full container 9 is presented to the hopper 23 with its lid 10 intact by inverting it and sliding the lip 11 under the edges of one of the apertures 22 until it is in the position shown in FIG. 4, whereupon the rotary gate 24 moves to the position shown in FIG. 7 thereby preventing removal of the containers 9.

When the machine operator is satisfied that the container 9 is correctly in place (sensors may be provided to indicate this) the loading cycle is commenced. First a key plate 25 (see FIG. 5) bearing protrusions 26 complementary to the notches 14 on the desired rivet container moves laterally towards the notched edge of the container lip 11 and checks that the notches 14 are correct for the type of rivet required. At the same time a bar code 27 reader scans the end of the container and transmits the information relating to the batch number etc. to a controlling computer. The gate 24 is then rotated in reverse and a release mechanism (not shown) engages the end of the pull strip 13 and winds it around a spool (not shown) so as to remove the lid 10 and release the rivets which then pass down the chute 21 and into the feeder 20.

The pull strip 13 may alternatively be removed by an operator. When the container 9 is unloaded it is removed and the gate 24 rotated to close the aperture 22.

Should the key plate 25 and/or bar code reader 27 establish that the wrong type of rivets have been loaded, the hopper 23 may be moved to a reject position (not shown) where the incorrect rivets are discharged to a reject bin.

Figure 8:
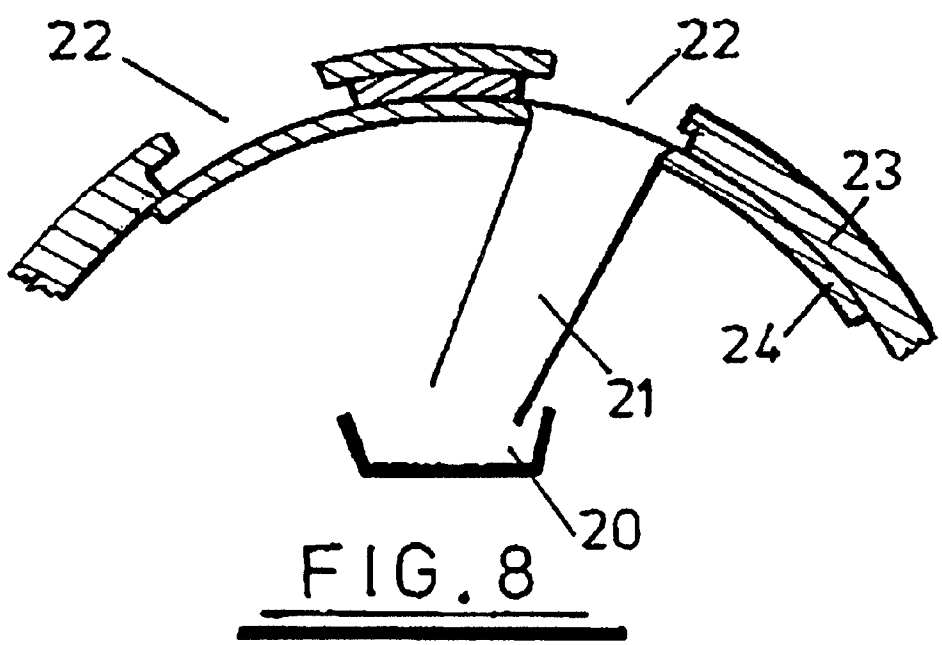
FIG. 8 is a schematic sectioned view of the loading station of FIG. 7 showing unloading of the second package (not shown)
Figure 9:
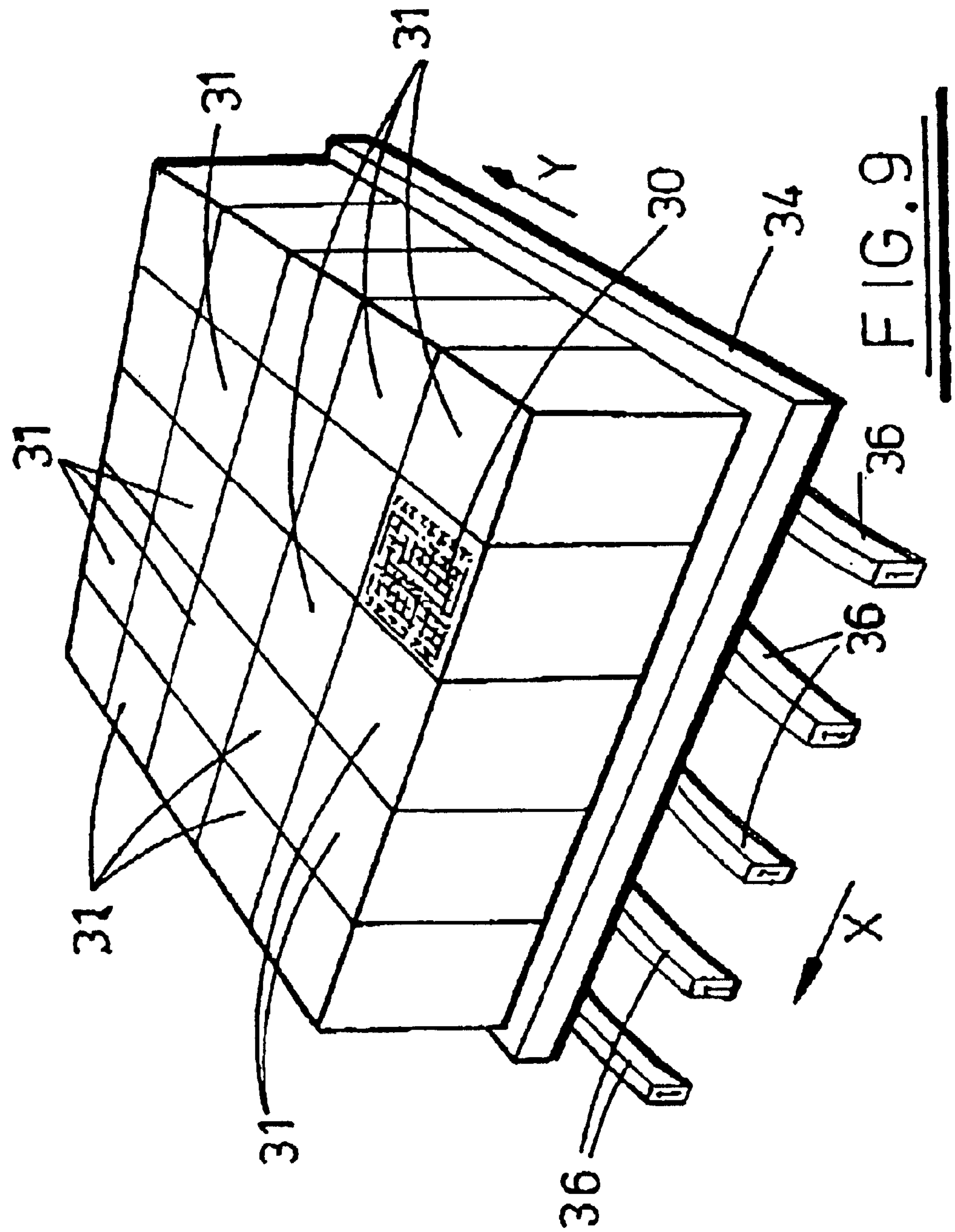
FIG. 9 is a schematic perspective view of a plurality of first alternative embodiment rivet packages loaded on to a pallet.

When the empty container 9 is being replaced, the rotary gate 24 may index round so as to permit loading of the contents of the second container into the feeder 20 as shown in FIG. 8. However, the operation is controlled such that a container 9 is not unloaded until the feeder 20 is empty. This ensures that rivets from different containers are not mixed so that each batch of rivets is traceable. The containers 9 are designed so that they cannot be refilled and reused on-line thereby eliminating a risk of contamination of the riveting process by unidentifiable rivets (however, they may be refilled and resealed off-line). The above described arrangement ensures that incorrect rivets cannot be poured into the feeder 20 since the content of each container is automatically checked and verified before it is opened.

Figure 10:
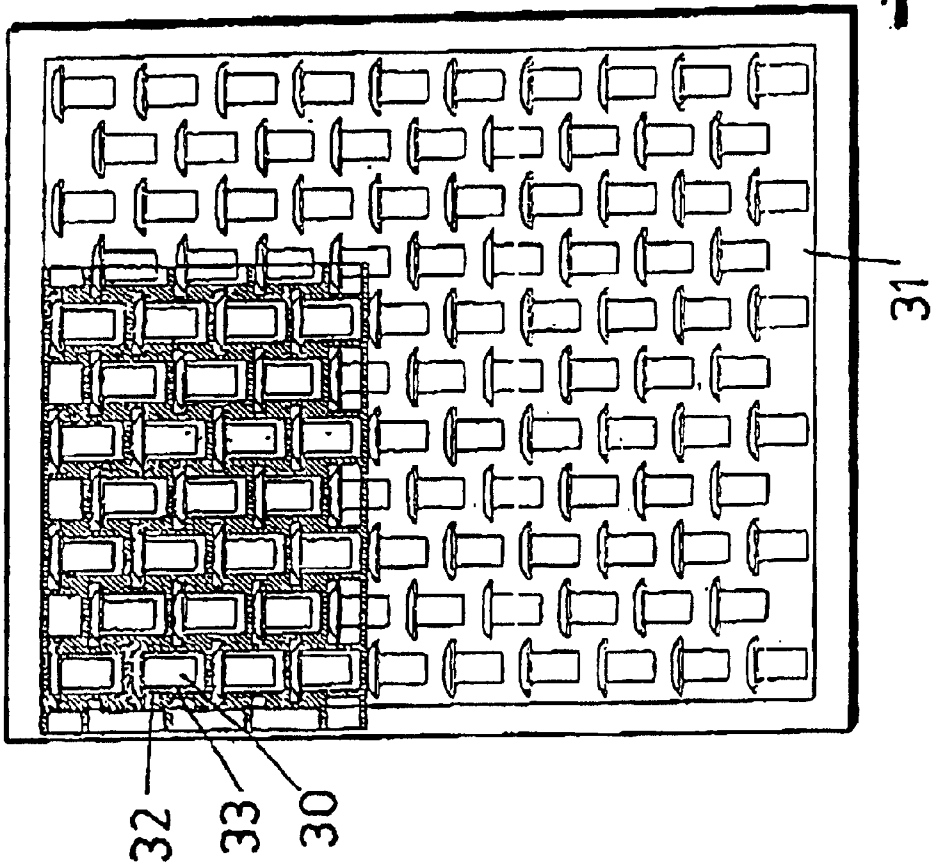
FIG. 10 is a diagrammatic Representation of one of the packages of FIG. 9.

An alternative packaging configuration for rivets is shown in FIGS. 9 to 12. Rivets 30 are pre-packed in rigid plastics containers 31 such that they are all oriented in the same way. Each container is divided by spacers 32 into a plurality of discrete elongate columns 33 (one shown in FIG. 11) which, as can be seen from FIG. 10, are of T-shaped cross section when viewed in plan. The rivets 30 are dispensed from each column 33 under gravity although a pusher mechanism (not shown) may be provided if required. A plurality of such containers 31 is mounted on a single pallet 34 under which is disposed one or more release mechanisms 35 by which the rivets 30 are extracted from the containers 31 and discharged into a delivery tube 36. In the exemplary embodiment shown in FIG. 9 the pallet 34 contains twenty five containers arranged in five rows (x-axis) and five columns (y axis). Each column of containers has an associated release mechanism carriage 35 that carries a delivery tube 36 and is captively engaged to the underside of the pallet 34 in such a manner that it is able to traverse relative thereto in the x and y axis directions. Each container 31 contains rivets 30 of the same type although the pallet may support different containers so that a combination of rivet types may be supplied according to the particular application.

Each release mechanism carriage 35 is of a size to accommodate a rivet 30 in two positions. On one side of the carriage 35 there is an aperture 37 facing towards the pallet 34 that is designed to receive a rivet from the container and adjacent thereto facing away from the pallet 34, is a second aperture 37 that connects the inside of the carriage 35 to the delivery tube 36. Opposite the second aperture 37 there is an upstanding guide pin 38 that projects into a guide track 39 formed as a groove on the underside of the pallet 34. The guide track 39 under a single container 31 is diagrammatically represented in FIG. 12.

The pallet 34 is disposed in an inclined position (as shown in FIG. 11) so that the carriage 35 moves along the y-axis direction under gravity. In order to release rivets from a container 31 the carriage 35 first traverses along the x-axis under the influence of a suitable actuator such as a motor and at the end of the first pass in the x axis direction of the guide track 39 it moves at right angles under gravity along the portion indicated by reference numeral 40 in FIG. 12 of the groove 39 to the next pass in the x-axis. As the carriage 35 indexes along in the x axis direction the guide pin 38 engages and opens a gate 40*a* at the end of each column 33 of rivets 30 in the container 31 thereby permitting the lowermost rivet in the column 33 to fall under gravity into the carriage 35. When the presence of the rivet is detected in the carriage 35 a pusher 41 on the carriage is extended to move the rivet 30 laterally until it is over the delivery tube aperture 37 whereupon a blast of air is directed at the rivet 30 to propel it into and along the delivery tube 36. A shutter (not shown in FIG. 10) prevents air from entering the rest of the carriage 35 or the container 31. When the carriage 35 continues along its path the pin 38 disengages from the gate 41 which then automatically closes behind the carriage 35.

The pallet 34 may be arranged such that each column of containers (y axis) has a different rivet type so that each carriage 35 and delivery tube 36 is of a different size and shape to accommodate the particular type of rivet 30. The movement of each carriage 35 is controlled by a computer operated control program that issues movement instructions to the appropriate carriage according to the type of rivet that is required at any stage in the riveting process.

In FIGS. 13 and 14 there is shown a further alternative packing configuration in which rivets 50 are housed in a plurality of rigid or semi-rigid tubes 51 of predetermined length. The tubes 51 are arranged in a spaced parallel relationship and are interconnected by a flexible web or membrane 52 so as to form a continuous length of flexible packaging 53. The tubes 51 are filled off-line and have internal profiles designed to retain the rivets in the orientation in which they are loaded. The tubes, for example, may have a circular cross-section 54 in which rivets 50 are arranged substantially coaxially or a T-shaped cross-section 55 in which rivets 50 are housed side-by-side such that their longitudinal axes are in parallel.

The pre-loaded package 53 is stored in a folded configuration to reduce storage space requirements. When delivered to the riveting machine a leading edge of the package 53 is trained around a rotary sprocket 56 having circumferentially spaced radial pockets 57 each designed to receive a respective tube 51 as shown. The rotary sprocket 56 indexes to advance the package 53 towards an unloading station (not shown in FIG. 13 or 14) that is disposed adjacent the sprocket periphery. The unloading station serves to unload one or more tubes 51 when they reach a predetermined angular position on the sprocket 56. The empty package comprising empty tubes 51 still attached to the flexible web 52 is fed to a receptacle 58 which when full is taken away for recycling and/or refilling of the package.

The trailing edge 53*a* of one length of package may be automatically joined or spliced to the leading edge 53*b* of a new package as depicted at reference numeral 59. Alternatively the leading edge 53*b* or the new package may be disposed at a convenient location ready to engage the sprocket 56 when the first package has been emptied. The folded package 53 to be unloaded may be disposed at any convenient location relative to the rotary sprocket 56. In an alternative embodiment the package may be transported by a release and feed device by a linear conveyer (not shown).

FIGS. 15*a*, 15*b* and 16*a*, 16*b* show exemplary embodiments of the tubes 51. In FIGS. 15*a* and 15*b* the tube is of T-shaped cross-section whereas in FIGS. 16*a* and 16*b* the tube is of circular cross-section. Each tube 51 is constructed from a membrane or a semi-rigid plastics and is sealed at each end by a weld or gluing (indicated by reference numeral 60) so as to retain the rivets 50. When the tube passes the feed mechanism (not shown) the end of the tube 51 is severed by a blade 61 so as to allow the rivets to exit the tube. The severed end of the tube 51 may be completely removed or left attached as shown in the figures.

FIGS. 17 and 18 show a package similar to that described above in relation to FIGS. 13 and 14 (corresponding parts are indicated with the same reference numerals). In this particular embodiment the tubes 51 are arranged into groups along the package 53. The groups are separated by an intermediate hinge 62 provided by the flexible web or membrane 52 so as to allow the package to be folded in such a way that tubes 51 of different groups overlie one another as shown in FIG. 17.

FIGS. 19 and 20 show another alternative packaging configuration in which the rivets are contained in an elongate flexible plastics bag 70 that is heat sealed to define a plurality of parallel channels 71 in which rivets 72 are housed. The channels 71 extend in a direction transverse to the length of the bag 70 which may be folded for storage so that overlying channels 71 are nested.

In use, the bag is 70 is unwound around a rotary drum 73 that is axially slotted around part of its circumference as shown in FIG. 20. The drum 73, which may be slotted around the whole circumference in other embodiments, indexes about a central shaft 74 past a release station 75 that comprises a release channel 76 and a perforation blade 77 that both extend parallel to the longitudinal axis of the drum 73. The release channel 76, which is substantially V-shaped in cross-section, is disposed radially outboard of the drum 73 and the perforator blade 77, which has a segmented blade edge 78, is disposed adjacent thereto, radially in-board of the drum 73. As the bag 70 passes the release station 75 the perforator blade 77 indexes radially outwards and passes through a slot 78*a* in the drum 73 to sever a channel 71 of the bag 70 thereby releasing the rivets 72 which then fall into the release channel 76. The channel 76 is inclined and vibrated so as to allow the released rivets to enter a track (not shown) where they are orientated by a known mechanism before being discharged into a delivery tube (not shown).

In an alternative configuration (not shown) the bag is stored in a spiral configuration.

The plastics bag 70 may be heat shrunk as well as heat sealed so as to confine individual rivets in blisters thereby preventing turning or rubbing of the rivets within the bag 70.

In alternative embodiments (not shown) the end of the bag 70 is severed and the rivets 72 are removed by using a vacuum source, pressurised air, gravity, vibration, a magnet or a pusher.

FIGS. 21*a* to 21*y* show various alternative packaging embodiments that may be used in the riveting machine of the present invention. These packages are sufficiently flexible so as to be used in the systems described above in relation to FIGS. 13, 14 and (in some instances) those of FIGS. 19 and 20. The same reference numerals are used for components that are common to one or more embodiments.

FIGS. 21*a* to 21*f* show package embodiments in which rivets 50 are preloaded into thick-walled tubes that are packaged by one or more flexible webs. In FIG. 21*a* thick-walled round tubes 90 (described in more detail later) each hold a plurality of rivets 50 and are sealed in individual channels 91 defined between upper and lower flexible webs or membranes 92*a*, 92*b*. The individual channels 91 are defined between heat seals 93 that join together the upper and lower webs 92*a*, 92*b* in the areas between adjacent tubes 90. The seals 93 extend in parallel to the tubes 90 but transverse to the length of the package.

In the embodiment of FIG. 21*b* the channels 91 are defined between a planar semi-rigid plastics web or membrane 94 and a flexible web or membrane 92.

In the embodiment of FIG. 21*c* a single web of semi-rigid (but flexible) plastics 92 is configured to provide open channel 91 for receipt of a round tube 90.

In the embodiment of FIG. 21*d* the tubes (different cross-sections are shown) are affixed directly to a planar web by means of gluing, welding or the like.

The tubes 90 may be packaged in shrink-wrap plastics as shown in the embodiment of FIG. 21*e*.

The package embodiment of FIG. 21*f* is equivalent to that of FIG. 21*c* except that it is for T-section tubes.

FIGS. 21*g* to 21*i* show package embodiments in which the rivets are sealed in the channels 91 by vacuum packing. In FIG. 21*g* the channels 91 are formed between two layers of flexible plastics membrane 92*a*, 92*b* and separated by seals 93 as before. The membrane may be vacuum formed or otherwise pressurised so that it is of a T-shaped cross section corresponding to the rivet profile. FIG. 21*h* shows the upper membrane 92*a* being shaped by a complementary former 95. Once the upper membrane is formed the rivets 50 may be loaded into each channel, the air evacuated and the ends sealed to lock the rivets in position is shown in FIG. 21*i*. Evacuation of the air causes the membranes 92*a*, 92*b* to apply inward forces against the surfaces of rivets 50 thereby ensuring they are retained in the desired orientation, as depicted in FIG. 21*j*. The rivets 50 are unloaded by opening the end of the package, vacuuming or pressurising the upper membrane 92*a* against the former 95 and blowing the rivets 50 out of the package by application of a pressurised gas such as air. The same process may be applied in order to produce packages having channels of circular cross-section as shown in FIGS. 21*k* to 21*m*.

FIGS. 21*n* and 21*o* show an alternative packaging embodiment in which the upper and lower membranes 92*a*, 92*b* are connected by interlocking elements rather than by heat sealing, welding or gluing. The upper membrane 92*a* defines a plurality of closure portions 97 that each overlies a respective channel 91 defined in the lower membrane 92*b*. The closure portion 97 has a profile that defines a pair of resilient depending annular lips 98 designed to engage with a pair of recesses 99 provided at the upper end of each channel 91 of the lower membrane 92*b* wall, and upstanding annular projections 100 that are designed to engage with ridges 101 defined at the base of the lower membrane channel 91. This enables a plurality of packages to be vertically stacked as shown in FIG. 21*n*.

FIGS. 21*p* to 21*r* show alternative package configurations in which both the upper and lower membranes 92*a*, 92*b* are profiled and joined by a seal 93 such as, for example, a weld.

FIGS. 21*c* and 21*t* show alternative package embodiments in which the upper and lower membranes 92*a*, 92*b* are both profiled so that when they are brought into register they form an interference fit or clip fit at engaging portions 102*a*, 102*b* and serve to retain the rivet 50 in the channel 91. In the embodiment of FIG. 21*t* the lower membrane 92*b* is not continuous but rather comprises discrete channel-shaped portions.

FIGS. 21*u* and 21*v* show a package formed from a single profiled membrane 92. The membrane 92 is semi-rigid and elastically resilient The embodiment shown illustrates different membrane profiles for different rivet orientations. The channels 91*a* on the left hand side of the package are approximately T-shaped in cross-section so as to receive an upright rivet 50 and are partially closed by a bevelled wall 104. The rivets 50 are inserted into the channels 91*a* by an appropriate pusher tool 105. The semi-rigid flexible nature of the membrane ensures that the bevelled wall 104 expands sufficiently to allow passage of the rivet into the channel 91. Once the rivet is fully inserted the bevelled wall 104 contracts over the head of the rivet 50 and prevents its inadvertent release. Channels 91*b* are of open circular cross-section and designed to receive rivet 50 disposed coaxially on their sides. The open channels 91*a* or 91*b* may be closed by an upper membrane 92*a* as depicted in FIG. 21*w*. In order to release the rivets 50 from the channels 91*a* an appropriate mechanism is provided to stretch the channel 91*a* in the pocket 57 of the sprocket 56 (see FIG. 21*x*) until the bevelled wall 104 moves clear of the rivet 50 thereby allowing it to move relative to the channel 91*a*.

The package of FIGS. 21*u, v* and *z* may be used in combination with the slotted drum of FIG. 20; a pusher replacing the blade and being reciprocal to push rivets out of the packages from behind.

FIGS. 21*y* and 21*z* illustrate a similar embodiment to that described above in relation FIGS. 21*u* and 21*v*. A continuous web of semi-rigid but flexible material 92 is configured into a castellated formation so as to define channels 91. The walls of the channel 91 are bevelled at 104 so as to have a profile that is designed to grip the head of a rivet 50. An upper edge 110 of the channel wall 104 may be shaped so as to define a circular opening III into which the rivet 50,may be inserted. In use the bevelled walls 104 of each channel 91 grip the rivets 50. The rivets may be inserted in the channels 91 on one or both sides (as indicated in FIG. 21*z*) of web 92. In order to release the rivets from the web a channel-shaped release member 112 is presented to the web and placed over the desired channel 91. The release member 112 presses on the package thereby stretching the web material 92 so as to cause the bevelled walls 104 to diverge and release their grip on the rivet heads in that particular channel 91. The release member 112 forms an open-ended chamber 113 with the web so that the rivets 50 may be evacuated in any appropriate manner such as by application of pressurised air to one end of the chamber 113. Alternatively the rivets 50 may be pressed out of the channel 91 and captively held in the release member 112 for transfer to a delivery tube 6.

In the embodiments of FIGS. 21*a* to 21*f* the rivets are stored in pre-loaded tubes before being packaged into a continuous elongate length of webbing or other membrane. Various embodiments of such tubes will now be described with reference to FIGS. 22*a* to 22*d* and 23*a* to 23*d*. In each embodiment the tube 90 is constructed from a rigid thick-walled material such as an appropriate plastics. The tube 90 may be T-shaped or circular in cross-section depending on the desired rivet orientation. In order to retain the rivets in the tubes a cut-out tab 120 is formed at one or both ends of the tube 90 so as to close interior channel 121 at least partially thereby preventing escape of the rivets 50. The cut-out tab 120 is formed in one or more walls of the tube 90 as required and is designed to deflect to a closure position (see FIGS. 22*b,c,d* and 23*b,c,d*) in which it partially closes the end of the tube 90 so as to prevent rivet escape. In this position edges 122 of the tab 120 may cooperate with locking features 123 formed on the cut edge 124 of the tube wall or may simply engage by means of an interference fit If necessary the cut edges 122, 124 may be bevelled to form a more secure engagement with one another. When the tab 120 is released from its closure position it relaxes to a position in which it is contiguous with the tube wall from which it was cut thereby opening the end of the tube channel 121 and allowing release of the rivets 50.

It is to be understood that any conveniently shaped cut-out tab may be used. Alternatively the tab may be formed from a tube wall extension that projects from the end of the tube and at least partially closes the end of the tube channel.

The package designed described above in relation to FIGS. 21 to 23 all provide for sorted, pre-oriented rivets to be supplied to the riveting apparatus so that apparatus for sorting, orienting and selecting is not required.

FIG. 24 illustrates how the tubes of FIGS. 22 and 23 may be opened to release the rivets into a delivery tube such as that shown at 6 in FIG. 1. A docking interface is mounted on the end of the delivery tube 6 and comprises a housing 130 containing two spring-biased fingers 131, 132. A first finger 131 is pivotally disposed in the housing and has a terminal portion that projects from the housing 130 for engagement with the tab 120 of a tube 90. The second finger 132 is reciprocally disposed in the housing 130 for lateral movement behind the first finger 131. When the docking interface is not in use the second finger 132 is retracted as shown in FIG. 25*a* under the bias of a compression spring 133 and the first finger 131 is biased to the position shown under the influence of a leaf spring 134. When a tube is presented to the docking interface it is aligned with the delivery tube 6 so that the first finger 131 projects into the tube 90 below the tab 120. The second finger 132 is then moved (in the direction indicated by the arrow) by an actuator against the bias of spring 133 to an extended position in which its wedge-shaped nd bears against the first finger 131 and forces it to pivot upwardly against the biasing force of spring 134 (as represented by the dotted line). This forces the tab 120 to deflect upwardly to its relaxed position thereby opening the end of the tube 90 and allowing rivets 50 to egress from the package tube 90 into the delivery tube 6.

FIGS. 24*a* and 24*b* are equivalent to those of FIGS. 11 and 12 except that the container 31 comprises a plurality of tubes 90 of the kind depicted in FIGS. 23 and the release mechanism 35 takes the same structure as the docking interface of FIG. 24. The container moves between parallel conveyors C over an opening into which the docking interface projects in the direction of the arrow. The docking interface is moveable relative to the conveyor on the carriage. The rivets may be released from the tube under gravity or by application of, for example, compressed air. When each tube is fully emptied into the delivery tube, the carriage retracts and indexes to the next position.

An alternative embodiment of a docking interface is illustrated in FIGS. 25*a* and 25*b*. In this instance the docking interface D is moveable in a diagonal direction towards and away from the tube 90 as indicated by the arrow in FIG. 25*a*. The docking interface has a housing 140 that receives an end of the delivery tube 6 and has a wedge formation 141 projecting beyond the end of the delivery tube 6. FIG. 25*a* shows the tube 90 disengaged from the docking interface D. When it is desired to unload the rivets in the tube 90 the docking interface D moves along its diagonal path to engage with the end of the tube 90. The movement is induced by an appropriate actuator, part of which is received in bore 142. During engagement the wedge formation 141 abuts the tab 120 and deflects it outwardly so as to open the tube 90. Once the tube 90 and interface D are fully engaged, as shown in FIG. 25*b*, the package tube 90 is co-axially aligned with the delivery tube 6 so that rivets 50 may be propelled by air pressure or the like to the rivet setting tool.

It will be appreciated that the formation of the first finger 131 or the wedge formation 141 of interface D may be of any appropriate shape and is dependent on the configuration of the cut-out tab 120 of the tube 90. The delivery tube 6 and package tube 90 may be presented to each other by relative movement in any appropriate direction to ensure that a formation of the interface D engages and deflects the tab (cut-out or otherwise) of the tube 90.

In an alternative embodiment (not shown) the closure tab may be formed by at least one separate insert such as a metal or plastics spring element that is normally disposed to close the tube partially but is deflectable by the formation on the docking interface so as to open the package tube when it is in register with the delivery tube.

It will be appreciated that the same docking interface structures may be used to connect a packaging tube of rivets directly to the nose of the rivet setting tool.

The packaging designs described above eliminate the need for an open hopper or reservoir of rivets and as they effectively provide a sealed system operators are prevented from introducing unidentifiable rivets into the fastening machine.

FIGS. 26*a* to 26*t* show, in section, alternative embodiments of a rivet delivery tube such as the one that is used to shuttle rivets from a remote feeder such as a pre-packed container with release mechanism or a hopper, to the setting tool. The tubes may be manufactured from extruded plastics of one or more components or by folding a flat plastics sheet. Ideally they are transparent so as to assist in identifying blockages caused by trapped rivets and/or debris, and flexible to allow bending of the tube without distorting the internal profile of the tube significantly. The same configurations may be used as a magazine at the setting tool.

In FIG. 26*a* there is shown a rivet delivery tube 200 that is formed by a one-piece plastics extrusion (or a two-piece co-extrusion) having wear-resistant characteristics. The outer profile is approximately square but could be rectangular depending upon the size of the rivet. The internal profile of the delivery tube walls is configured to define a cavity 201 that is approximately T-shaped in cross-section so as to conform to the profile of the rivet except that it is slightly larger in size so as to allow the rivet pass easily along the tube 200. Immediately below the head portion 102 of the T-shaped cavity 201 there are opposed inwardly projecting ridges 203 that extend along the length of the tube 200 in parallel. A further ridge 204 projects downwardly from a roof of the cavity 201. The ridges 203, 204 serve as wear strips that ensure the rivet is correctly aligned in the tube and the areas of contact between the rivet and tube are kept to a minimum thereby reducing friction and tube wear.

The delivery tube 200 shown in FIG. 26*b* is of the same configuration as that of FIG. 26*a* with the exception that the wear strips 203, 204 are provided by a wire or chord insert. These may be snap-fitted, bonded or co-extruded in complementary grooves 106 in the internal wall of the delivery tube 200. This configuration has the advantage that the wear strips 203, 204 are replaceable (unless co-extruded) and can be made from a material different to that of the rest of the tube. If the wear strip is manufactured from an electrically conductive material it can be used to detect the position of a rivet (which is also electrically conductive) along the tube by inductive sensing thereby enabling the location of a blockage to be identified rapidly. The wear strip could alternatively be made in composite form (not shown) with a central core of electrically conductive material (e.g. copper) and an outer sleeve of wear-resistant material such as kevlar.

The delivery tubes of FIGS. 26*c* and 26*d* are formed from releasably connectable upper and lower portions 200*a*, 200*b*. Separating the two portions 200*a*, 200*b* not only allows access to the cavity 201 to clear blockages or accumulation of debris etc. but also allows the portions 200*a*, 200*b* or wear strips 203, 204 (if removable) to be replaced by others of a different internal configuration or depth. The tube portions 200*a*, 200*b* are connected together by any known configuration of releasably engageable connection such as inter-engaging formations 206*a*, 206*b* defined on mating edges of the upper and lower portions 200*a*, 200*b* of the tube 200.

The embodiments of FIGS. 26*e* to 26*h* illustrate how deeper lower portions 200*b* of the delivery tube 200 may be connected to accommodate longer rivets. In FIG. 26*e* there are shown three approximately square wear strips 207*a*, 207*b*, 207*c* that accommodate the head 208 of the rivet 209 and an elongate wear strip 210 upstanding from a base wall 211 of the lower portion 200*b* of the tube 200. The latter wear strip 210 is designed to accommodate a rivet 209 having a medium length shank 212 but is readily interchangeable with a shallower strip to accommodate a rivet having a longer shank. Extra wear strips 213 are provided in the lower portion 200*b* of the delivery tube 206 of FIG. 26*f* so as to provide additional guidance for the rivet 209. In the tube 200 of FIG. 26*g* only two vertically opposed wear strips are provided. Again, either of the strips 214*a*, 214*b* may be replaced with ones of different heights depending on the rivet size. FIG. 26*h* shows how a filler element 215 may be used to occupy part of the cavity 201 defined in the lower portion 200*b* of the tube 200 of FIG. 26*f*. The filler element has a protruding ridge 216 on each side that engages in the complementary groove 217 designed for a removable wear strip and serves to minimise air leakage in embodiments where the rivets 209 are projected by compressed air.

The delivery tube may be of modular construction as illustrated in FIGS. 26i to 261 in which the top, bottom and side walls 220, 221, 222 are releasably engageable so that a delivery tube 200 of any desired size may be constructed. The walls are interconnected by any suitable form of clip or snap-connect formation 223 as shown in the figures.

In FIG. 26*m* there is shown a single-piece delivery tube 200 formed from a plastics sheet that is folded, bent round, blow moulded or extruded to form an enclosed tube. This design may also be used as a disposable magazine (in which case ends caps (not shown) are required to close fully or partially end openings of the magazine). The ends 224 of the sheet have complementary formations that are releasably inter-engageable to hold the tube 200 closed.

The upper portion 200*a* of a separable delivery tube 200 may be hinged to the lower portion 200*b* as shown in the embodiment of FIG. 26*n*. The hinge 227 is a flexible integral web interconnecting the upper and lower portions 200*a*, 200*b* at one side. On the other side the portions 200*a*, 200*b* are interconnected by releasable inter-engaging complementary portions 228 as before.

In the embodiments of FIGS. 26*o* and 26*p* the upper and lower portions 200*a*, 200*b* have outwardly extending side flanges 229 that are held together by a removable clip 229*a* that extends continuously or intermittently along the length of the delivery tube 200 and is of a complementary formation to the flanges 228. Seals 230 are provided between mating faces 231 of the flanges 228 to prevent the ingress of dust, other foreign bodies, or moisture and the leakage of compressed air. In the embodiment of FIG. 26*p* the clips 229*a* are integrally connected to a rigid support frame 232 that is substantially channel shaped with upstanding side walls 233 between which the delivery tube 200 is received. The clips 229*a* extend inwardly of the channel 232 at an upper end of each upstanding wall 233. The support frame suspends the tube which may be routed throughout the factory delivering the rivets over long distances and may be used to join adjacent segments of a delivery tube so that they are in axial alignment.

The delivery tube 200 of FIG. 26*q* has been adapted to incorporate service cables required by the riveting machine including cables servicing compressed air booster points along the tube (described later) and gate elements at a multiple inlet delivery tube. The upper and lower portions 200*a*, 200*b* of the tube 200 have elongate outwardly extending lateral flanges 240 at each side. On the right of the tube 200 depicted in FIG. 26*t* the flanges are recessed at their mating faces 241 to define an enclosed chamber 242 that is designed to receive service cables 243 or the like. The cables 243 may carry, for example, pneumatic and electric power or electrical control signals. This design provides for a compact and neat arrangement. Moreover, the flat configuration of the tube 200 can help prevent the tube from twisting or being oriented incorrectly on instalment.

In an embodiment not shown, the wear-resistant strips are replaced with grooves or voids in the walls of the delivery tube. These create air channels that serve to cushion the rivet as it is propelled along the tube without it contacting the side walls.

It is to be appreciated that many of the features described above in relation to the wear-resistant delivery tubes may be used in combination.

Propulsion of the rivets along the delivery tube is by pressurised fluid such as compressed air or by linear magnetic acceleration. Booster points can be provided along the length of the tube to ensure that sufficient compressed air or magnetic acceleration is provided along the full length of the tube for efficient operation.

Rivets can be fed from the rivet release mechanism 5 either singularly or in groups in which case they are transported along the delivery tube 6, 200 in convoy. In a particular embodiment, not shown, rivets are loaded into a shuttle magazine at the release mechanism station and the magazine is transported along the delivery tube 6, 200 to the setting tool 1 where it is unloaded by any of the methods described above. The empty magazine can then be recycled. The magazine is typically transported by compressed air fed into the delivery tube 6,200. This arrangement has the advantages that rivets are less likely to be damaged by high speed propulsion, may be delivered at a faster rate in large quantities in a more reliable fashion and there is a lower rate of consumption of compressed air.

If necessary the delivery tube may be encased in an outer protective sleeve that is filled with a supportive material such as foam or the like.

There are instances where it is desirable to feed fasteners with high aspect ratios in a delivery tube of round cross section. Such a tube allows rivets of varying stem or head length to be transported in common tubes unlike delivery tubes of T-shaped cross section where the depth of the tube has to match that of the rivet being transported. Although delivery tubes of T-shaped cross-section are more complex to produce and more susceptible to damage in use, rivets with low aspect ratios must be fed in delivery tubes of T-shaped cross-section as there is a tendency for them to tumble. At times it is necessary to feed alternate, high and low aspect ratio rivets to a common transfer station 7 at nose 8. At the nose 8 of the rivet setting tool the rivets are fed to the delivery passage in the nose via a tube of T-shaped cross-section and therefore rivets that are transported in round tubes, must be rotated through 90° before entering the T-shaped cross-section tube.

FIGS. 27*a* to 27*i* illustrate an adapter tube 300 for interconnecting a round cross-section delivery tube 301 and a T-shaped cross-section delivery tube 302. The adapter tube 300 would typically be disposed in the vicinity of the nose 8 of the rivet setter tool 1 and is designed to rotate rivets 50 from a roughly co-axial orientation in a main delivery tube 6, 301 of round cross-section through 90 degrees so that they can enter a short length of delivery tube 302 (or a dedicated magazine) of T-shaped cross-section at or near the nose 8.

The adapter tube 300 has a circular inlet 305 at one end that receives the round delivery tube 301 and a T-shaped outlet 306 that receives the T-shaped delivery tube 302. The delivery tubes 301, 302 may be received in an interference fit with the inlet and outlet 305, 306 or there may be provided positive locking formations (not shown). An intermediate section of the interior of the adapter tube 300 has a downwardly inclined ramp 307 disposed below a pair of longitudinal guide rails 308 that extend inwardly from each side. The rails 308 do not meet but are spaced by a clearance 309 that is of a dimension that allows the stem 50*a* of a rivet 50 but not the head 50*b* to pass through. Above the guide rails 308 an internal surface of a top wall 310 of the adapter tube 300 extends substantially in parallel for most of the length of the tube 300 but has a short downward incline 311 as it merges with the T-shaped outlet 306.

As a rivet 50 egresses from the round delivery tube 301 (being propelled by the usual means such as air flow) it passes through the inlet 305 and its head 50*b* is received in the space between the rails 308 and the top wall 310 (see FIG. 27*c*). As the rivet 50 is propelled further the head 50*b* abuts incline 311 and the rivet 50 begins to rotate as a result of the stem 50*a* dropping under gravity (or under its own momentum or by application of air pressure) through the clearance 309 between the rails 308. The rotational movement of the rivet 50 is permitted by the space created below the rails 308 by the inclined ramp 307. FIGS. 27*d* to 27*g* show, in a sequence of steps, the rotational movement of the leading rivet 50. At the end of the rotational travel (see FIG. 27*g*) the rivet 50 is oriented vertically with the periphery of the head 50*b* resting on the guide rails 308. To permit passage of the rivet 50 into the T-section delivery tube 302 the guide rails 308 are positioned so as to be contiguous with corresponding rails or ledges in the tube 302.

A slight bend is shown in the adapter tube 300 which causes a separation angle between the stem and head of the first and second rivets to ensure that the first rivet is not trapped by the second.

The embodiment of FIG. 27*i* shows a slight modification in that there is provide an inlet 312 in the top wall 310 of the adapter tube. The inlet allows air or a mechanical pusher to be injected into the adapter so as to assist in rivet rotation in the event of a jam.

The above described adapter tube 300 is compact, in-line, tolerant of wear and has increased reliability in view of the lack of moving parts. In addition, it relies on air propulsion and not rivet momentum for the change in orientation, it can accommodate single or multiple rivets and can re-commence operation in the event of a temporary interruption in the air flow.

It is to be appreciated that in certain applications the adapter tube 300 may be used in reverse, that is, it may be used to rotate rivets egressing from a T-shaped delivery tube so that they enter a round delivery tube. Moreover, the adapter may only be modified slightly to accommodate the situation of the respective tubes 301, 302 being disposed at right angles.

An alternative adapter tube design 350 is shown in FIGS. 28*a* to 28*b* in which there are inlet delivery tubes 351, 352 of both round and T-shaped cross-sections and an outlet delivery tube 353 of T-shaped cross-section. This adapter tube 350 permits all rivet sizes to be fed into a single T-shaped outlet delivery tube or magazine 353 for delivery to the nose 8 of the rivet setter 1; relatively long rivets being fed via the round inlet delivery tube 351 and others being fed via the T-shaped inlet delivery tube 352.

The round inlet delivery tube 351 is, in the exemplary embodiment, inclined to the adapter 350. At the region of intersection of the T-shaped inlet delivery tube 352 and the adapter 350 there is provided a pair of elongate, parallel hardened pins 354 that are designed to sit under the periphery of a rivet head 50*b*. The pins 354 pass across the intersection of the other inlet delivery tube 351 with the adapter 350, where they are tapered, and terminate at a position conterminous with corresponding ledges or rails 355 in the outlet delivery tube 353. Rivets 50 from the T-shaped inlet tube 352 pass smoothly through the adapter 350 to the outlet tube 353 whereas rivets 50 that enter from the round inlet delivery tube 351 are propelled into the adapter tube 350 in such a way that their stems 50*a* pass through a clearance between the pins 354 and the peripheries of the heads 50*b* gradually come to rest on the pins 354. The rivets 50 are then propelled into the outlet tube in the same way as those from the other inlet tube 352.

A multiple inlet delivery tube is shown in FIGS. 29 and 30 in which two supply branches 360*a*, 360*b* merge with a single exit branch 361. The internal configuration of the tube in the embodiment shown is T-shaped in cross section and may be an open channel as shown in FIGS. 29 and 30 or an enclosed tube (not shown). This tube enables rivets from two different sources to merge into a single exit tube. The rivets in each supply branch 360*a*, 360*b* are typically of different types and therefore a gate 362 is provided at the intersection of the supply and exit branches 360*a*, 360*b*, 361. The gate 362 is pivotally mounted on a pin 363 and projects through a wall 364 where the supply branches 360*a*, 360*b* meet, and extends across the tube to the opposite exit branch 361. In use, the gate 362 is pivotally moveable between two positions in which it closes communication between the exit branch 361 and one or other of the supply branches 360*a*, 360*b*. In the embodiment shown in FIG. 29 the incoming rivet 365 in the right hand supply branch 360*b* is free to pass into the exit branch 361 since the gate 362 is disposed so as to bloc k the other supply branch 360*a* However, with the gate 362 in the position shown in dotted line (in FIG. 30) the rivet 365 is prevented from passing to the exit branch 361 unless the other supply branch 360*a* is clear in which case the momentum of the rivet 365 serves to pivot the gate 362 clear of its path. The gate 362 is configured to help guide the rivet 365 along its path by supporting it across a gap created by the intersecting branches 360*a*, 360*b*. It is to be appreciated that the gate may be free moving or mechanically driven.

As described above it is desirable for the delivery tube to be disconnected from the rivet setting tool during the riveting operation and to have an intermediate buffer magazine of rivets at the nose 8. The quantity of rivets supplied the intermediate buffer magazine in such instances is ideally a discrete number commensurate with the requirements of the next work cycle or the rivet setting tool. However, this would require a relatively complex intelligent counting system to control the quantity loaded each time. It is therefore desirable to be able to supply an undefined quantity of rivets at periodic intervals to keep the magazine topped up. In such an arrangement there is a risk of overfilling the magazine and causing a blockage. FIGS. 31*a* to 31*h* illustrate a delivery tube to buffer magazine docking station in which such a problem is avoided.

The end of the rivet delivery tube 6 is fitted with a male housing 380 of the docking station 381. A leading end 382 of the male housing 380 is tapered and is adapted to be received in a complementary female housing 383 defined at an inlet of a buffer magazine 384 at the rivet setting tool 1. The magazine 384 is ideally mounted vertically so that the rivets stack vertically assisted by gravity, although they may be transported by air propulsion or the like.

The male housing 380 carries a pair of longitudinally slidable plates 385 that are biased by a butterfly spring 386 so as to restrict the passage of the rivets 50 out of the delivery tube 6 as shown in FIG. 31*a*. The female housing 383 has a pair of laterally slidable jaws 387 that are biased together to close the inlet to the buffer magazine 384.

The docking operation will now be described in, relation to FIGS. 31*b* to 31*h*. For robotic manipulation the respective ends of the buffer magazine 384 and delivery tube 6 may float slightly in all axes to assist alignment. The tapered end 382 of the male housing 380 is presented to the female housing 383 of the magazine 384, with the plates 385 holding the stem 50*a* of a rivet 50, and is pressed into register with the female housing 383 so that the plates 385 bear against the jaws 387 (FIG. 31*c* and 31*d*) forcing them to part laterally. As the male housing 380 continues to enter the female housing 383 the slidable plates 385 are forced to retract clear of the rivet path 50 against the bias of the butterfly spring 386 (FIGS. 31*e, f* and *g*) thereby enabling it to fall into the magazine 384 between the open jaws 387 of the female housing 383 (see FIG. 31*h*).

A sensor is used to detect the completed transfer of all the rivets from the supply package.

When disengaging from the buffer magazine 384 the delivery tube 6 retracts to allow the jaws 387 of the female housing 383 to close. At the same time the slidable plates 385 move to the closed position shown in FIG. 31*a* to collect the stem 50*a* of the next rivet 50. If there is a rivet 50 present at the male housing 380 the retraction of slidable plates 385 ensures that it is forced back into the delivery tube 6.

As stated above whether the delivery tube 6 is permanently attached to the rivet setting tool 1 or releasably connectable to a buffer magazine, the transfer station 7 (see FIG. 1) is designed to be detachable from the nose 8 of the rivet setting tool 1 so that, once loaded, the nose may descend to perform the riveting operation. Schematic representations of such an arrangement are shown in FIGS. 32 to 35.

In the embodiment of FIGS. 32 and 33, a transfer station 7 delivers rivets directly to a side port 400 of the nose 8 of the setting tool 1 from a delivery tube 6 as is well known. The inventive feature of this design is that the transfer station 7 is pivotable by an actuator 401 between the two positions shown respectively in FIGS. 32 and 33. The actuator 401 shown is a hydraulic or pneumatic cylinder (but could be any suitable form of actuator) connected to the transfer station 7 by a system of linkages 402. In the position shown in FIG. 32, rivet passages (hidden) through the delivery tube 6 and transfer station 7 are in register with the side port 400 in the nose 8 so that a rivet can be loaded. When the rivet is loaded the nose 8 extends downwardly in a known manner to effect the riveting operation and at the same time the actuator 401 is operated so as to pivot the transfer station 7 and delivery tube 6 clear of the nose 8 providing sufficient clearance for the nose 8 to extend as is shown in FIG. 33.

In the embodiment shown in FIGS. 34 and 35 the transfer station 7 and delivery tube 6 are rotatably supported by a bracket 403 that extends laterally from the setting tool at a location above the nose 8. In the position shown in FIG. 34, a rivet passage in the transfer station 7 is in register with the side port 400 of the nose 8 so that a rivet may be loaded, and in the position shown in FIG. 35 the transfer station 7 has been rotated through 90° manually or by an appropriate actuator (not shown) to move clear of the nose 8. The latter position allows the nose 8 to extend towards the workpiece to insert the rivet.

A more detailed embodiment of a rivet setting tool with a detachable transfer station is shown in FIGS. 36*a* to 36*d*. The rivet setting tool 420 is pivotally connected by a boss 421 to a first bracket 422 about a pivot point P1. The first bracket 422 is, in turn, pivotally connected via pivot P2 to a second bracket 423 which carries a support frame assembly 424 on which the transfer station 425 is mounted. The support frame assembly 424 comprises a pair of parallel slide rods 426 mounted between two transverse vertically spaced support plates 427, 428. The slide rods 426 are slidably held in cylindrical bearings 429 of the second bracket 423 so that the support frame assembly 424 is slidable vertically relative to the second bracket 423. An upper of said plates 427 has stop collars 430 in which an upper end of each rod 426 is received and a lower of said support plates 428 is connected to one end of a pneumatic or hydraulic cylinder 431 that is operable to effect sliding movement of the support frame assembly. The plates 427, 428 carry a delivery tube or buffer magazine 432 that extends parallel to and between the rods 426. Service cables or ducts 433 may also be routed through the plates 427, 428 alongside the delivery tube 432. The transfer station 425 is disposed below the lower plate 428 and carries a pusher assembly 434 (described in detail below).

The transfer station 425 has an outlet 435 through which rivets are transferred into the nose 436 of the rivet setting tool 420 when the station is in register with a side port 437 of the nose 436. Immediately above the outlet 435 the surface of the transfer station housing facing the nose is configured to define a ramp 438 that is inclined upwardly in a direction away from the nose. The surface terminates with a hook 439 that is designed to co-operate with a roller 440 supported on a guide bush 441 immediately above the nose. The ramp 438 and roller 440, in use, act respectively as a cam surface and cam follower and may take any appropriate form. It will be appreciated that in an alternative design the cam surface may defined on the nose and the cam follower on the transfer station housing.

In operation, the rivet setting tool 420 is at rest in a fully retracted position shown in FIG. 36*a*. In this configuration the cylinder 432 , support frame assembly 424 and transfer station 425 are retracted so that a rivet may be loaded from the outlet of the transfer station 425 to the side port 437 in the nose 436. The hook 439 on the transfer station housing is in engagement with the roller 440 defined on the nose 436. When the tool is instructed to insert a rivet the nose 436 descends and simultaneously the cylinder 432 pushes the support frame assembly 424 downwardly and inwardly (about pivot P2) so that the transfer station 425 remains in abutment with the nose 436 (FIG. 36*b*). The rotational moment of the transfer station 425 towards the nose is sufficient to hold it there against any reaction force created by operation of the pusher assembly. The engagement of the hook 439 and roller 440 also ensure that the transfer station 425 is held against the nose 436. When the cylinder 431 has reached its full extension and the stop collars 430 abut the cylindrical bearings 429 of the second bracket 423 the transfer station 425 is unable to advance any further with the nose 436. Continued descent of the nose 436 causes the roller 440 to move out of engagement with the hook 439, along a short linear path and then to ride over the ramp 438. This forces the support frame assembly 424 to pivot about pivot P2 so that the transfer station 425 moves clear of the nose 436 (FIG. 36*c*).

While the nose 436 is still in engagement with the transfer station 425 it is prevented from rotating.

When the nose 436 ascends after completion of the rivet insertion operation the roller 440 re-engages with the surface of the transfer station housing and eventually with the hook 439. At this point a rivet load sensor (not shown) detects the re-engagement and may then send a control signal to initiate loading of the next rivet from the transfer station (FIG. 36*b*).

The transfer station is designed to be disconnectable from the rest of the equipment by means of an automatic robotic handler. The station disconnects not only mechanically but also from the services. This enables it to be interchanged with transfer stations for other rivet sizes or simply for maintenance purposes. The disconnected station may carry with it the buffer magazine. Movement of the transfer station clear of the nose allows unwanted rivets in the station or buffer to be expelled by the pusher assembly into any appropriate receptacle.

An exemplary embodiment of a transfer station pusher assembly 434 referred to above will now be described in more detail with reference to FIGS. 37*a* to 37*d*.

A pusher assembly housing 460 defines a channel section 461 in which rivets 50 are transported. The section is in line with the exit of a delivery tube or buffer magazine 462 of T-shaped cross-section. At the end of the pusher housing 460 nearest the nose 436 there is disposed a pair of resilient fingers 463 that form a spring gate 464. Located behind the gate 464 is a pair of elongate pushers 465 that are longitudinally slidable in complementary slots 466 provided in the housing walls. The pushers 465 are inclined inwards towards the channel 461 and are moveable between a fully extended position in which their ends pass beyond the gate 464 and occupy the channel 461 and a retracted position in which they are clear of the channel 461. It will be appreciate that a single pusher and finger may be used.

In operation, rivets 50 are propelled from the delivery tube or buffer magazine 462 until they reach the spring gate 464 which in its rest position prevents escape of the rivets 50 from the housing 460. At this point in time the pushers 465 are fully retracted (FIG. 37*b*). When an appropriately positioned rivet sensor detects the presence of the leading rivet 50 the propelling air supply may be turned off if necessary and the pushers 465 are then advanced partially to the position shown in FIG. 37*c* in which their ends engage the stem 50*a* of the leading rivet 50 so as to move it into abutment with the spring gate 464. The pushers 465 are disposed at a precise angle with respect to the channel 461 so that they are able to pass the stem of the rivet second in line but engage with the leading rivet. In this position the pushers 465 bypass the second rivet so as not to cause any further forward movement of it. The pushers 465 then advance further to push the leading rivet 50 through the spring gate 464 and into the nose 436 via the side port 437 (FIG. 37*d*). The pushers 465 may be moved by any appropriate actuator. In one exemplary embodiment they are held in the retracted position by a pneumatic cylinder. When the rivet sensor is triggered the cylinder is deactivated and the pushers 465 are biased into forward movement by springs (not shown)

This simple design allows the escapement of a single rivet from a queue of multiple rivets and transfer of it from a transfer station and into the nose. It will be appreciated that the same structure may be used in any situation where it is necessary to separate a single rivet from a queue for transfer. For example, the mechanism may be used to count one or more individual rivets egressing from one package tube before supply is switched to a package tube housing a different sort of rivet.

FIGS. 38*a* to 38*e* show an alternative embodiment of the internal configuration of a transfer station with pusher assembly for loading a rivet into a side port of the setting tool nose. This may be used in any type of side loading transfer station. The figures show a chronological sequence of steps for loading of a rivet into the nose.

A vertical rivet delivery tube 480 enters the transfer station housing 481 from above and to one side. Inside the housing 481 it bends through 90° into a horizontal plane and merges with a continuation channel 482 in the station. The channel 482 has a double bend 483 of reverse S-shape in the horizontal plane and terminates at the transfer station outlet 484 that communicates with the rivet delivery passage 485 in the nose 436 via a side port 437 in the nose. On the opposite side of the transfer station housing a pusher 486 is disposed with its longitudinal axis aligned with the outlet 484. The pusher 486 is reciprocal in the housing 481 in a longitudinal direction when acted upon by a probe spring 487 that is in turn acted upon by a pneumatic cylinder 488. It will be appreciated that any other appropriate actuator may be used.

At the outlet 484 there is a rivet gate 490 comprising a pair of vertical pins 491 that are biased to close partially the outlet 484 by means of an adjacent rubber spring 492. Immediately behind the gate 490 there is disposed a rivet present sensor 493.

In operation, the pusher is biased by the probe spring 487 to an at-rest position, as shown in FIG. 38*a*, where it partially occupies the channel 482. When an appropriate control signal is received the cylinder 488 retracts the pusher 486 against the bias of the probe spring 487 until the pusher 486 is clear of the channel 482 so as to allow rivets 50 to proceed to the gate under the propulsion of compressed air or the like (FIG. 38*b*). The leading rivet is prevented from exiting through the outlet 484 of the transfer station by the presence of the gate 490. When the rivet sensor 493 detects the presence of the leading rivet 50 the pusher 486 is released by the cylinder 498 so that the probe spring 487 pushes it against the stem 50*a* of the leading rivet 50 thereby trapping the rivet at the gate 486 (FIG. 38*c*). Upon receipt of the appropriate control signal the pusher 486 is then extended by the cylinder 488 to push the rivet 50 through the outlet 484 and into the nose 436 via the side port 437 (FIG. 38*d*).

The transfer station described above allows rivets to be fed to an intermediate position outside of the nose. Since the end of the delivery tube is offset from the nose debris from the delivery tube can be removed by injection of a blast of air in a direction such that the debris not directed into the nose but egresses from a clearance port in the transfer station.

In certain applications it is desirable to transfer a rivet to the front end of the nose rather than to a side port as described in the examples above. In such applications retaining means are provided at the nose or the punch within the nose. The embodiments of FIGS. 39 to 54 show several alternative embodiments of the internal configuration of transfer stations used in such applications in which the transfer station is moved between a first position in which it docks under the nose or punch to load a rivet and a second position in which the transfer station is clear of the nose or punch to allow the riveting operation to be effected.

In the embodiment of FIGS. 39 to 42 the rivet setting tool has a punch or nose with an axial bore that is connected to a source of suction pressure (as described in our UK patent No. 2302833). Where a vacuum punch is used a rivet setting tool without a supporting nose can be employed.

The vertical rivet delivery tube 500 enters the transfer station housing 501 from above and to one side as before. Inside the housing 501 it bends through 90° into a horizontal plane and merges with a continuation channel 502 (of T-shaped cross section) in a base 503 of the station 501. The channel 502 is closed at its end nearest the nose 504 and is at least partially covered by a cover plate 505 that is slidably mounted on the base 503. The cover plate 505 has an arcuate recess 506 at its leading edge 507 for docking with the nose 504 (or punch) of the rivet setting tool. The rear upper surface of the cover 505 has a ramped surface 508 that is designed to co-operate with a complementary surface 509 of a wedge member 510 disposed behind the cover plate 505. Compression springs 511 bias the cover plate 505 into an extended rest position as shown in FIGS. 39*a, b, c*. The wedge member 510 is vertically movable against the bias of a second compression spring 512 disposed vertically between an overhang 513 in the housing 501 and an upper surface of the wedge member 510. Adjustable stops 514 are provided in the overhang 513 to allow the length of vertical travel of the wedge member 510 (and therefore horizontal travel of the cover plate 505) to be preset. The cover 505 carries a rivet separator finger 515 that is slidably mounted between the cover 505 and the base 503, an upstanding pin 516 on the finger 515 engaging in a diagonal slot 517 of the cover 505. The entire transfer station 501 is moved on a spring-loaded vertical shaft 518 disposed at the rear.

In operation, the cover 505 is initially in an at rest position in which it is extended over most of the channel 502 and held in position by the spring biased wedge member 510. In this configuration rivets 50 are supplied via the delivery tube 500 to the transfer station 501 where they are held in the channel 502. The leading rivet is partly exposed by the cover 505 whereas the following rivets are retained in the channel 501 by the cover 505 and wedge member 510 (FIG. 39).

The transfer station 501 is then moved to dock with the nose 504. The biasing spring 519 of the vertical shaft 518 biases the transfer station 501 towards the front end of the nose 504. An inclined face 520 on the leading edge of the base 503 serves to compensate for vertical misalignment between the nose 504 and transfer station 501 and ensures the end of the channel 502 in the transfer station is brought into tight register with the nose. When the transfer station 501; is in close proximity the nose 504 abuts the arcuate recess 506 of the cover 505 and moves it against the biasing force to a retracted position. This movement effects vertical displacement of the wedge member 510 by virtue of the interaction of the ramped surfaces 508, 509 (FIG. 40 nose not shown in plan view). When fully docked (the final position being controlled by the adjustable stops 514) the nose 504 is coaxial with the lead rivet 50. During movement of the cover plate 505 the separator finger 515 is displaced horizontally relative to the channel 502 by virtue of the interaction of the pin 516 and slot 517. When the nose 504 is docked the finger 515,is fully extended and separates the leading rivet 50 from those behind whilst ensuring it is held in position against the end of the channel 502 (it will be appreciated that the finger 515 is designed not to grip the rivet too tightly). The separation of leading rivet from the rivet immediately behind ensures there is no contact between their respective heads that may interfere with movement of the leading rivet into the nose.

At the appropriate point in the cycle and when the presence of the leading rivet 50 is detected by a rivet sensor 521, vacuum is applied through the nose 504 (or punch) and the rivet 50 is lifted vertically out of the transfer station 501 (FIG. 41). The surface of the separator finger 515 provides guidance to ensure the rivet does not tumble before reaching the end of the punch. The rivet sensor 521 detects the absence of the rivet and sends a control signal confirming that the rivet has been successfully transferred. The transfer station 501 is then retracted from the nose 504 and the cover 505, finger 515 and wedge member 510 revert to their rest positions and await the next rivet (FIG. 42).

FIGS. 43 to 45 show a modified embodiment of rivet setter of FIGS. 39 to 42 in which the punch 550 has an axial bore 552 to which a source of suction pressure or vacuum is applied. In the embodiments shown in FIG. 44 and 45 there is provided a clamping member 553 for around the punch 550. The clamping member 553 applies a clamping force to the workpiece prior to insertion of the rivet into the workpiece as is described in our European Patent No. 0675774. In the embodiment of FIG. 43 the pre-clamping member 553 comprises two diametrically opposed portions flanking the punch 550 whereas in the embodiment of FIG. 44 the pre-clamping member 553 fully encloses the circumference of the punch 550 and a side port 554 in the nose 551 is provided for the incoming rivet 50.

FIGS. 46 to 52 show an alternative embodiment of a transfer station that is used to feed rivets to the end of the rivet setter nose (i.e. into the end of the nose from which it is discharged during the riveting operation). The figures show the chronological sequence for loading of the rivet.

The rivet setter 650 is of conventional design and is therefore not described in detail here except in so far as is relevant to the interaction with the transfer station which is the inventive aspect of this embodiment. The transfer station 651 is connected to the rivet setter 650 by a bracket 652 disposed above the nose 653 and comprises a lever 654 that is pivotally connected at one end to the bracket 652 by a first pin 655 and at the other end by a second pin 656 to the end of a piston 657 of a pneumatic or hydraulic cylinder 658 (it is to be appreciated that other suitable actuators may be used instead). A torsion spring 659 is supported around pin 655 and serves to bias the lever 654 in a clockwise direction against a rigid rivet feeder tube 660 that releasably connects co-axially to the end of a rivet delivery tube or magazine (shown only in FIG. 46) and is secured to the lever 654. The free end of the feeder tube 660 bends towards the nose 653 of the rivet setter 651. A delivery arm 661 is pivotally connected to a rearwardly extending lug 662 of the feeder tube 660 and extends parallel to the end portion thereof, towards the nose, in a slot on the underside of the feeder tube 660. The free end of the delivery arm 661 has a small upstanding projection 663 that is designed, in use, to engage with a rivet 664. The opposite end of the delivery arm 661 is connected to the lever 654 by connecting rod 665.

Figure 46:
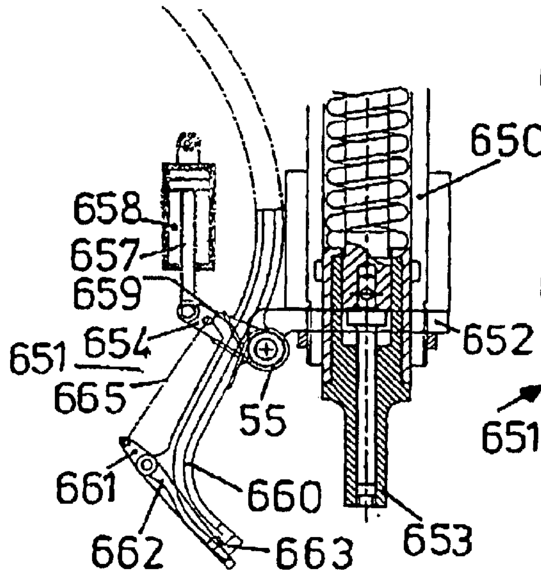

In use, rivets are fed under compressed air down the delivery tube and into the feeder tube 660 of the transfer station 651 whereupon they are transferred singly into the end of a rivet delivery passage 666 in the nose 653 as will be described below. When the rivet 664 is present in the end of the nose 653 (as shown in FIG. 46), the nose of the setting tool 650 is indexed towards the workpiece (FIG. 47) and a punch 667 in the delivery passage 666 extends downwardly to force the rivet 664 into the workpiece (FIG. 48) as is well known. The rivet 664 is releasably retained in the end of the rivet delivery passage 666 by any suitable retention means (e.g. vacuum, Velcro. adhesive, spring loaded balls etc.) such as those described in our UK Patent No. 2302833.

Figure 47:
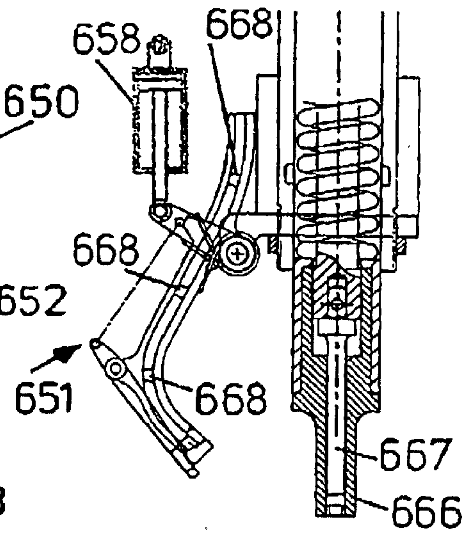
Figure 50:
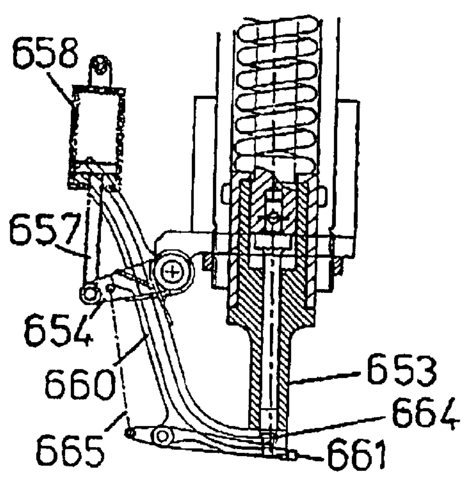
Figure 51:
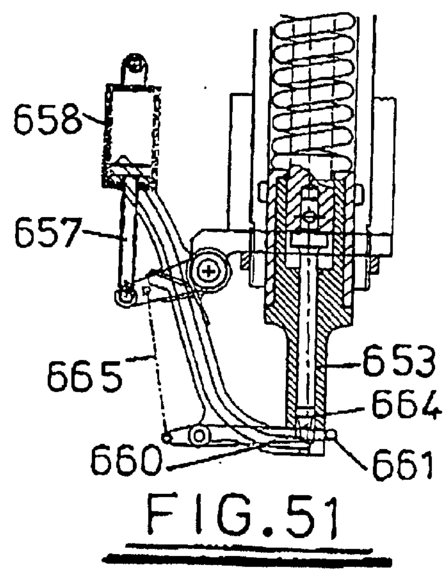
Figures 48, 49, 52, 53:
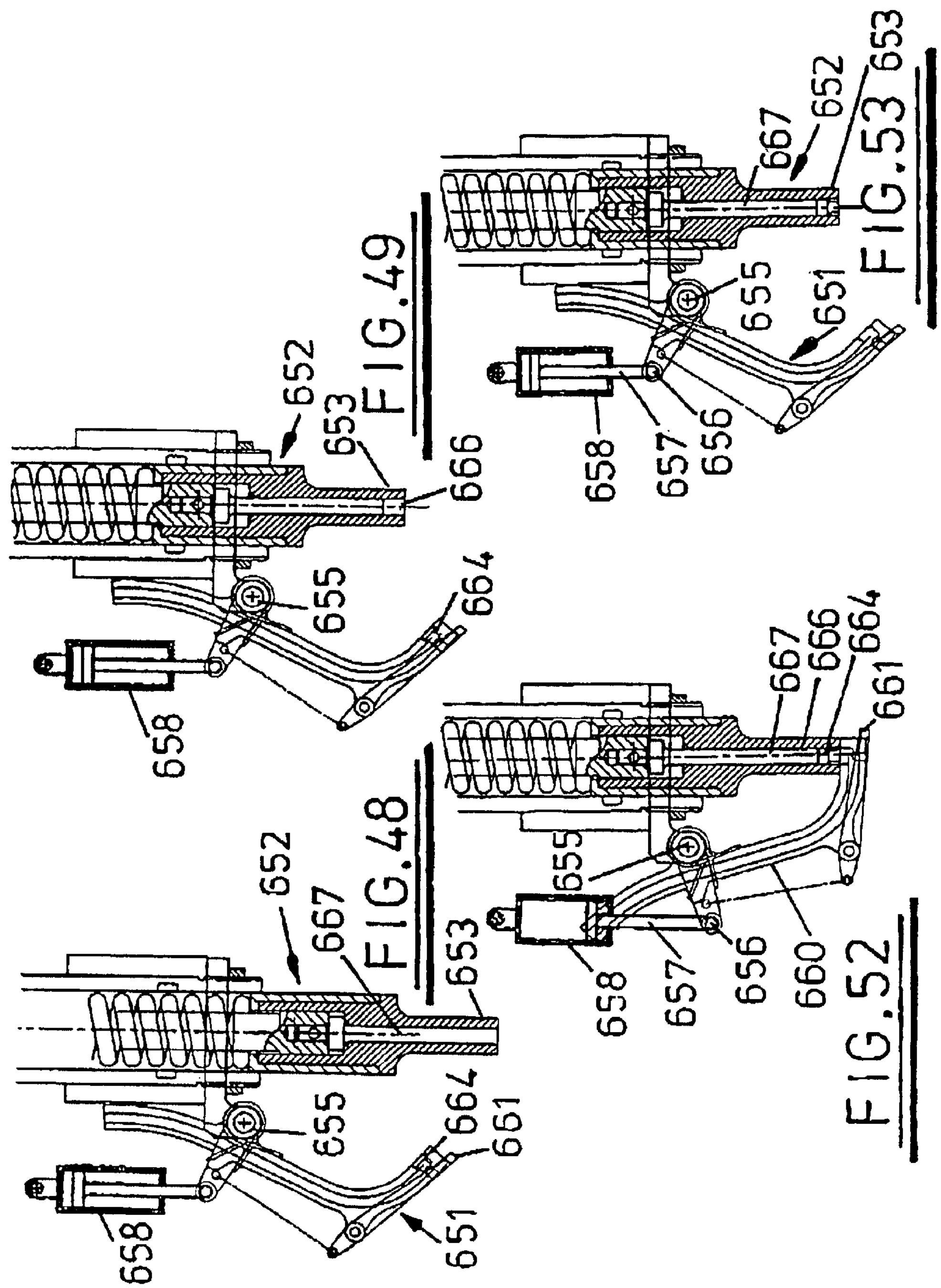

As the punch 667 is indexing towards the workpiece (not shown in the figures), further rivets are delivered to the feeder tube 660 from any appropriate feeder mechanism as described above. Several rivets 668 are shown in the feeder tube 660 of FIG. 46. The leading rivet 664 abuts the upstanding projection 663 (described in detail below) on the delivery arm 661 where it is retained until the nose 653 is fully retracted and ready to be loaded (as shown in FIG. 47). The piston 657 in the cylinder 658 is then extended so as to pivot the lever 654 and feeder tube 660 about pin 655. This action pivots the feeder tube 660 towards the end of the nose 653 until the leading rivet 664 retained at the end of the feeder tube 660 is presented to the end of the delivery passage 666 in the nose 653 as shown in FIG. 50. Further extension of the piston 658 serves to pivot the delivery arm 661 upwards and to tension the torsion spring 659 (via the connecting rod 665 and lever 654) through a small angle so that it pushes the rivet 664 into the end of the delivery passage 666 where it is retained by the retention means (see FIG. 49). The gripping force of the retention means (not shown) is designed to be greater than that provided by the projection 263 in the delivery arm 661 so that transfer of the rivet 664 is smooth and unhindered. The piston 658 is then retracted slightly to pivot the delivery arm 661 out of engagement with the rivet 664 (FIG. 52) and full retraction moves the transfer station clear of the nose 653 (FIG. 53). The nose 653 then has a clear path to extend relative to the transfer station 661 (FIG. 47) and insert the rivet 664 into the workpiece (FIG. 48). A sensor (not shown) may be provided at the end of the feeder tube 660 or the delivery arm 661 to detect the presence of a rivet 664 before loading it into the nose 653.

The above arrangement can be used with any length of nose and stroke length of the rivet setter. The rivet transfer station, being moveable away from the nose, does not risk fouling the riveting process and does not have to be designed to withstand the clamping and insertion forces associated with the riveting process. Moreover, by eliminating the need for a side entry port the cross section of the nose is not weakened. By moving the delivery tube/feeder tube combination with the transfer station only a single transfer movement is required to transfer the rivet to the delivery passage in the nose thereby eliminating the need for a separate mechanism to transfer the rivet from the end of the delivery tube a mechanism that loads the nose.

Figure 54A:
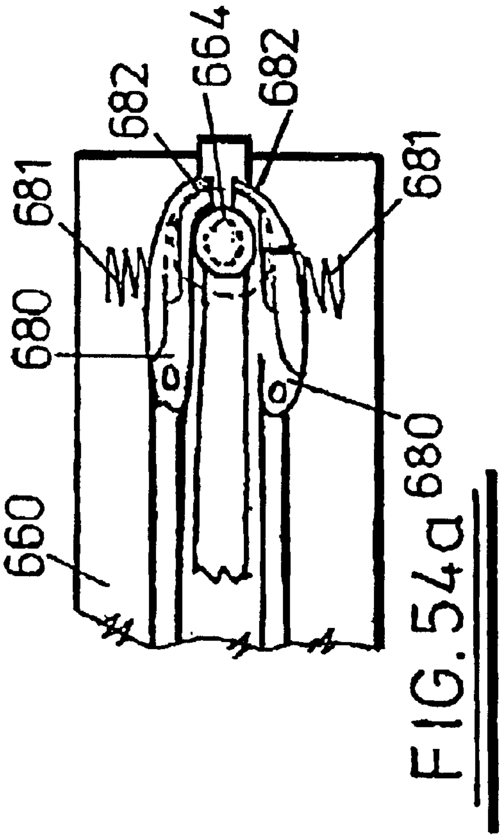
Figure 54B:
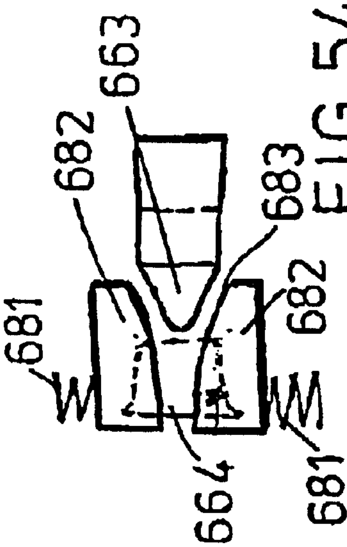

In a modified embodiment of the above, the upstanding projection 663 on the delivery arm 661 is supplemented with a pair of spring biased fingers 680 mounted on the feeder tube 660 as shown in FIGS. 54*a, b, c, d*. The fingers 680 extend along the feeder tube 660 and are biased together by compression springs 681 so that tips 682 of the fingers 680 are nearly in contact. The tips 682 of the fingers 680 trap an incoming rivet 664 and retain the rivet 664 in place until the upward movement of the delivery arm 661 separates the fingers 680 and directs it into the nose 653. The fingers 680 are chamfered (at 683) so as to receive the arm 661. The compression springs 681 of the fingers 680 serve to absorb the momentum of the rivet 664 without any impact damage.

Figure 54C:
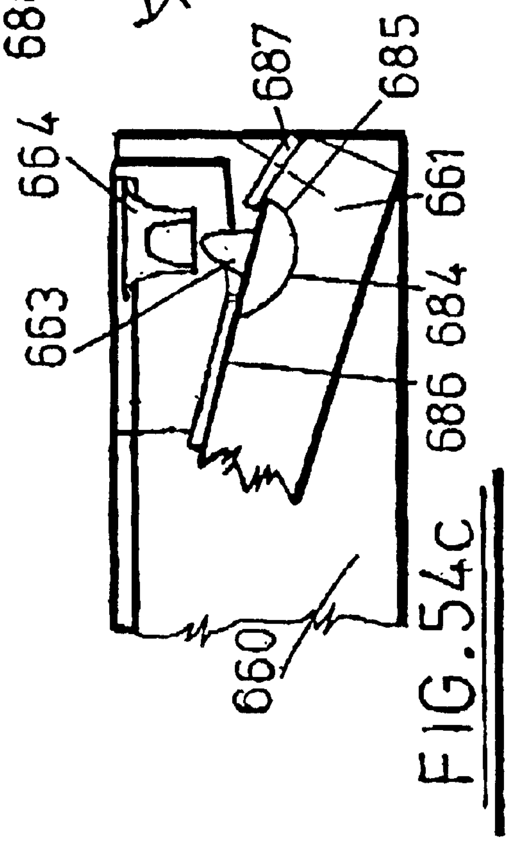
Figure 54D:
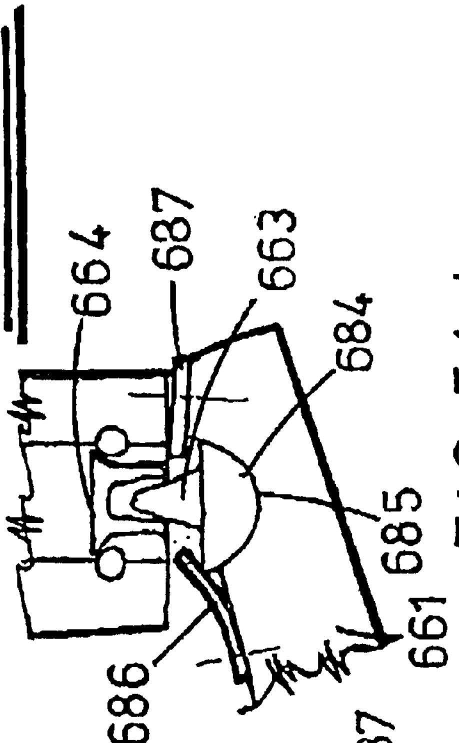

The upstanding projection 663 is mounted on a rounded support 684 that is received in a complementary recess 685 such that it is able to be tilted so as to accommodate both short and long stem rivets. The spring plate 686 and keeper plate 687 retain the projection 663 in place as shown in FIGS. 54*c* and 54*d*.

An alternative embodiment of a transfer station for rotating the rivet through 90° is illustrated in FIGS. 55 and 56. Rivets are again loaded singly into the transfer station 700 via a vertical delivery tube 701 or magazine and are received in a rivet retainer disposed below the tube exit. The station has a transfer mechanism comprising a plunger and an elongate pusher arm assembly 702, 703 that are slidable together within a cylindrical housing 704. The assembly is moved by an actuator 705 disposed at the end of the housing 704 opposite the nose N. The plunger 702 is cylindrical with a helical slot 706 along part of its length that receives a pin 707 fixed in the housing 704, and is rotatably mounted in the housing 704. At the free end of the assembly 702, 703 there is a spring-loaded pivotal retaining arm 708 which is biased towards the end of the plunger 702 so as to retain a rivet 709 securely such that its head abuts against the outside diameter of the end of the plunger 702 as shown in FIG. 56.

In operation, a rivet 709 egressing from the delivery tube 701 is received by the retaining arm 708. Axial movement of the assembly 702, 703 by the actuator 705 moves the rivet 709 towards the nose N in the direction of arrow Y thereby separating it from the delivery tube 701. Thereafter, further rectilinear movement of the assembly 702, 703 causes it to rotate through 90° relative to the housing 704 by virtue of the slot 706 in the plunger 702 moving over the fixed pin 707. After the rotational movement is complete the pusher arm 703 is extended relative to the plunger 702 so as to move the rivet 709 beyond the retaining arm 708 and into a delivery passage 710 of the nose N via a side port 711.

FIGS. 57 and 58 show part of a transfer station that has two incoming rivet delivery tubes so that rivets from two different sources may be provided to a single transfer station. This enables rivets of two different types to be supplied to the nose or a second back-up supply of rivets to be provided.

The inlet tubes 800, 801 in the embodiment shown are approximately at right angles and meet adjacent the setter tool nose N. At the intersection of the tubes 800, 801 there is disposed a rotary gate 802 that is slotted (at 802*a*) to receive a single rivet. An outlet track 803 interconnects the rotary gate 802 with a delivery passage 804 in the nose N. Intermediate the two delivery tubes 800, 801, and adjacent the gate 802, is a reciprocal pusher arm 805.

The gate 802 is moveable by a rotary actuator (not shown) between three positions. In a first position the slot 802*a* is in alignment with the first inlet delivery tube 800 (shown in FIG. 57) and in the second position (not shown) it is in alignment with the second delivery tube. In these positions the gate 802 is able to receive an incoming rivet 50 (shown in dotted line). Side walls of the slit 802*a* have a resilient lining (such as spring steel strips 808 as shown in the embodiments of FIGS. 57 and 58) that releasably grips the rivet 50 so that it is retained by the gate 802. In a third position, intermediate the first two portions, the slot 802*a* is in alignment with the outlet track 803. In this position subsequent incoming rivets 807 are prevented from entering the gate 802 and the pusher arm 805 is indexed forward to force the rivet 805 out of the gate 802 and into the nose N (see FIG. 58). Rotation of the gate 802 may serve to separate the collected rivet from the following rivets. The gate 802 may be rotated to the intermediate third position once it has received the incoming rivet prior to the supply of pressurised air being switched off.

Each of the transfer station embodiments described above ensures that the rivets are loaded sequentially into the nose in a controlled fashion.

FIGS. 59 and 60 show exemplary embodiments of escapement mechanisms used to control the flow of rivets from the packages to the transfer station and/or the buffer magazines. The mechanisms are designed to allow the rivets to be buffered at an intermediate point along the or each delivery tube and to control the timing final delivery of any particular rivet to the transfer station or magazine.

In the embodiment of FIGS. 59*a* and 59*b* the rivets 50 are depicted in a delivery tube 6 of round cross section. The may be free to fall under gravity or may be propelled by, for example, compressed air. On each side of the delivery tube 6 there is an endless loop belt 900 of resilient material that circulates around a pair of spaced drive wheels 901. The belt 900 is designed to project into an elongate slot 903 in the side wall of the delivery tube so as to contact the rivets 50 in frictional engagement. The belt drive is controlled by a sensor (not shown) that detects the presence of a rivet at a predetermined position. The belt 900 has an indexed drive so that the rivets 50 may be moved in step-wise fashion toward a release position 902 at the end of the mechanism. With the belt 900 stationary the rivets 50 are held against movement in the tube so as to form a buffer. When an appropriate demand control signal is received the belt 900 is indexed to release a predetermined number of rivets at the release position 902 into the remaining portion of the delivery tube 6. The sensor is associated with a counter so as to control the number of rivets released before switching off the drive.

FIGS. 60*a* and 60*b* shows a similar escapement mechanism for a delivery tube of T-shaped cross-section.

In both instances the mechanism can release single or multiple rivets to the transfer station or buffer.

It will be appreciated that the belt may be replaced by an alternative drive mechanism such as a rotary wheel whose periphery projects through the wall of the delivery tube so as to contact the rivets.

Figure 61:
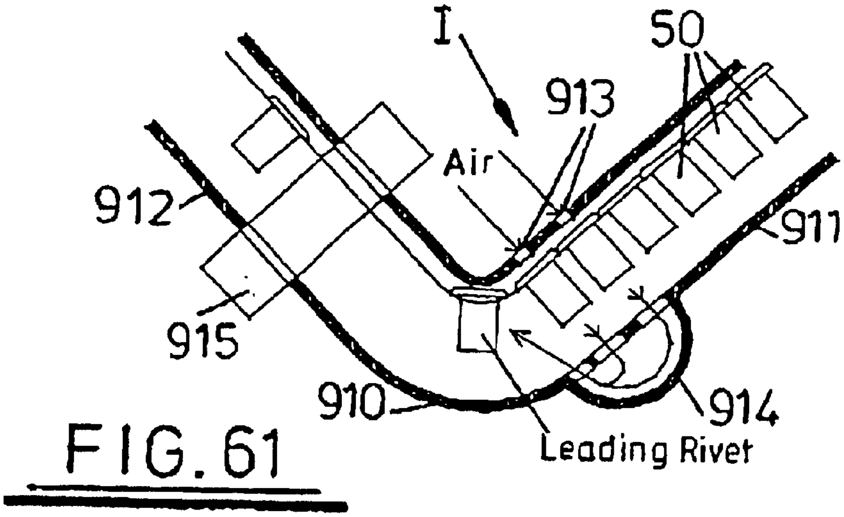

FIG. 61 illustrates an alternative in-line escapement mechanism I. The delivery tube 6 has a right-angled bend 910 that divides the tube into an incoming portion 911 and an outgoing portion 912. Rivets 50 are fed into the incoming portion 911 by gravity (although alternatives include air propulsion or a linear feed) and gather at the bend 910 where they are prevented from further travel. At this point the leading rivet 50 is aligned with the outgoing portion but cannot travel further through lack of propulsion.

A pair of transverse air passages 913 are disposed in the wall of the incoming portion 911 and are connected to a source of pressurised air (or other fluid). On the opposite wall of the incoming portion there is a curved air recirculation chamber 914.

In use air is injected into said apertures 913 in response to a control signal to release a rivet 50 into the outgoing portion 912. The air blast serves to hold the rivets 50 that are second and third in line in place and is then redirected by the chamber 914 in the direction of the arrows shown so that it is incident on the leading rivet 50 and propels it into the outgoing portion 912. In this way only the lead rivet is released each time the air is injected through the apertures 913. A ring sensor 915 senses the passage of the released rivet 50 and may be connected to a counter. The outgoing portion 912 of the tube may only be short before it connects to the main delivery tube and therefore the air blast may be of limited strength.

It will be understood that any number of transverse apertures 913 may be used in practice.

Figure 62:
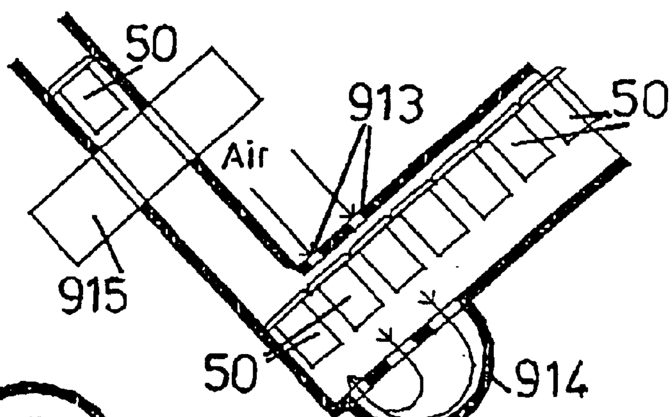
Figure 63:
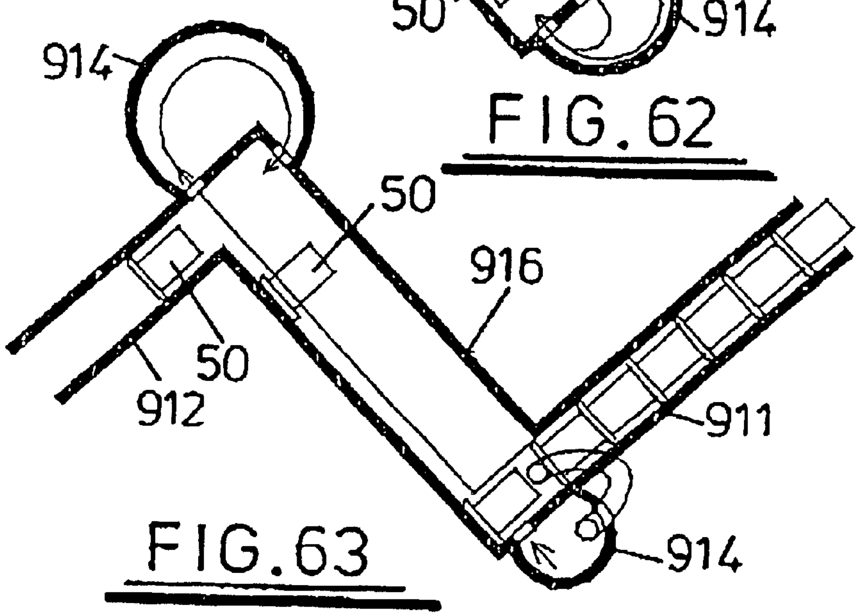

FIG. 61 shows an embodiment with incoming and outgoing tubes of T-shaped cross-section, whereas the embodiment of FIG. 62 shows an outgoing portion of round cross-section. The embodiment of FIG. 63 shows a double bend with an intermediate portion 916 of T-shaped cross-section and the incoming and outgoing portions of round cross-section.

Figure 64:
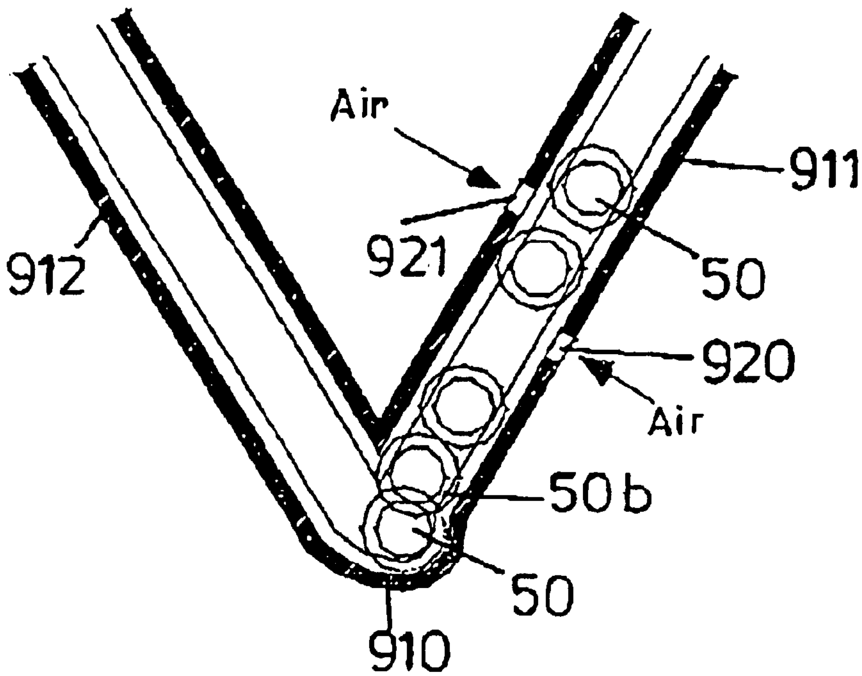

Finally FIG. 64 shows how offset transverse air passages 920, 921 may be, used to separate groups of rivets 50. The passages 920, 921 trap an incoming stack of fasteners further upstream from the bend 910 so as to provide a buffer arrangement. Air is first injected through the first passage 920 and then through the second passage 921 in addition before the air through the second passage 921 is switched off to release the first rivet. The leading rivet at the bend is prevented from moving around the bend 910 by virtue of being engaged with the head 50*b* of the second rivet 50. A separate air blast in line with the outgoing portion of the tube is used to move the first rivet when required.

It is to be appreciated that the in-line escapement mechanism may be used in combination with existing rivet delivery apparatus and may be used at the feeder release end of the delivery tube.

It is to be understood that the different features of the fastener machine and the fastener delivery apparatus described above may be used in combination as a single system or may be used individually in combination with conventional equipment.

What is claimed is:

1. Fastener setting apparatus for a fastener setting tool comprising a package preloaded with fasteners, at least one fastener delivery tube for interconnecting the setting tool to a fastener feeder device that releases selected fasteners from the package into the delivery tube, the fasteners being transportable individually or in groups in the tube from the feeder device to the tool, a transfer station attached to the tool or the delivery tube for transferring a fastener from the delivery tube into the tool, the transfer station being moveable between a first position in which an exit of the transfer station is adjacent to the tool so that a delivered fastener may be inserted by the transfer station into the tool and a second position in which it is clear of the tool so as to permit the tool or a portion thereof to move towards a workpiece to insert a loaded fastener charaterised in that there is provided an intermediate buffer for fasteners at or proximate to the transfer station tool so that multiple fasteners may be held at the transfer station and in that the delivery tube is releasably connectable to said intermediate buffer by an automatic docking device.

2. Fastener setting apparatus according to claim 1, wherein the docking device comprises a first portion connected to an outlet end of the delivery tube and a second portion connected to an inlet end of the intermediate buffer, the first and second portions being moveable relative to each other to engage and provide a fastener path between the tube and the buffer, the first portion having a fastener retention gate that is closed by a biasing member when the portions are disengaged and is opened against the force of the biasing when the portions are engaged.

3. Fastener setting apparatus according to claim 2, wherein the fastener retention gate comprises a pair of retaining fingers, the fingers at least partially blocking the fastener path when the gate is closed.

4. Fastener setting apparatus according to claim 2, wherein the second portion comprises an inlet gate that is closed when the portions are disengaged and is open when the portions are engaged.

5. Fastener setting apparatus according to claim 4, wherein the inlet gate comprises a pair of laterally moveable jaws that in the closed position at least partially block the fastener path and in the open position are moved laterally clear of the fastener path by abutment with the fastener retention gate.

6. Fastener setting apparatus according to claim 1 wherein the transfer station is moveable relative to the setter tool by means of an actuator.

7. Fastener setting apparatus according to claim 6, wherein the actuator operates to pivot the transfer station relative to the setting tool and to hold it against the tool.

8. Fastener setting apparatus according to claim 7, wherein the transfer station also moves in a linear path relative to the setting tool.

9. Fastener setting apparatus according to claim 1, wherein the transfer station has a cammed surface for abutment with a cam follower portion of the setting tool and, in use, movement of the transfer station relative to the setting tool is governed by interaction of the cammed surface with the cam follower.

10. Fastener setting apparatus according to claim 9, wherein the transfer station is mounted on a frame that is pivotally connected to the setting tool, the frame being extensible so as to move the transfer station in a direction substantially parallel to the direction of extension of a nose of the setting tool.

11. Fastener setting apparatus according to claim 10, wherein said frame also supports a portion of said delivery tube.

12. Fastener setting apparatus according to claim 1, wherein the transfer station operates to load a fastener through side port in a nose of the setting tool.

13. Fastener setting apparatus according to claim 12, wherein the transfer station further comprises an automatic pusher assembly that is actuable to push a fastener from the station into the nose.

14. Fastener setting apparatus according to claim 13, wherein the pusher assembly comprises at least one pusher member for pushing a leading fastener in the transfer station towards an outlet of the station and a gate disposed at the outlet and which is biased closed so as to close at least partially the outlet and to retain the leading fastener at the outlet until the fastener is pushed therethrough by the pusher member.

15. Fastener setting apparatus according to claim 14, wherein the transfer station further comprises a fastener transport channel in which fasteners are transported to the outlet, the pusher member being moveable between a retracted position in which it is clear of the channel and an extended position in which it projects into the channel and engages the leading fastener and pushes it through the gate and the outlet, the pusher member being disposed such that when moving between the retracted and extended positions its path does not intersect with subsequent fasteners disposed behind the leading fastener.

16. Fastener setting apparatus according to claim 14, wherein the transfer station further comprises a fastener transport channel in which fasteners are transported to the outlet, the pusher member being moveable between a retracted position in which it is clear of the channel and an extended position in which it projects into the channel and engages the leading fastener and pushes it through the gate and the outlet, wherein the channel has a tortuous passage ending in a final section adjacent the outlet sufficient to retain only a single fastener, the path of the pusher member between the retracted and extended positions intersecting the final section such that when extended the pusher member moves only the leading rivet occupying the final section through the gate.

17. Fastener setting apparatus according to claim 1, wherein the transfer station operates to load a fastener into engagement with an end of a nose or punch of the setting tool.

18. Fastener setting apparatus according to claim 17, wherein the transfer station comprises a channel for transporting rivets to an outlet for transfer to the nose or punch of the setting tool and sliding cover member that is slidable between an at rest position in which the channel is substantially covered and a retracted position in which a leading portion of the channel adjacent the outlet is exposed so as to provide access to a leading fastener in the channel for said nose or punch.

19. Fastener setting apparatus according to claim 18, wherein the cover member is biased by a biasing member to the at-rest position and is moved against said biasing force by the nose or punch, such that when in the retracted position the nose or punch is aligned with the outlet so as to receive said leading fastener.

20. Fastener setting apparatus according to claim 19, wherein the nose or punch engages into a leading edge of the cover member to effect movement of the cover against the biasing force of the biasing member.

21. Fastener setting apparatus according to claim 20, wherein the travel of the cover member is limited by means of an adjustable stop.

22. Fastener setting apparatus according to claim 20, wherein the cover member has a ramped surface that interacts with a complementary ramped surface on an adjacent wedge member such that movement of the cover member towards the retracted position causes movement of the wedge member in a different plane, the travel of the wedge member being limited by said adjustable stop.

23. Fastener setting apparatus according to claim 18, wherein the cover member has a separator member that is moved into a position in which it projects into said channel so as to separate said leading portion of the channel from the remainder.

24. Fastener setting apparatus according to claim 23, wherein the separator member rides in slot defined in the cover member.

25. Fastener setting apparatus according to claim 1, the fastener package comprising a plurality of sealed channels containing fasteners, the channels being interconnected by a flexible web.

26. Fastener setting apparatus according to claim 25, the fastener feeder device comprising means for opening at least one channel of said fastener package so as to release the fasteners into said delivery tube.

27. Fastener setting apparatus according to claim 26, wherein the feeder device further comprises a blade for severing said at least one channel.

28. Fastener setting apparatus according to claim 27, wherein the fastener package comprises a tube in said channel, the tube having an integral closure member for retaining fasteners in said tube, the closure member being openable by engagement with a release member of the fastener feeder device.

29. Fastener setting apparatus according to claim 1, the fastener package comprising a plurality of closed tubes containing fasteners, the tubes being housed in a support container, the fastener feeder device comprising a conveyor on which the container is disposed and a release mechanism that passes through the conveyor to open at least one of said tubes to release said fasteners into a delivery tube.

30. Fastener setting apparatus according to claim 29, wherein the tube has a closure member that is openable by engagement with a tube release mechanism.

31. Fastener setting apparatus according to claim 30, wherein the release mechanism is moveable laterally of the conveyor.

32. Fastener setting apparatus according to claim 1, wherein said feeder device comprises a support on which are mounted a plurality of containers each containing fasteners in vertical array, and a release mechanism that is moveable to an underside of the support, the release mechanism comprising a carriage captively fitted to the support and a chamber for receiving at least one fastener from a container, an actuator for directing the fastener out of the carriage into a delivery tube and release means for releasing a fastener from the container, characterised in that the release mechanism further comprises a guide element that engages a complementary guide element on the support so that its movement under the support is along a predetermined path.

33. Fastener setting apparatus according to claim 1, wherein said feeder device comprises a hopper having at least one aperture into which a sealed container of fasteners is releasably secured, a gate which is moveable relative to the hopper between positions which open and close the aperture and a reservoir into which released fasteners are dispensed, wherein the container has a frangible seal that is broken when the feeder device is satisfied that the contents are correct so as to release the fasteners, the gate moving to the open position to pass the fasteners to the reservoir.

34. Fastener setting apparatus according to claim 1, wherein there is provided a fastener escapement device having a moveable surface that projects through an aperture provided in the delivery tube so as, in use, to trap at least one fastener in the delivery tube, the escapement device further comprising a drive for selectively indexing said surface so as, in use, to move the at least one fastener in the delivery tube towards a release position.

35. Fastener setting apparatus according to claim 34, wherein the escapement device further comprises a sensor at the release position for sensing the presence of a fastener, the sensor being associated with a counter for counting the number of fasteners that pass the release position.

36. Fastener setting apparatus according to claim 34, wherein the surface is defined on a continuous endless loop conveyor.

37. Fastener setting apparatus according to claim 1, wherein the delivery tube has a bend, the bend dividing the tube into incoming and outgoing portions, a transverse aperture in said incoming portion for connection to a source of pressurized fluid and a fluid recirculation chamber substantially opposite said aperture for redirecting incoming fluid into said outgoing portion such that, in use, said fluid passing through the aperture is incident on fasteners in the incoming position so as to retain them there and is redirected in said recirculation chamber so as to be incident on the lead rivet at the bend and to propel it into the outgoing portion.

38. Fastener setting apparatus according to claim 37, wherein there is provided a further transverse aperture upstream in said incoming portion.

39. Fastener setting apparatus according to claim 1, wherein there is provided at least two delivery tubes that merge at an intersection into a single outlet tube, a pivotal gate disposed at the intersection selectively closing one of the delivery tubes.

40. Fastener setting apparatus according to claim 39, wherein the gate is movable between a first position in which it closes a first incoming delivery tube so as to leave a clear path between a second incoming delivery tube and an outlet tube.

41. Fastener setting apparatus according to claim 1, wherein the transfer station is connected to at least two delivery tubes and a rotary gate is disposed at an intersection of the tubes, the gate being moveable between a first position in which it blocks a first of the delivery tubes and leaves clear a path between a second of delivery tubes and an outlet of the transfer station and a second position in which it blocks the second of the delivery tubes and leaves clear a path between a first of the delivery tubes and the outlet.

42. Fastener setting apparatus according to claim 41, wherein the gate has a channel therein to allow communication between a selected one of the delivery tubes and the outlet.

43. Fastener delivery apparatus according to claim 1, wherein at least one delivery tube comprises at least first and second inlet branches connected to a single outlet branch, and a gate being disposed between the inlet and outlet and being operable to close communication between one of the inlet branches and the outlet branch.

44. Fastener delivery apparatus according to claim 43, wherein the gate is pivotally mounted in the tube and is operable to close communication between the first inlet and the outlet branch by being struck by a fastener travelling along a second inlet branch.

45. Fastener delivery apparatus according to claim 1, wherein the transfer station has a rotation device for rotating the fastener through substantially a right angle so that it is correctly oriented for entry into a fastener delivery passage of the setting tool, the rotation device comprising a carriage that is moveable along a transfer path toward the fastener delivery passage and is designed to receive a fastener from the delivery tube, a cam surface that causes the carriage to rotate through a right angle as it moves align the transfer path, and a plunger for moving the rotated fastener out of the carriage into the fastener delivery passage.

46. Fastener delivery apparatus according to claim 45, wherein the carriage further comprises a fastener support pivotally mounted on a pivot member that is moveable in a slot defined along the transfer path.

47. Fastener delivery apparatus according to claim 46, wherein the cam surface is defined on an interference block disposed in the transfer path of the carriage such that the pivot member rotate when it slides over the surface.

48. Fastener delivery apparatus according to claim 47, wherein the carriage further comprises a rotary element having a helical cam surface that moves over a fixed pin on the transfer station so that axial movement of the carriage also causes it to rotate.

* * * * *